(12) United States Patent
Funes

(10) Patent No.: US 11,614,721 B2
(45) Date of Patent: *Mar. 28, 2023

(54) SYSTEMS AND METHODS FOR SMART SPACES

(71) Applicant: Webee CORPORATION, Mountain View, CA (US)

(72) Inventor: Lucas Marcelo Funes, Miami, FL (US)

(73) Assignee: Webee Corporation, Mountain View, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/207,016

(22) Filed: Mar. 19, 2021

(65) Prior Publication Data

US 2021/0208553 A1    Jul. 8, 2021

Related U.S. Application Data

(63) Continuation of application No. 16/189,076, filed on Nov. 13, 2018, now Pat. No. 10,983,488, which is a
(Continued)

(51) Int. Cl.
*G05B 15/02* (2006.01)
*H04L 12/28* (2006.01)
(Continued)

(52) U.S. Cl.
CPC ............. *G05B 15/02* (2013.01); *G06N 5/047* (2013.01); *H04L 12/2816* (2013.01);
(Continued)

(58) Field of Classification Search
CPC .......... G05B 15/02; G05B 2219/25011; G05B 2219/25168; G05B 2219/2642;
(Continued)

(56) References Cited

U.S. PATENT DOCUMENTS 8,255,090 B2    8/2012    Frader-Thompson et al.
8,996,188 B2    3/2015    Frader-Thompson et al.
(Continued)

FOREIGN PATENT DOCUMENTS

JP    2003-256957    9/2003
JP    2005-63069    3/2005
(Continued)

OTHER PUBLICATIONS

Canadian Office Action for Application No. 2,967,364, dated Nov. 21, 2021.
(Continued)

*Primary Examiner* — Charles R Kasenge
(74) *Attorney, Agent, or Firm* — DLA Piper LLP (US)

(57) ABSTRACT

A smart space may be provided by a hub and an artificial intelligence server in communication with the hub. The hub may receive data from at least one smart object in the smart space. The artificial intelligence server may generate clusters of the data received from each of the at least one smart objects. The server may perform processing comprising using a cluster to detect an anomaly in the smart object, identify the smart object, classify the smart object, determine a user behavior, determine a user mood, determine an energy consumption pattern, or create an automated action, or a combination thereof.

54 Claims, 92 Drawing Sheets

Related U.S. Application Data continuation of application No. 14/939,997, filed on Nov. 12, 2015, now Pat. No. 10,168,677.

(60) Provisional application No. 62/078,337, filed on Nov. 11, 2014.

(51) Int. Cl.
| | |
|---|---|
| *H04L 12/24* | (2006.01) |
| *G06N 5/04* | (2006.01) |
| *H04L 41/16* | (2022.01) |
| *G06N 5/047* | (2023.01) |
| *G06N 20/00* | (2019.01) |

(52) U.S. Cl.
CPC ...... *H04L 12/2823* (2013.01); *H04L 12/2834* (2013.01); *H04L 41/16* (2013.01); *G05B 2219/25011* (2013.01); *G05B 2219/25168* (2013.01); *G05B 2219/2642* (2013.01); *G06N 20/00* (2019.01)

(58) Field of Classification Search
CPC .... G06N 5/047; G06N 20/00; H04L 12/2816; H04L 12/2823; H04L 12/2834; H04L 41/16
See application file for complete search history.

(56) References Cited

U.S. PATENT DOCUMENTS

| | | | |
|---|---|---|---|
| 11,087,420 B1* | 8/2021 | Trundle | ................ G06Q 10/06 |
| 2003/0005107 A1 | 1/2003 | Dulberg et al. | |
| 2003/0229471 A1* | 12/2003 | Guralnik | ................ G06N 5/00 702/182 |
| 2009/0195349 A1 | 8/2009 | Frader-Thompson et al. | |
| 2010/0082174 A1 | 4/2010 | Weaver | |
| 2010/0145542 A1 | 6/2010 | Chapel | |
| 2010/0250590 A1 | 9/2010 | Galvin | |
| 2010/0280978 A1* | 11/2010 | Shimada | ........... H02J 13/00028 706/54 |
| 2010/0289643 A1 | 11/2010 | Trundle | |
| 2010/0305773 A1 | 12/2010 | Cohen | |
| 2011/0046805 A1 | 2/2011 | Bedros | |
| 2011/0251807 A1* | 10/2011 | Rada | ........................ G01D 4/00 702/61 |
| 2011/0257795 A1 | 10/2011 | Narayanmurthy | |
| 2011/0264605 A1 | 10/2011 | Park | |
| 2012/0089269 A1 | 4/2012 | Weaver et al. | |
| 2012/0130924 A1 | 5/2012 | James | |
| 2012/0166115 A1 | 6/2012 | Apostolakis | |
| 2012/0296488 A1 | 11/2012 | Dharwada | |
| 2012/0316808 A1 | 12/2012 | Frader-Thompson et al. | |
| 2013/0128118 A1 | 5/2013 | Chiang | |
| 2013/0146586 A1 | 6/2013 | Harbin, III et al. | |
| 2013/0197708 A1 | 8/2013 | Song et al. | |
| 2013/0200720 A1 | 8/2013 | Murabayashi et al. | |
| 2014/0025221 A1 | 1/2014 | Chapel et al. | |
| 2014/0032003 A1 | 1/2014 | Chapel et al. | |
| 2014/0084165 A1 | 3/2014 | Fadell et al. | |
| 2014/0098247 A1 | 4/2014 | Rao | |
| 2014/0142724 A1 | 5/2014 | Park et al. | |
| 2014/0201381 A1 | 7/2014 | Shimizu et al. | |
| 2014/0266669 A1 | 9/2014 | Fadell et al. | |
| 2014/0316582 A1 | 10/2014 | Berg-Sonne et al. | |
| 2014/0330444 A1 | 11/2014 | Masters et al. | |
| 2014/0336960 A1 | 11/2014 | Haghigha-Kashani et al. | |
| 2014/0371921 A1 | 12/2014 | Weaver et al. | |
| 2014/0371922 A1 | 12/2014 | Weaver et al. | |
| 2014/0371923 A1 | 12/2014 | Weaver et al. | |
| 2014/0371937 A1 | 12/2014 | Weaver et al. | |
| 2014/0371939 A1 | 12/2014 | Weaver et al. | |
| 2015/0006463 A1 | 1/2015 | Fadell et al. | |
| 2015/0058064 A1 | 2/2015 | Weaver et al. | |
| 2015/0066227 A1 | 3/2015 | Chapel et al. | |
| 2015/0347910 A1 | 3/2015 | Fadell et al. | |
| 2015/0227118 A1 | 8/2015 | Wong | |
| 2015/0295408 A1 | 10/2015 | Weaver et al. | |
| 2015/0301549 A1 | 10/2015 | Weaver et al. | |
| 2016/0276832 A1 | 9/2016 | Kawai et al. | |
| 2016/0372932 A9 | 12/2016 | Masters et al. | |
| 2017/0059195 A1 | 3/2017 | Weaver et al. | |
| 2017/0061815 A1 | 3/2017 | Weaver et al. | |
| 2017/0061816 A1 | 3/2017 | Weaver et al. | |
| 2018/0005125 A1 | 1/2018 | Fadell et al. | |

FOREIGN PATENT DOCUMENTS

| | | |
|---|---|---|
| JP | 2006-134308 | 5/2006 |
| JP | 2007-53530 | 3/2007 |
| JP | 2012-164208 | 8/2012 |
| JP | 2013-48326 | 3/2013 |
| JP | 2013-178933 | 9/2013 |

OTHER PUBLICATIONS

Japanse Office Action in 2020-104462, dated Jul. 20, 2021.
European Office Action in 15 859 588.4, dated Jul. 27, 2021.
International Search Report issued in PCT/US2015/060428 dated Jan. 28, 2016.
Written Opinion issued in PCT/US2015/060428 dated Jan. 28, 2016.
Extended European Search Report issued in EP 15859588.4 dated Mar. 8, 2018.
Japanese Office Action Application No. 2017-526071 dated Sep. 3, 2019.
Japanese Office Action Application No. 2017-526071 dated Jan. 7, 2020.
European Examination Report issued in EP 15 859 588.4 dated Jun. 12, 2020.
Japanese Office Action for Application No. 2020-104462, dated Feb. 22, 2022.
Examination Seach Report for Canadian Application No. 2,967,364, dated Sep. 14, 2022.
Decision on Patent for Japanese Application No. 2020-104462, dated Sep. 6, 2022.

* cited by examiner

EDI☐ DEVICE

GRID ITEM
Height: 130dp
style: BUTTON A DARK
padding top: 10dp
padding left/right: 18dp ICON
width/height: 63dp DEVICE NAME
text: Regular 16sp white
margin bottom: 8dp STATUS LABEL
height: 25dp
background: blue-dark 60%
border top: 1dp, black
corner radius bottom left/right: 3dp
margin left/right: 1dp
text: Bold, 12pt, white

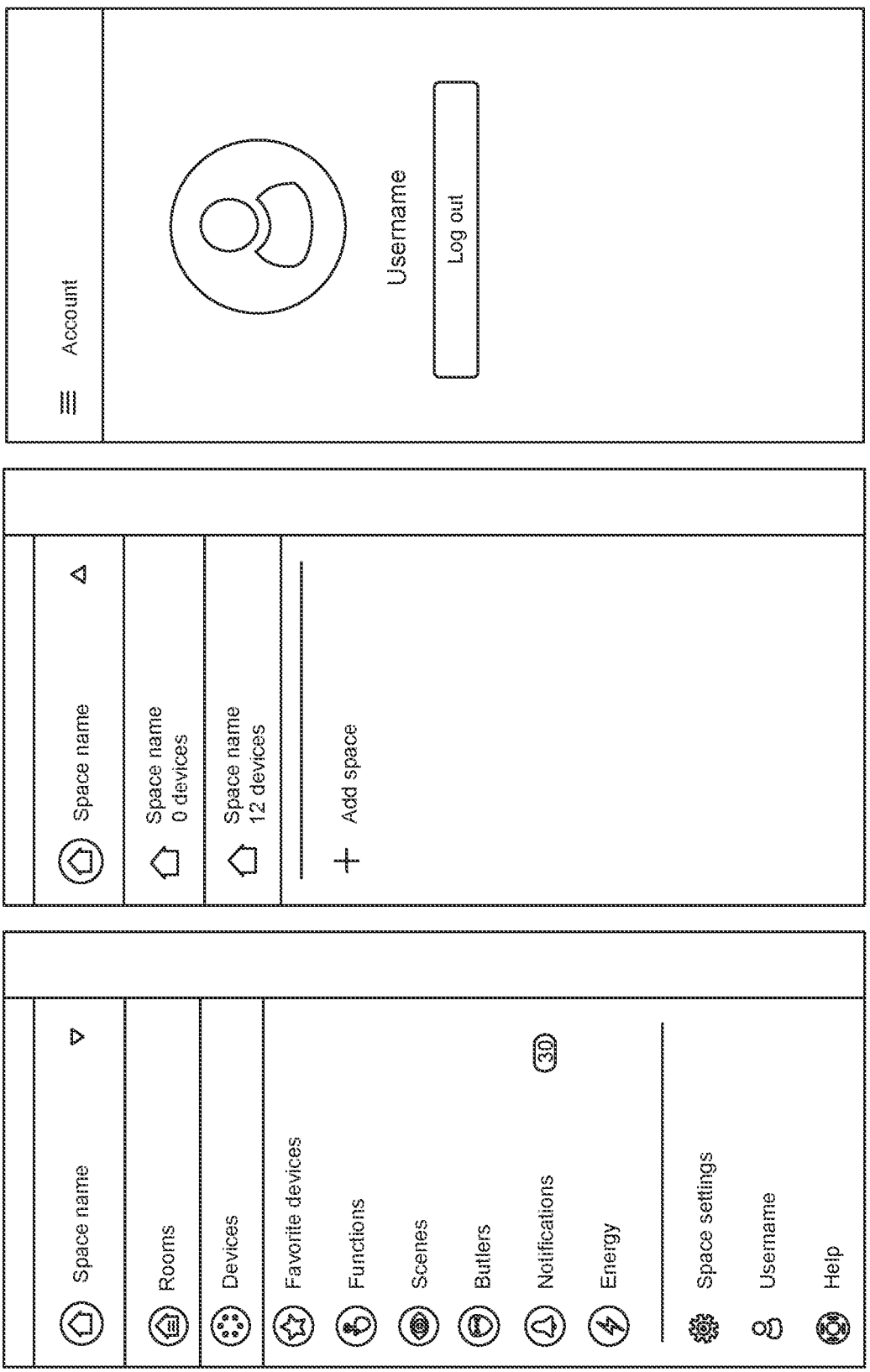

Remove smartee dialog

Remove Smartee?

This will remove this Smartee and all devices connected to it from space "Space name".

CANCEL    REMOVE

Adding Smartee

We're adding your Smartee to space "space name"

A/C Water Sensor
DRY

Balcony door
CLOSED

Coffee maker
OFF

Dryer
CLOSED

Entrance lights
OFF,OFF

Front door
CLOSED

N☐☐ ☐
Experience Center

D☐☐☐☐☐☐☐☐

☐☐☐☐☐☐☐ ☐☐☐ ☐☐☐☐☐☐☐

D☐☐☐☐☐
None

☐☐☐ ☐☐☐☐☐☐☐ ☐☐☐☐☐
Fahrenheit (° F)

☐☐☐ ☐☐☐☐☐
GMT-05:00, Pacific/Eastern

SYSTEMS AND METHODS FOR SMART SPACES

CROSS-REFERENCE TO RELATED APPLICATION

This application is a continuation of U.S. application Ser. No. 16/189,076 filed Nov. 13, 2018, which is a continuation of U.S. application Ser. No. 14/939,997 filed Nov. 12, 2015 (now U.S. Pat. No. 10,168,677), which claims priority from U.S. Provisional Application No. 62/078,337, filed Nov. 11, 2014, the entireties of which are incorporated by reference herein.

BACKGROUND

In a conventional home system, a user can remotely control and manage home appliances via a portable device. Each home appliance is operated and controlled manually in many cases. Smart spaces may integrate control of a variety of home appliances. Smart spaces use integrated wiring technology, network communication technology, security technology, automatic control technology, and audio and video technology to integrate control of home appliances. Smart spaces networks may include control panels that a person may use to input settings, preferences, and scheduling information that the smart spaces network uses to provide automated control the various devices, appliances, and systems in the home. For example, a person may input a desired temperature and a schedule indicating when the person is away from home. The home automation system uses this information to control the heating, ventilation, and air conditioning ("HVAC") system to heat or cool the home to the desired temperature when the person is home, and to conserve energy by turning off power-consuming components of the HVAC system when the person is away from the home.

BRIEF DESCRIPTION OF THE DRAWINGS

Figure 33C:
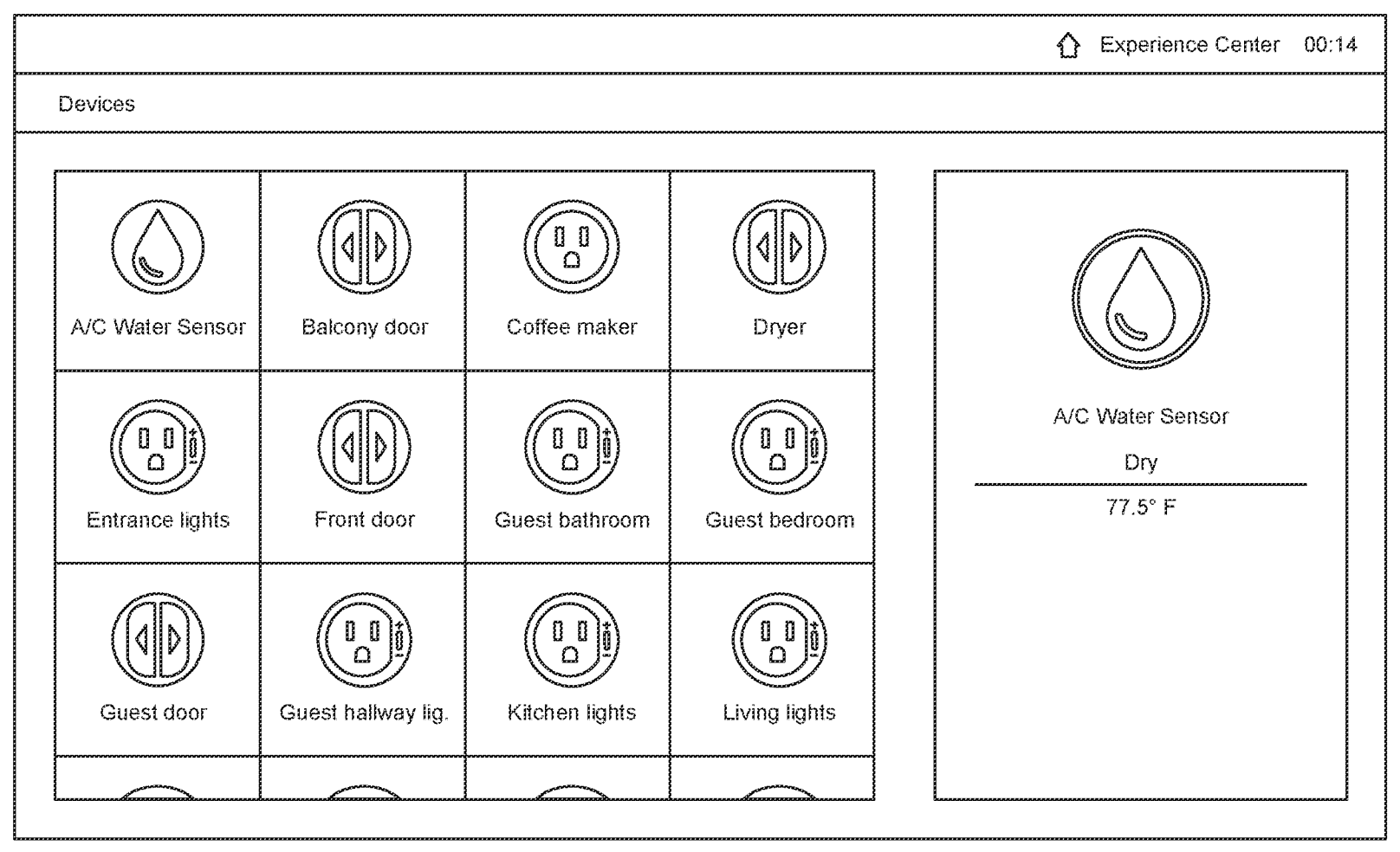

FIGS. 33A-33E are TV user interface screenshots according to an embodiment of the invention.

DETAILED DESCRIPTION OF SEVERAL EMBODIMENTS

Figure 1:
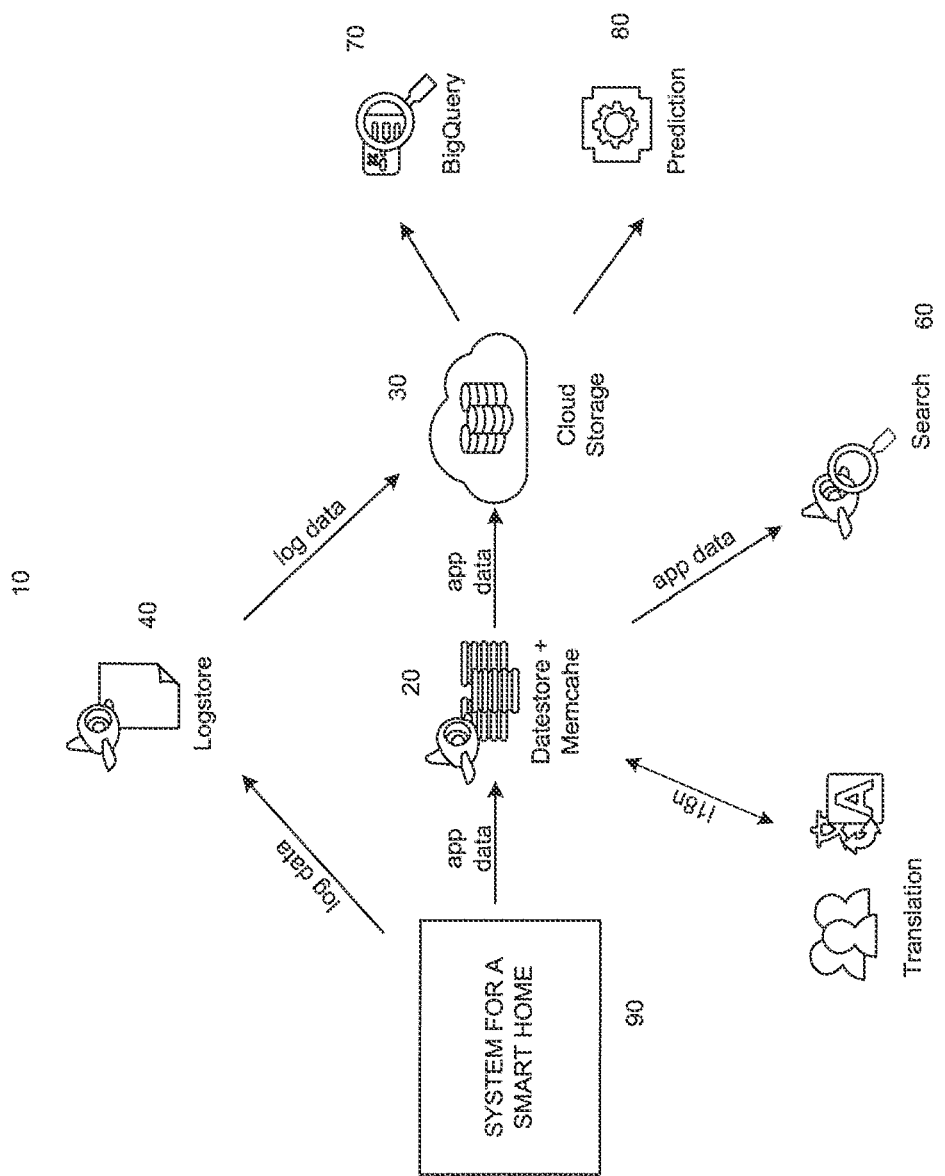
FIG. 1 shows a smart space network according to an embodiment of the invention.

The systems and methods described herein may provide and enable smart spaces for home appliance control and/or control of other devices. These systems and methods may utilize advanced data processing and/or artificial intelligence to provide smart spaces systems and methods that are capable of learning. Additionally, these systems and methods may integrate and interconnect devices within existing infrastructure and wired and wireless home automation networks. Some of the features described herein may utilize big data systems, machine learning and artificial intelligence algorithms, cloud computing technologies, and cloud services, for example.

Systems and methods described herein may comprise one or more computers. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. Those of ordinary skill in the art will appreciate that those terms used herein are interchangeable, and any computer capable of performing the described functions may be used. For example, though the term "server" may appear in the specification, the disclosed embodiments are not limited to servers.

In some embodiments, the computers used in the described systems and methods may be special purpose computers configured specifically for providing smart spaces. For example, a server may be equipped with specialized processors, memory, communication components, etc. that are configured to work together to perform smart space control, integration, learning, etc., as described in greater detail below.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connection). Connections between computers may use any protocols, including connection-oriented protocols such as TCP or connectionless protocols such as UDP. Any connection through which at least two computers may exchange data may be the basis of a network.

Examples of systems that may be controlled by the smart spaces systems and methods described herein may include, but are not limited to, the following: security technology, indoor video intercom, home monitoring, home burglar alarm, home and cell card, household equipment, household energy, audio and video technology, centralized distribution of audio and video, background music, HVAC system, lighting systems, alarm systems, home theater, entertainment systems, other appliances, etc.

FIG. 1 shows a smart space network 10 according to an embodiment of the invention. A smart space 90 may include systems (described below) that may be in communication with a logstore 40 and/or a datastore/memcache 20. Log data (e.g., data about smart space 100 usage and trends, discussed below) may be stored in the logstore 40. App data (e.g., input by a user) may be stored in datastore 20. In some embodiments, the datastore 20 may be a non-SQL database and realtime data processing technologies (e.g., using one or more of Cassandra, BigTable, Dataflow, Redis, MongoDB, and/or other systems). Additionally, app data may be used in translation 50 and/or search 60 functions. Log data and/or app data may be further stored in cloud storage 30 accessible by the logstore 40 and datastore 20. Big data queries 70 and/or predictions 80 (described below) may be performed by remote servers using the data stored in cloud storage 30 in some embodiments.

Figure 2:
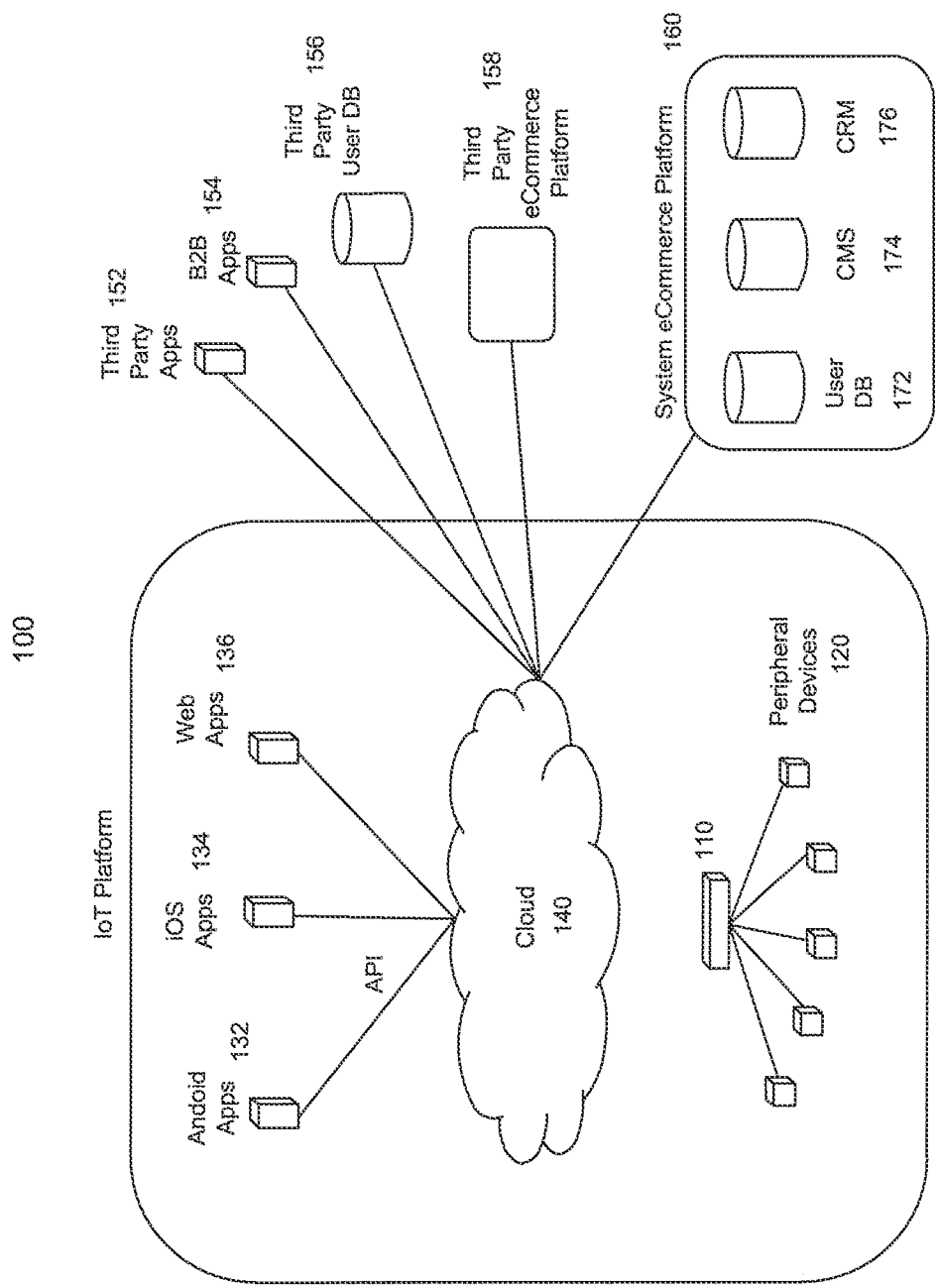
FIG. 2 shows a smart space network according to an embodiment of the invention.

FIG. 2 shows a smart space network 100 according to an embodiment of the invention. Whereas FIG. 1 illustrated a network 10 in terms of functions that may be provided, FIG. 2 illustrates a relationship between hardware elements. For example, a hub 110 and a plurality of peripheral devices 120 may be in communication with one another as shown. Each peripheral device 120 may be a device controlled by the hub 110 and/or from which data is gathered by the hub 110. For example, the peripheral devices 110 may be smart appliances and/or devices such as smart plugs or smart sockets that gather data from and/or control appliances. One or more user computers may be equipped with apps 132-136 that may allow the user to interact with the hub 110 via a local or wide network 140 (e.g., a home network or the Internet). The hub 110 may also perform smart TV control features (e.g., streaming media, DVR, etc.) and may display user interfaces on the TV (e.g., as shown in FIGS. 33A-33E). In some embodiments, the hub 110 and TV may function together to allow a user to perform all smart space functions that may be otherwise performed via apps 132-136. In effect, the hub 110 may function as a computer, and the TV may function as a display, and the hub 110 may provide app 136 for the use of the user. Using the TV controls (e.g., a remote control) and/or a remote control provided with the hub 110, the user may interact with the app 136 via the TV and hub to perform the functions described herein.

Additionally, external elements such as third party/B2B apps 152/154, third party databases 156, and/or third party ecommerce platforms 158 may be in communication with the hub 110 and/or apps 132-136 via the network 140. A system ecommerce platform 160 may also be in communication with the hub 110 and/or apps 132-136 via the network 140. The system ecommerce platform 160 may include a variety of data (e.g., external user databases 172, content management systems (CMS) 174, customer relationship managers (CRM) 176). In some embodiments, for example, the ecommerce platform 160 and/or third party platforms 158 may allow the user to install applications to display multimedia content, install IoT applications, share social media, and/or add features to receive predictions and recommendations from the smart home devices and IoT devices.

Figure 3:
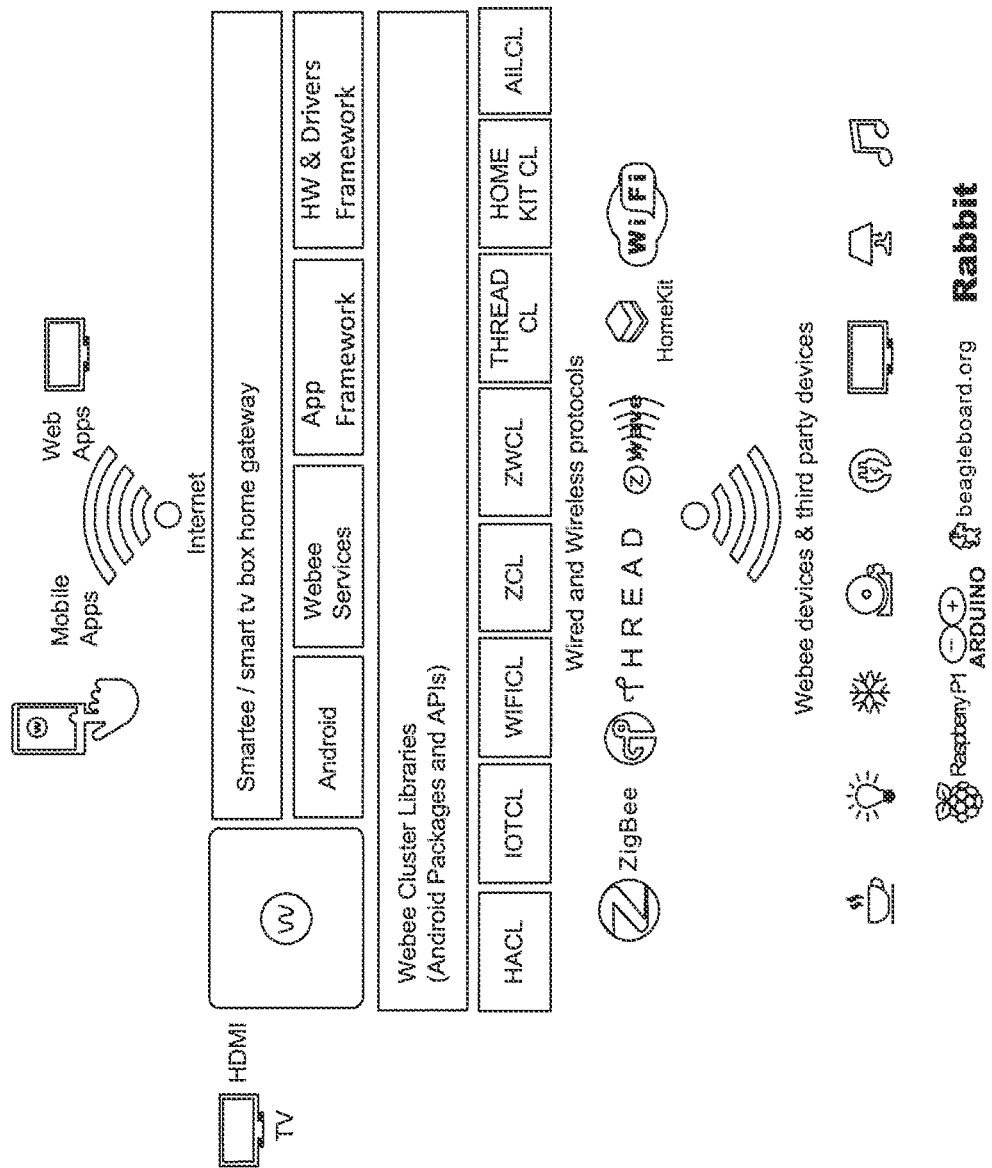
FIG. 3 shows a smart space network according to an embodiment of the invention.

The apparatus allows the app marketplace to auto install new services and applications in background to deliver future new services, content providers and control new devices and protocols among other applications which could extend future applications and new services as they become available FIG. 3 provides an alternative view of the smart space network 100, illustrating specific protocols, apps, and features that may be included in the elements of the network 100.

Figure 4:
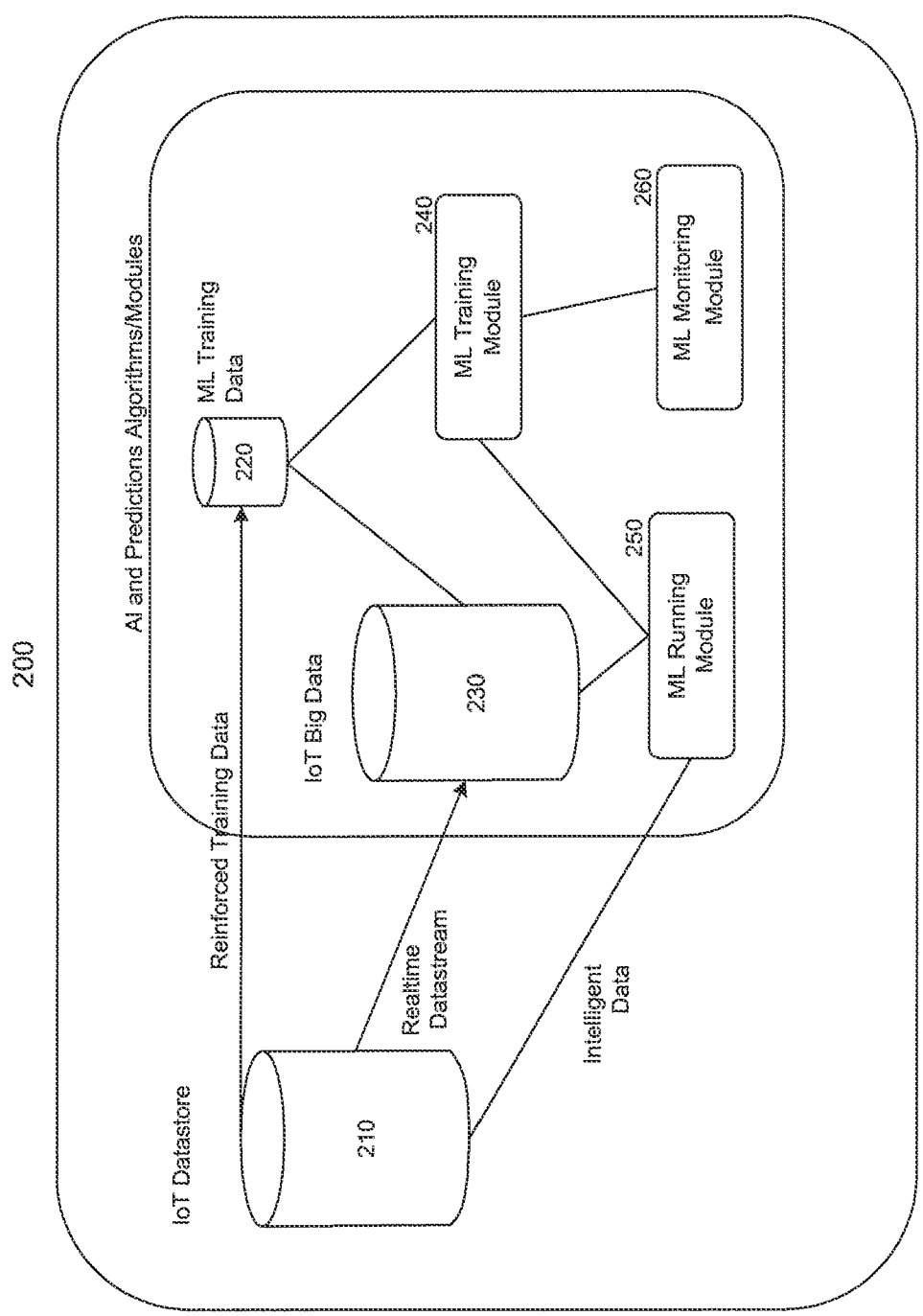
FIG. 4 shows a smart space server according to an embodiment of the invention.

FIG. 4 shows a smart space server 200 according to an embodiment of the invention. The server 200 may be disposed within the network 140 of FIG. 2, for example, and may communicate with the hub 110 and/or apps 132-136, for example. The server 200 may include AI and prediction algorithms/modules, such as a machine learning training module 240, a machine learning (ML) running module 250, and/or a machine learning monitoring module 260. The server 200 may also include a variety of databases, such as a device (e.g., Internet of Things (IoT)) datastore 210, a machine learning training datastore 220, and/or an IoT big data datastore 230. As described in greater detail below, data gathered at peripheral devices 120 and collected by the hub 110 may be sent to the server 200 and stored in the IoT datastore 210. Such data may be used for training (e.g., passed to the ML training data store 220 and used by the ML training module 240) and/or analysis (e.g., via the ML running module 250 and/or ML monitoring module 260). Various communication protocols (e.g., zigbee, z-wave, WiFi, Bluetooth, etc.) and/or interaction module with communication board may allow specific communications and data streams between devices that use separate protocols from one another. Thus, devices of a variety of types, brands, configurations, etc. may interact within the smart space (via the hub 110 and server 200) and thereby be controlled by the artificial intelligence and machine learning functions described herein. The server 200 may be configured to send messages like recommendations, alerts, and notifications to the apps 132-136 (and/or to the hub 110 for display on the TV 320). The server 200 may gather interaction feedback with the user, store the feedback, and use it in posterior analytics to help retrain the machine learning algorithms of the system.

Figure 5:
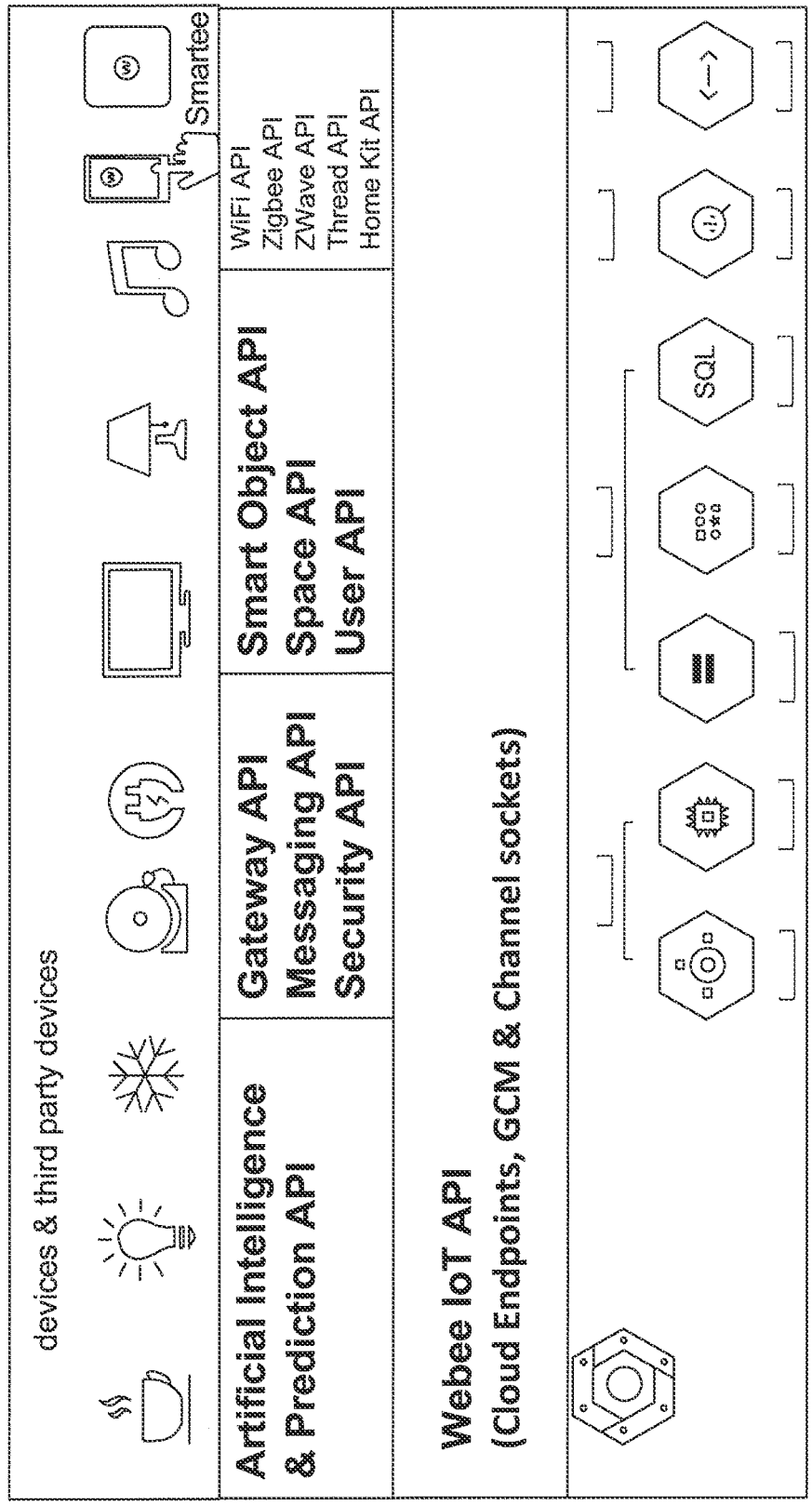
FIG. 5 shows an artificial intelligence (AI) system according to an embodiment of the invention.

Systems and methods for providing smart spaces may be capable of operating and managing various aspects of residential and/or commercial environments. In some embodiments, the system may employ an artificial intelligence (AI) system, for example comprising the hub 110 and/or the ML modules 240-260 of the server 200. FIG. 5 shows an AI system according to an embodiment of the invention, illustrating the devices being controlled/monitored and the data processing of the hub 110 and server 200 (e.g., via the listed APIs and/or others). The system may be configured to learn and adapt to different scenarios and user habits. AI system may automate control based on a user's lifestyle, appliances' energy management capabilities, and the like. For example, the system may learn about the user's interaction with their living space using device and sensor data. Using the collected data, the AI system may provide recommendations to the user regarding safety, comfort, energy optimization, and the like.

Some embodiments may connect a smart space to a cloud based or otherwise network accessible remote system. The remote system may be capable of managing and handling big data. The system may include an operating system, machine learning algorithm, and prediction modules to adapt to a user's preferences. The cloud-based system may provide out-of-home or out-of-office access to the premises and also data for the AI system.

In some embodiments the system may include an integration module configured to integrate the system, big data architecture, mobile devices, and communication protocols. Furthermore, the system may allow interoperability of third party devices, appliances, and the like thus enabling seamless integration of the above. In some embodiments, the integration module may use open standards for interoperability. For example, the open standards may comprise protocols from Home Kit, Thread, Insteon, Zigbee, ZWave, and Wi-Fi, among others. The integration module may provide integration of third party smart spaces systems and automated residential devices.

Figure 6:
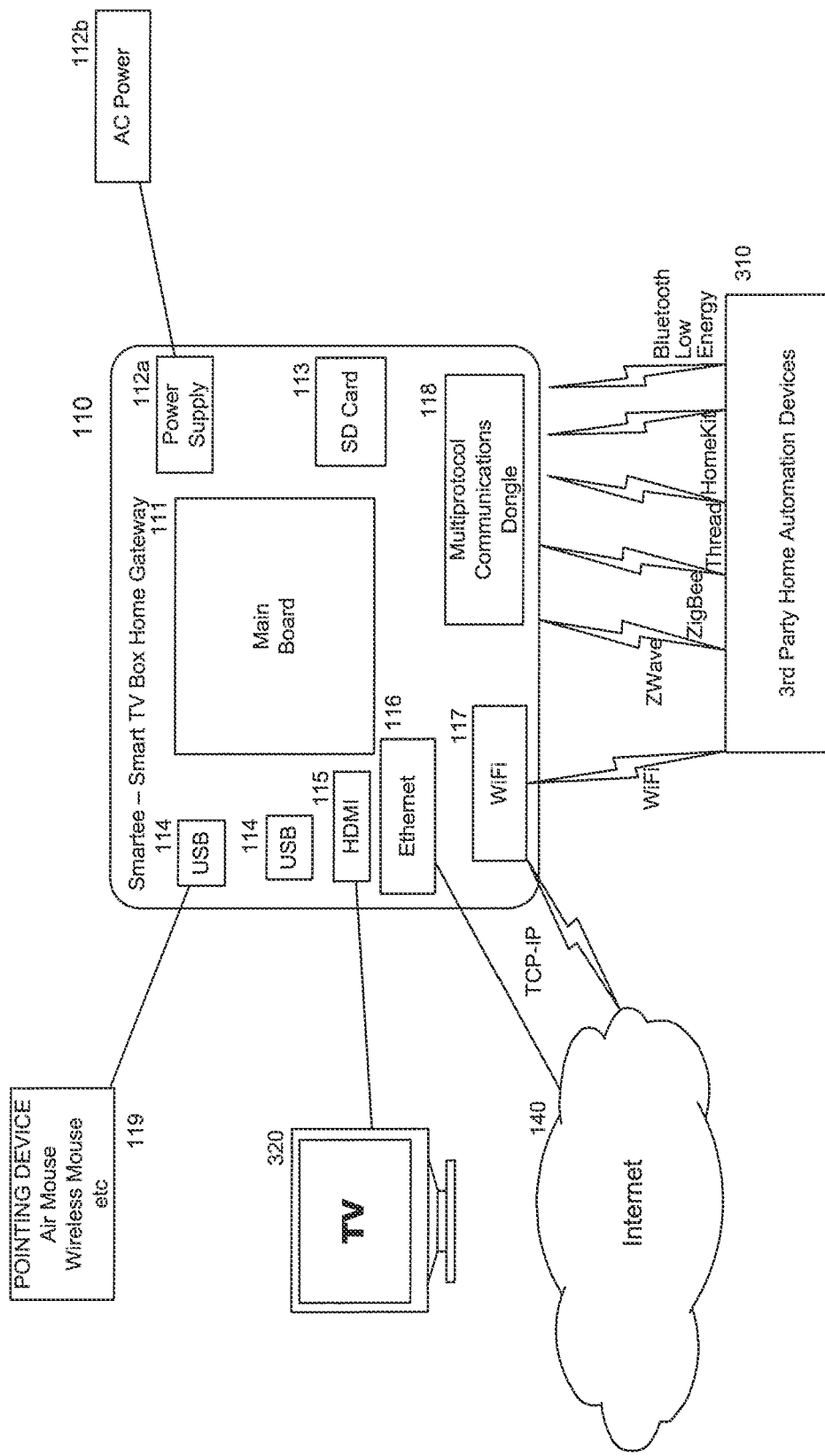
FIG. 6 shows a block diagram of a home gateway module according to an embodiment of the invention.

In some embodiments, the system may provide a gateway for incorporation of a full suite of smart systems (e.g., IoT devices). Example gateway devices may include a modem, a router, a network switch, a voice over internet protocol (VoIP) for digital signals device, an analog telephony adapter, or a wireless access point, or combinations of the above. The gateway may provide a mechanism to connect to different devices independent of devices manufacturer, or operating system, or firmware, etc. For example, FIG. 6 illustrates a block diagram of a home gateway module (e.g., hub) 110 in accordance with an embodiment of the invention. The hub 110 may connect to a TV 320 via HDMI 115 or other interface. In some embodiments, the hub 110 may be integrated into the TV 320. In addition, the hub 110 may include elements such as a main board/processor 111, power supply 112a/b, SD card slot 113, USB 114, Ethernet 116, WiFi 117, multiprotocol communications dongle 118, and/or input device (e.g., mouse, remote control, etc.) 119. The hub 110 may communicate with third party home automation devices 310 and/or the network 140. A user may interact with the hub 110 using the input device 119 and TV 320 to, for example, control the TV and other devices 120 and/or receive information from the hub 110.

In some embodiments, the hub 110 may be connected to a personal computer or other device, and firmware/software to interact with the hub 110 may be downloaded and installed on the computer to further exploit the potential of the hub 110. The hub 110 may include indicators and a user interface. In one embodiment, the software for the hub 110 may provide a user with pre-configured commands. For example, the preconfigured commands may be help, version, reset, get state/status of any device, set state of any device, bind, factory reset, network details, boot mode, date time command, and bind set.

In some embodiments, the gateway may be provided using a smart box or dongle. In some embodiments, the system may include an operating system based on a Google Android platform. A game controller, remote control, and/or mobile application may be used to input commands into the system, for example. In some cases the smart box may be attached to a television set, and a user may interact with the system via a television interface, for example. Optionally, the smart box may be a central standalone box including a user interface. The system may work with or without Internet, router, and/or Wi-Fi. The system may have a server installed and create a network whereby the devices may communicate with the system without the need of Internet or other separate network, for example. The smart box may connect a full suite of interconnected devices and apparatus with the cloud learning system via a built-in multi-protocol architecture that may operate and manage various aspects of human environments and interfaces. Additionally, the system may be configured to receive upgrades, add additional application to support newly introduced devices, and the like.

The system may integrate multi-protocol third party devices with intelligent discovery and intelligent mapping. The system hardware may communicate with a broad range of devices converging many standards and technologies. The communication with third party smart spaces devices may be accomplished with the use of a communications dongle which may be multi-protocol. Communication protocols supported by the dongle may include Wi-Fi, Zigbee, Zwave, Thread, Home Kit and Bluetooth Low Energy. Through the communications dongle, the system may control and communicate third party devices.

Figure 7A:
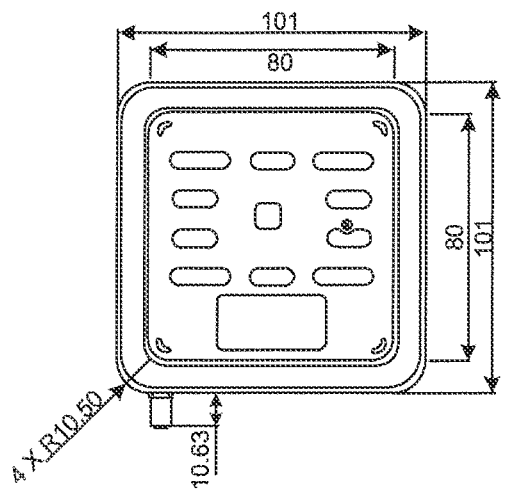
FIGS. 7A-7E show a home gateway module according to an embodiment of the invention.
Figure 7B:
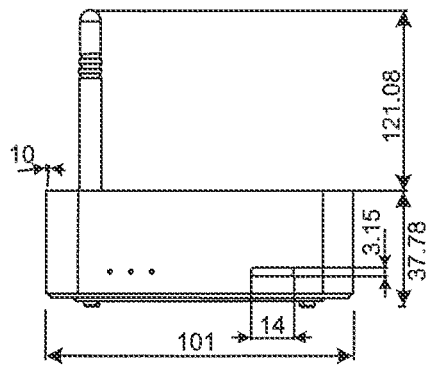
Figure 7C:
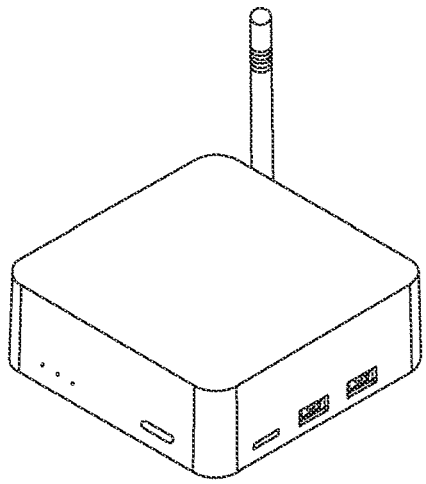
Figure 7D:
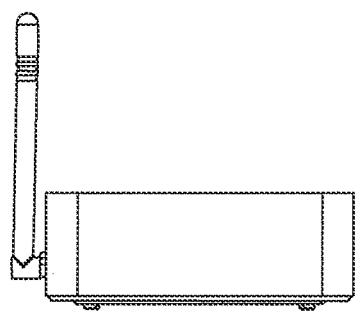
Figure 7E:
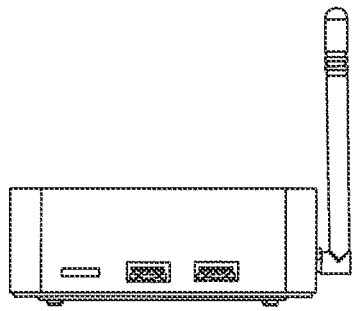

An example enclosure for the system is shown in FIGS. 7A-7E. The design of the case and materials from which it is made may be selected to optimize wireless range. FIG. 7A shows the bottom view for the box. FIG. 7B shows the front view of the box with indicator lights which may communicate system status. FIG. 7C shows the isometric view of the box, FIG. 7D shows the left profile view, and FIG. 7E shows the rear profile view.

The system may include plug and play installation and initialization features. The plug and play functions of the system may be performed by installed gateway software. For example, when a user plugs the smart box in to a power supply a first time, a program stored in system memory may load drivers, automatically initialize the system to connect to an available network, and operationalize different modules. For example, with ZigBee, the drivers may run a network initialization sequence that may search for the best ZigBee wireless channels available, create a ZigBee network in an identified channel, get network information, store the information locally, and/or automatically upload the information to the cloud.

Figure 8:
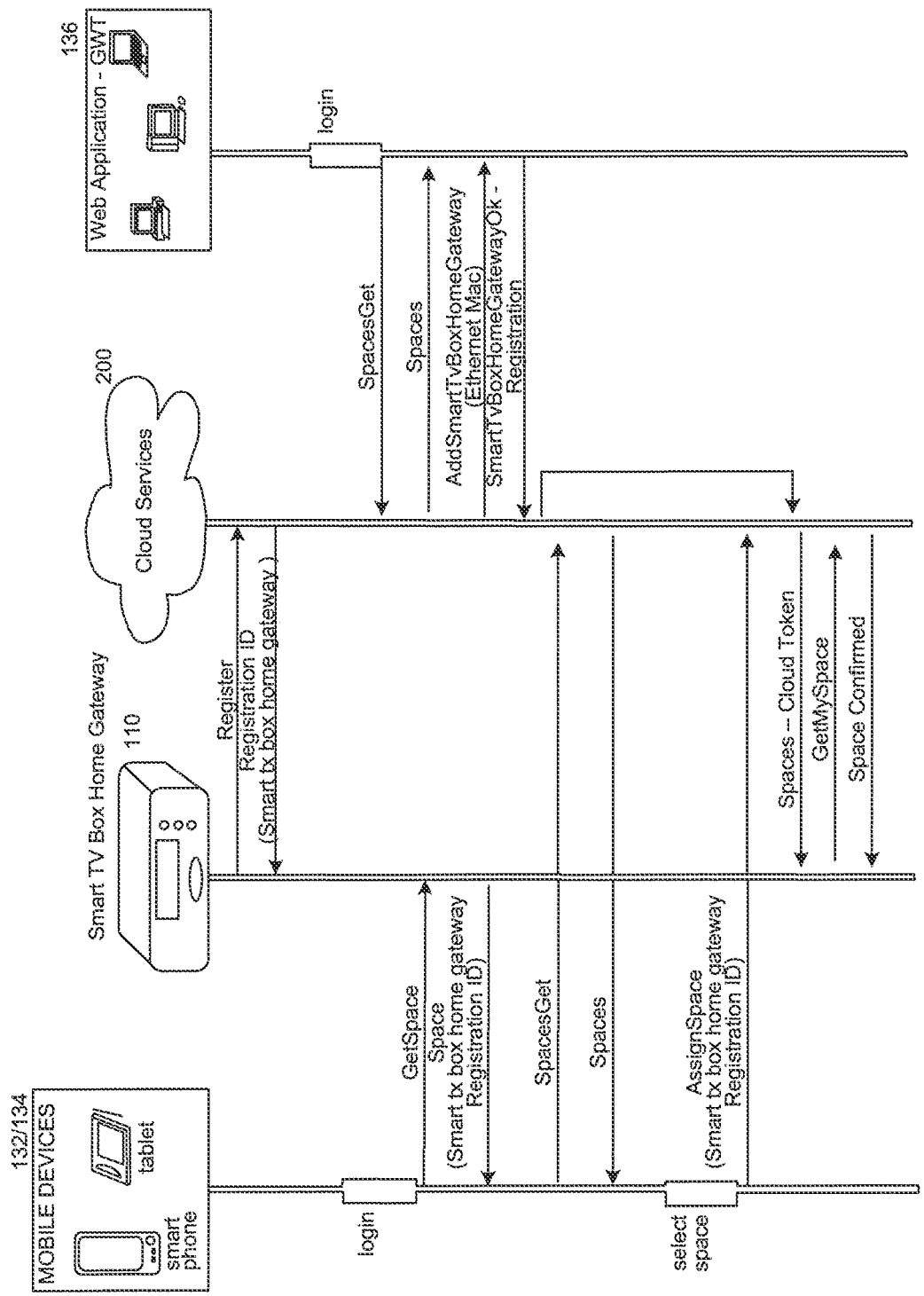
FIG. 8 shows a registration process according to an embodiment of the invention.
Figure 20A:
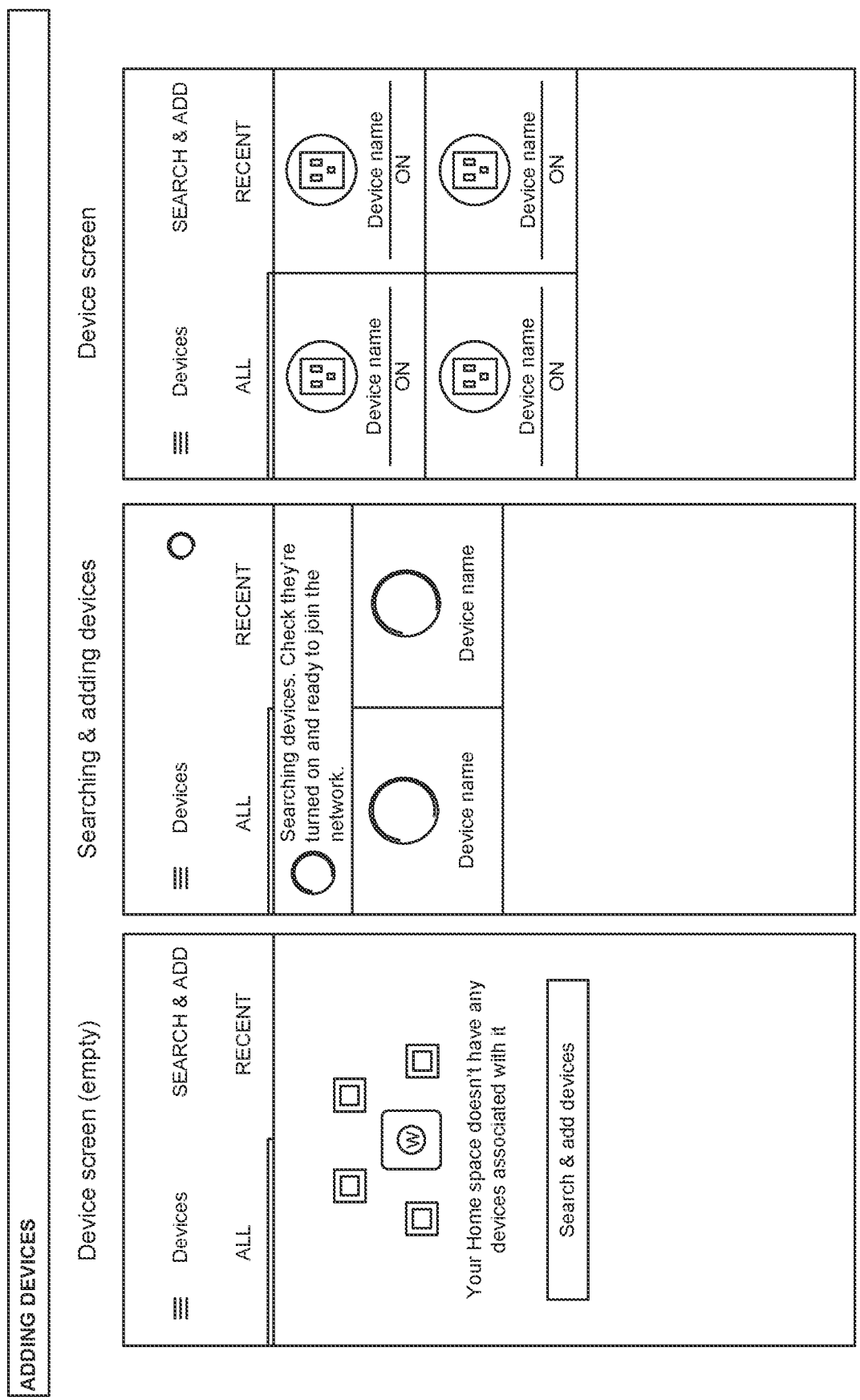
FIGS. 20A-20TT are app screenshots according to an embodiment of the invention.
Figure 20B:
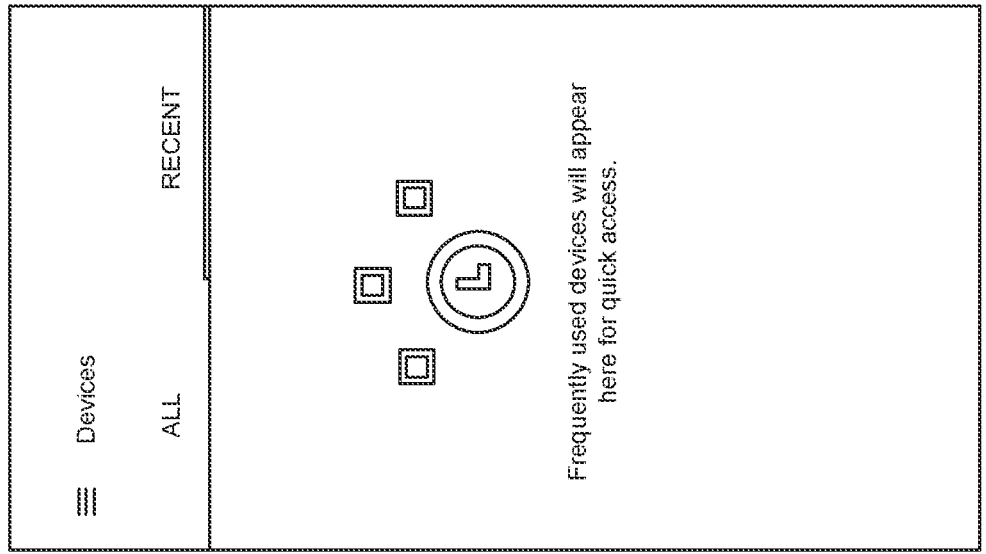
Figure 20B:
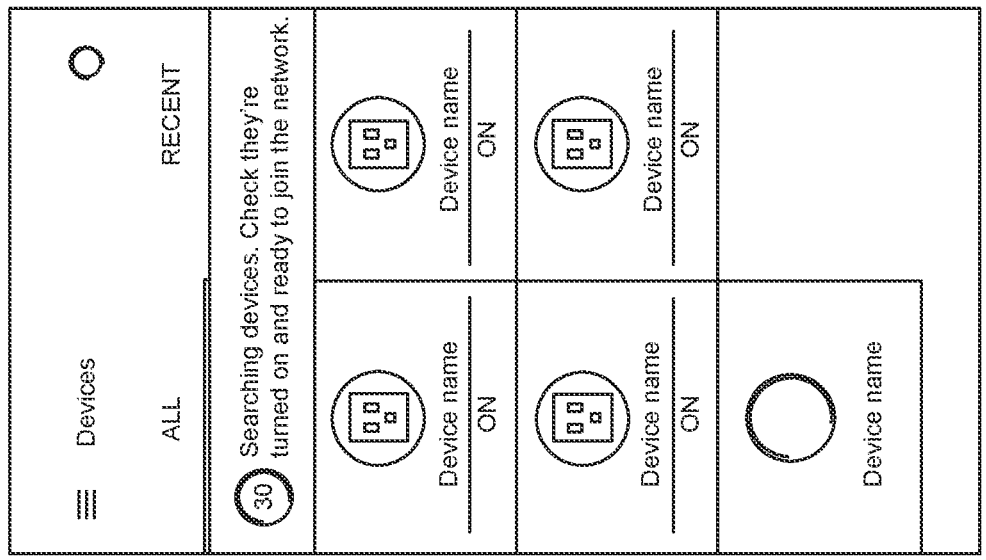
Figure 20C:
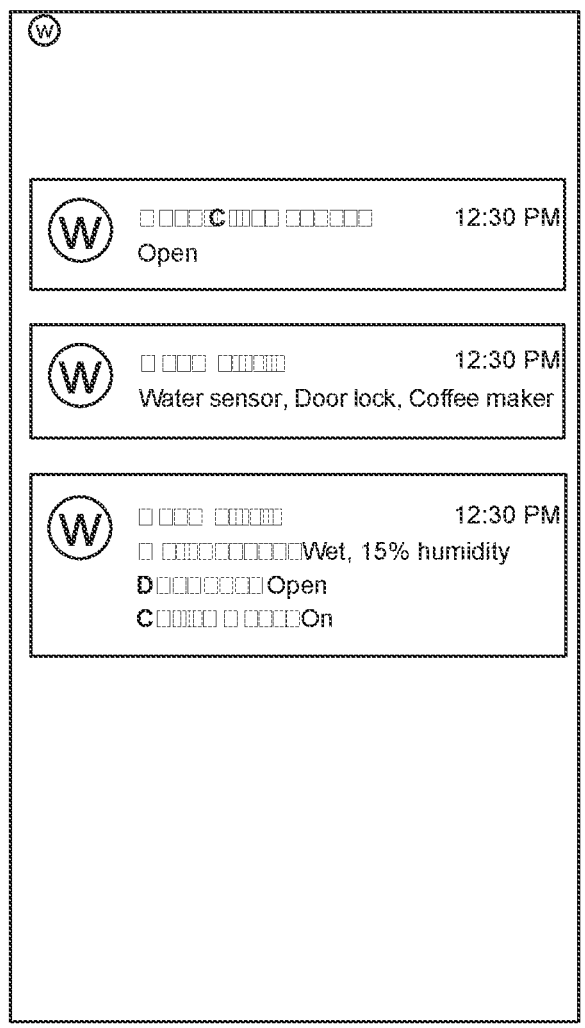
Figure 20D:
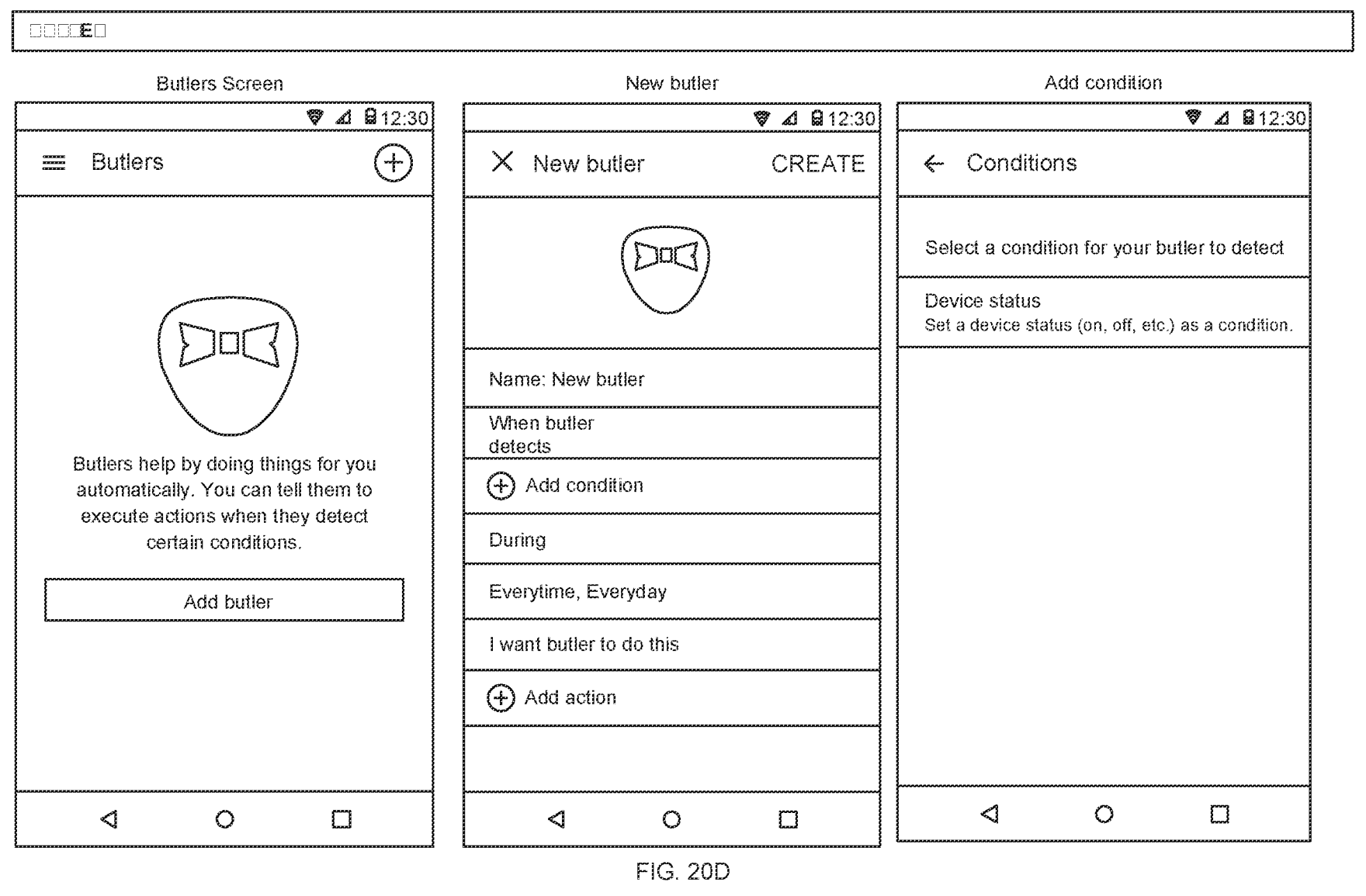
Figure 20E:
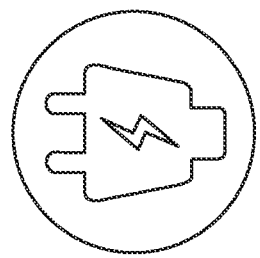
Figure 20H:
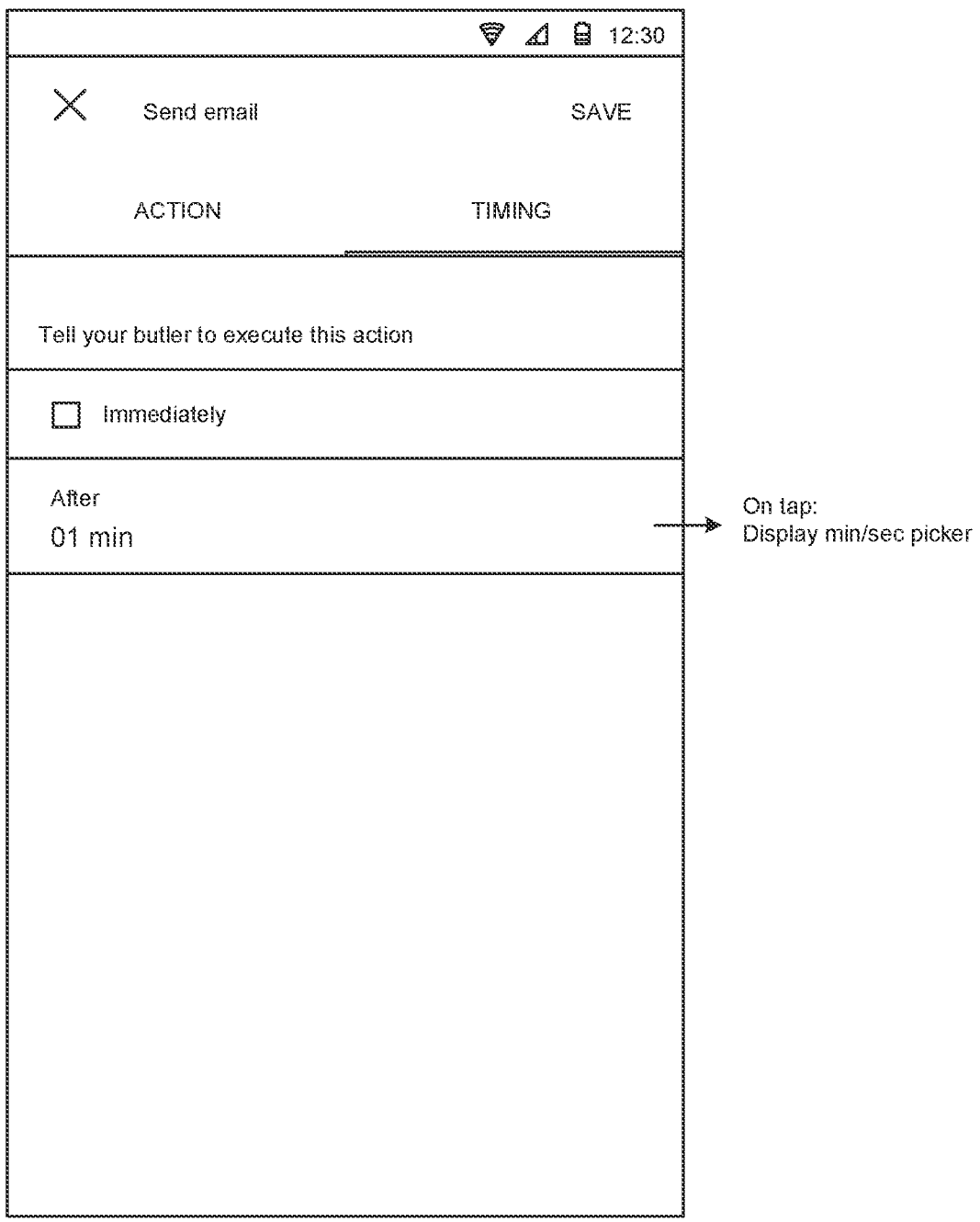
Figure 20J:
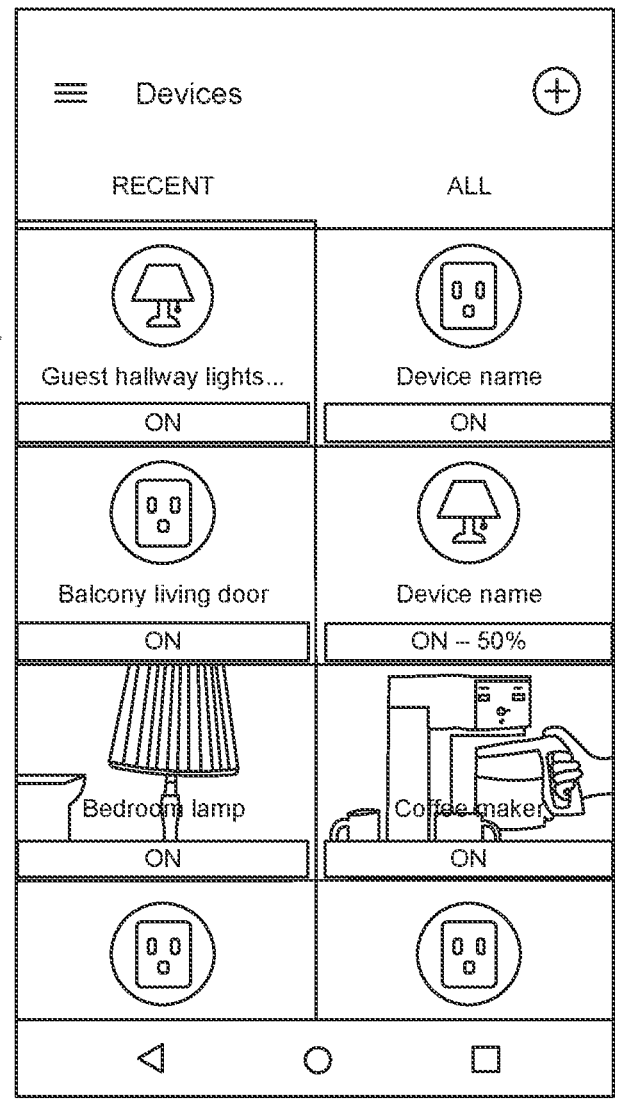
Figure 20K:
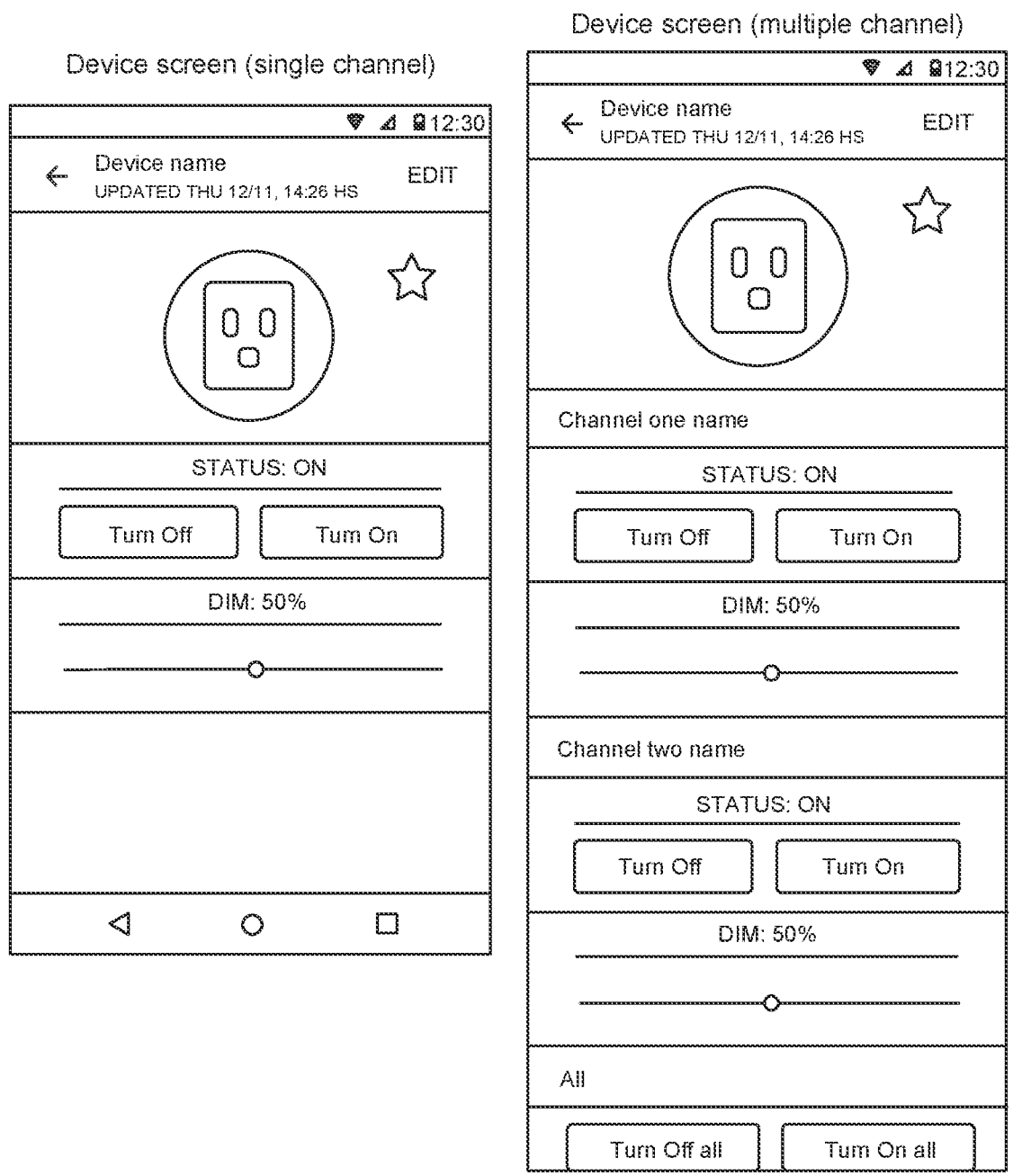
Figure 20L:
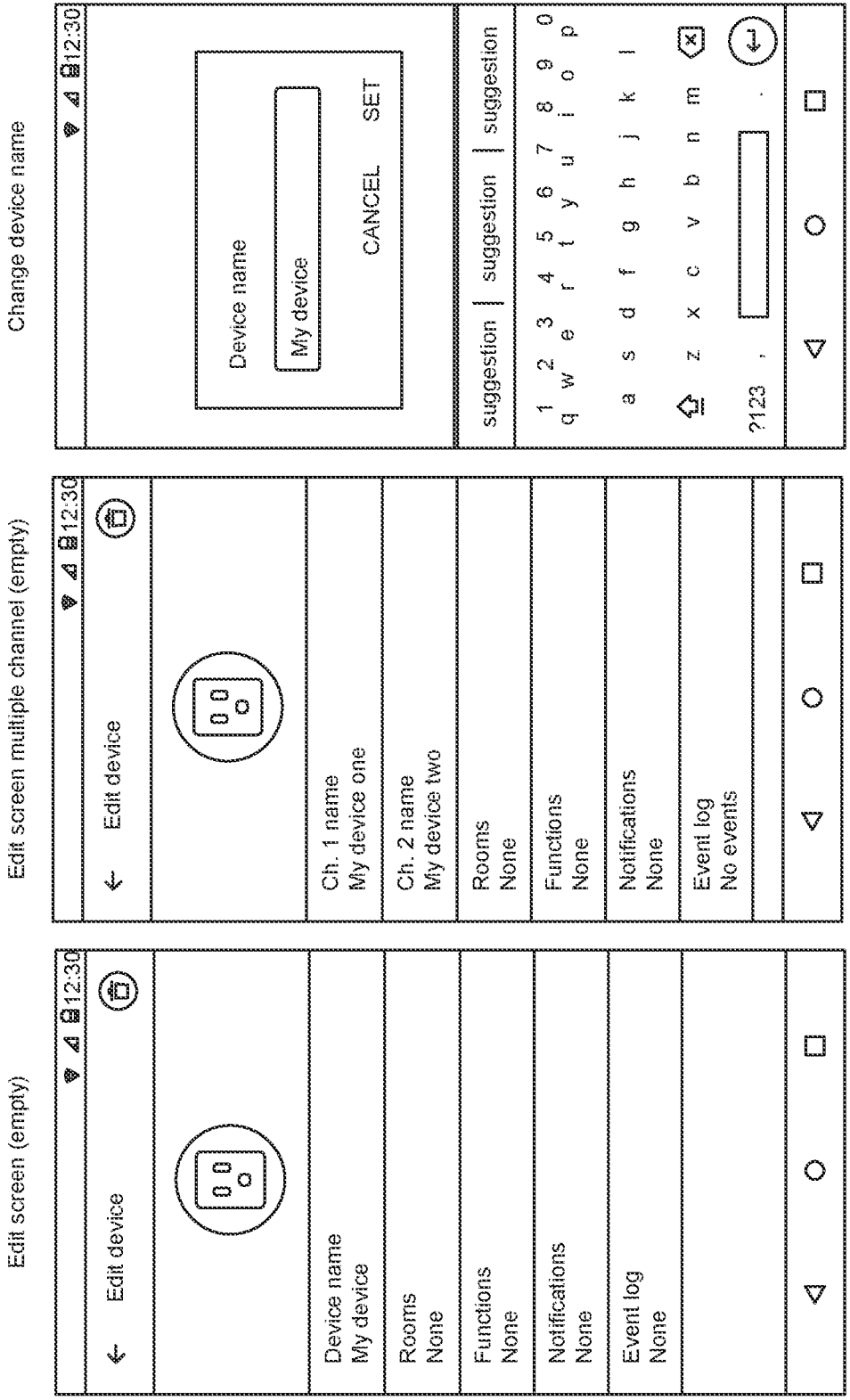
Figure 20M:
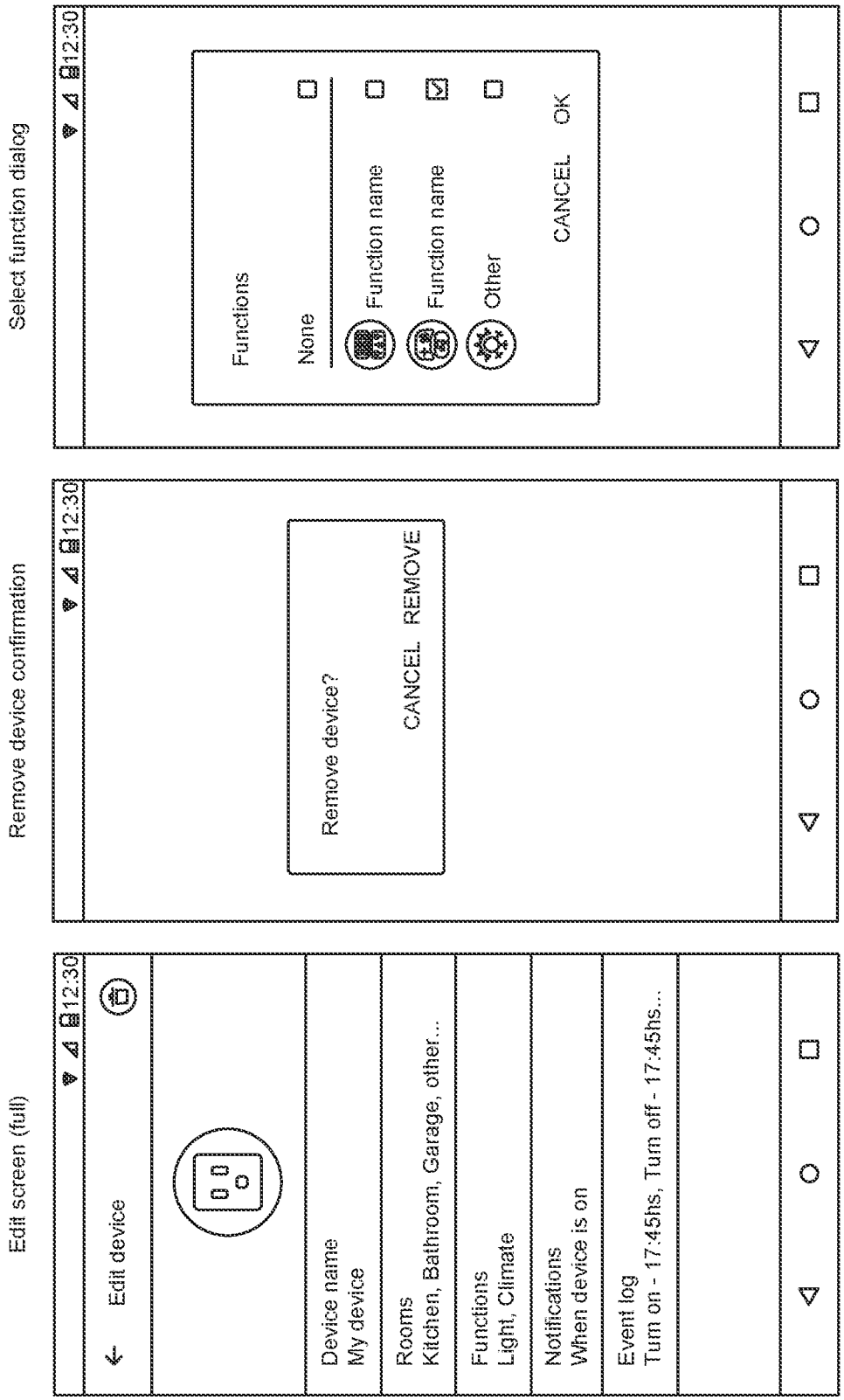
Figure 20N:
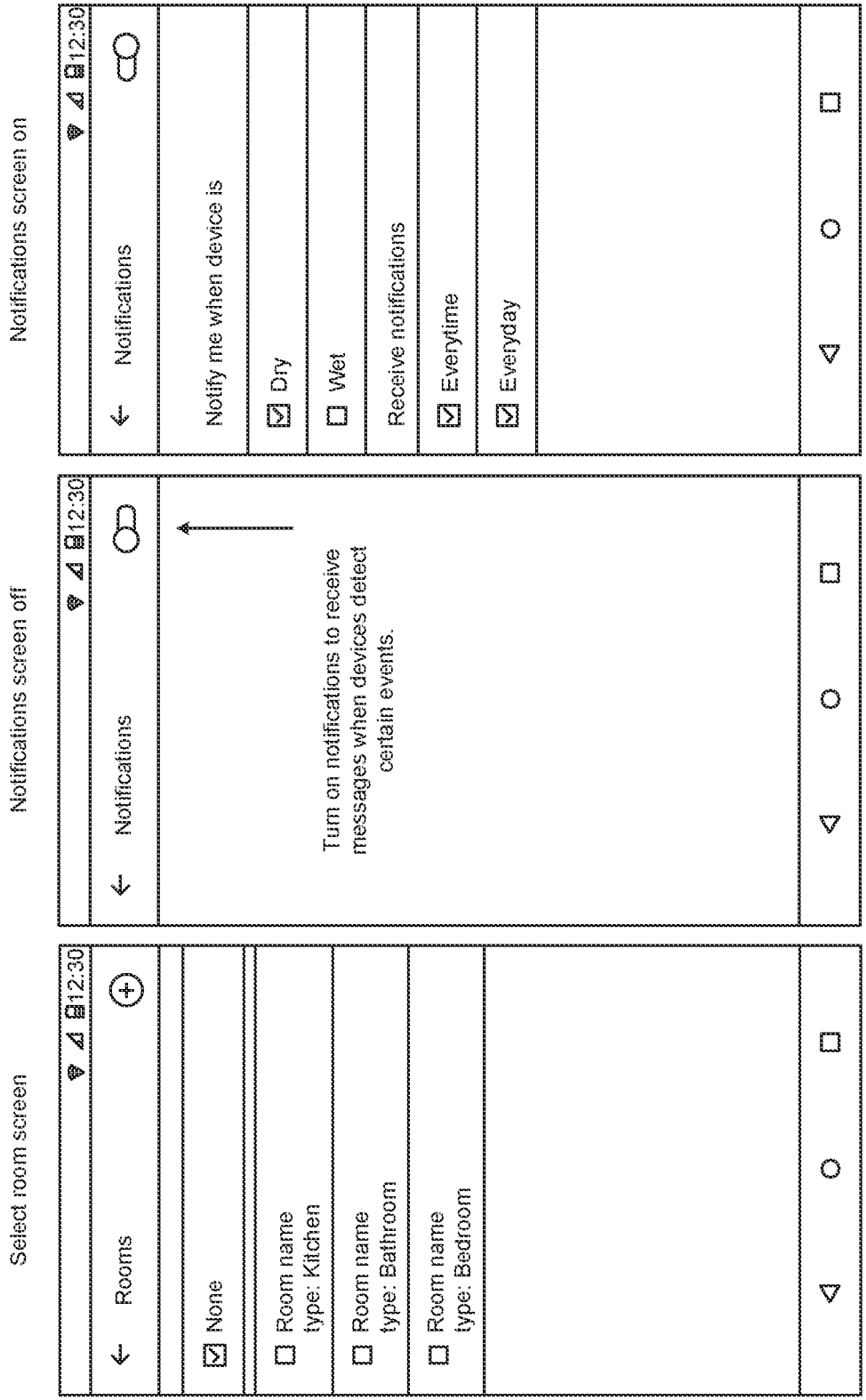
Figure 20P:
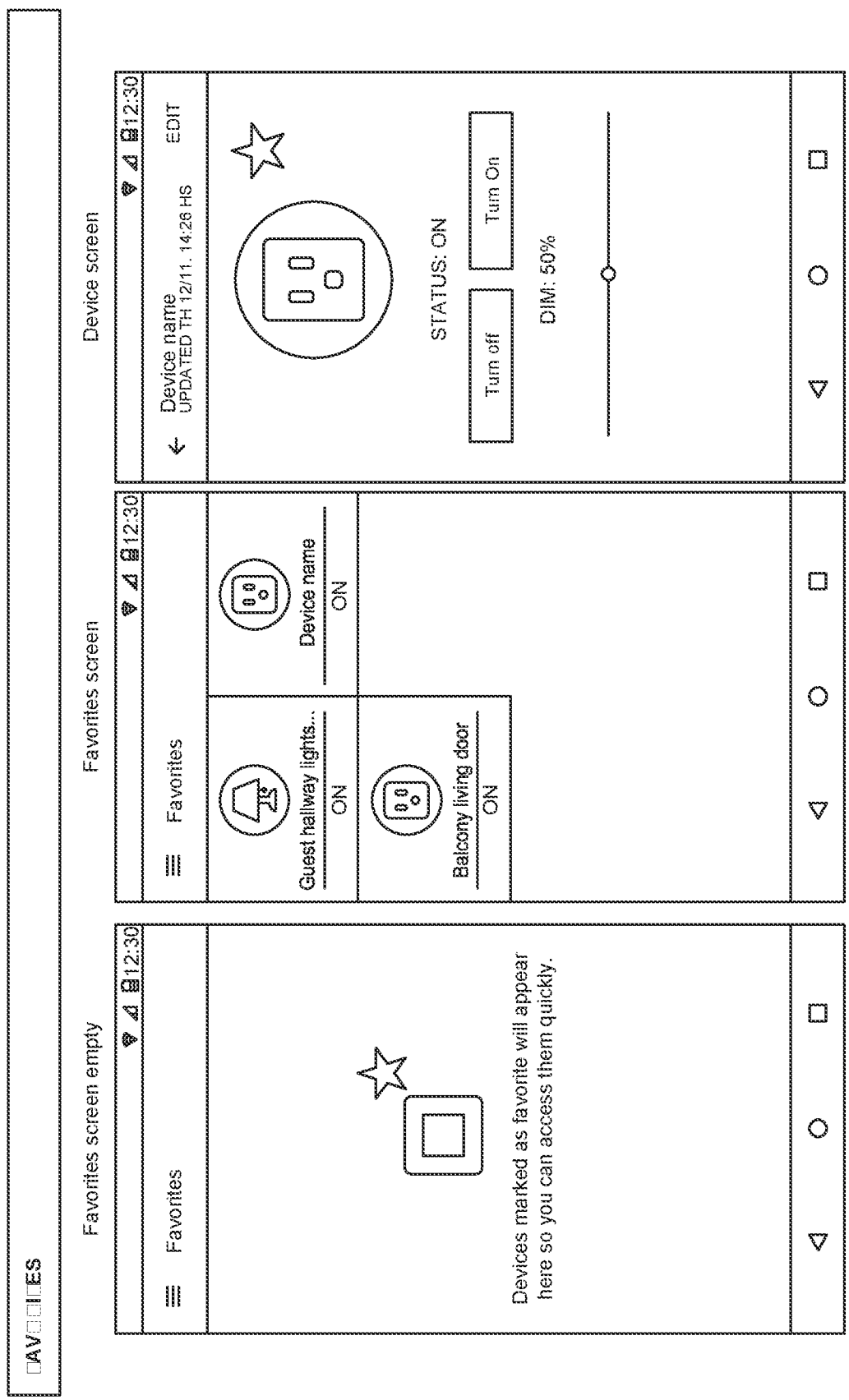
Figure 20Q:
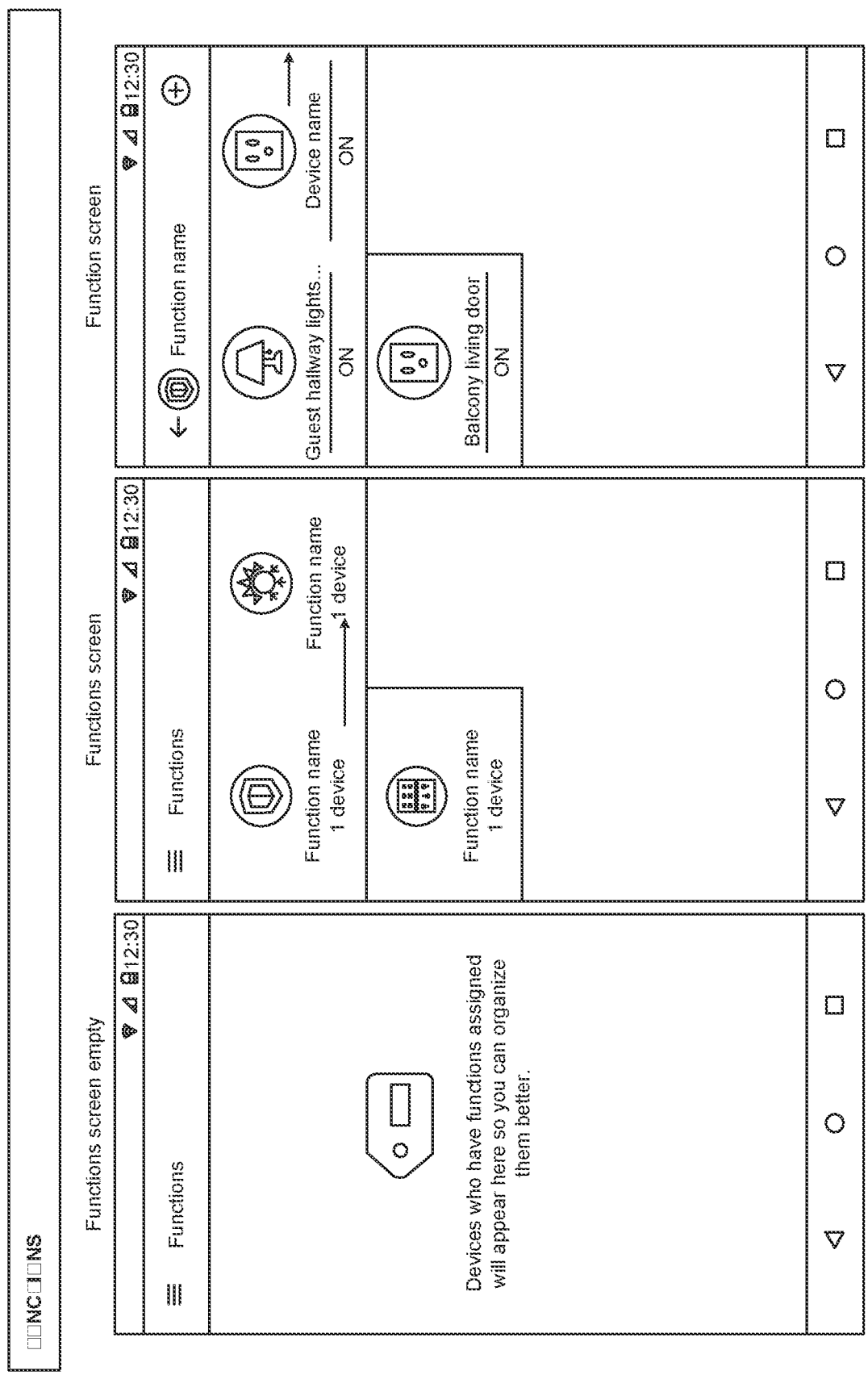
Figure 20R:
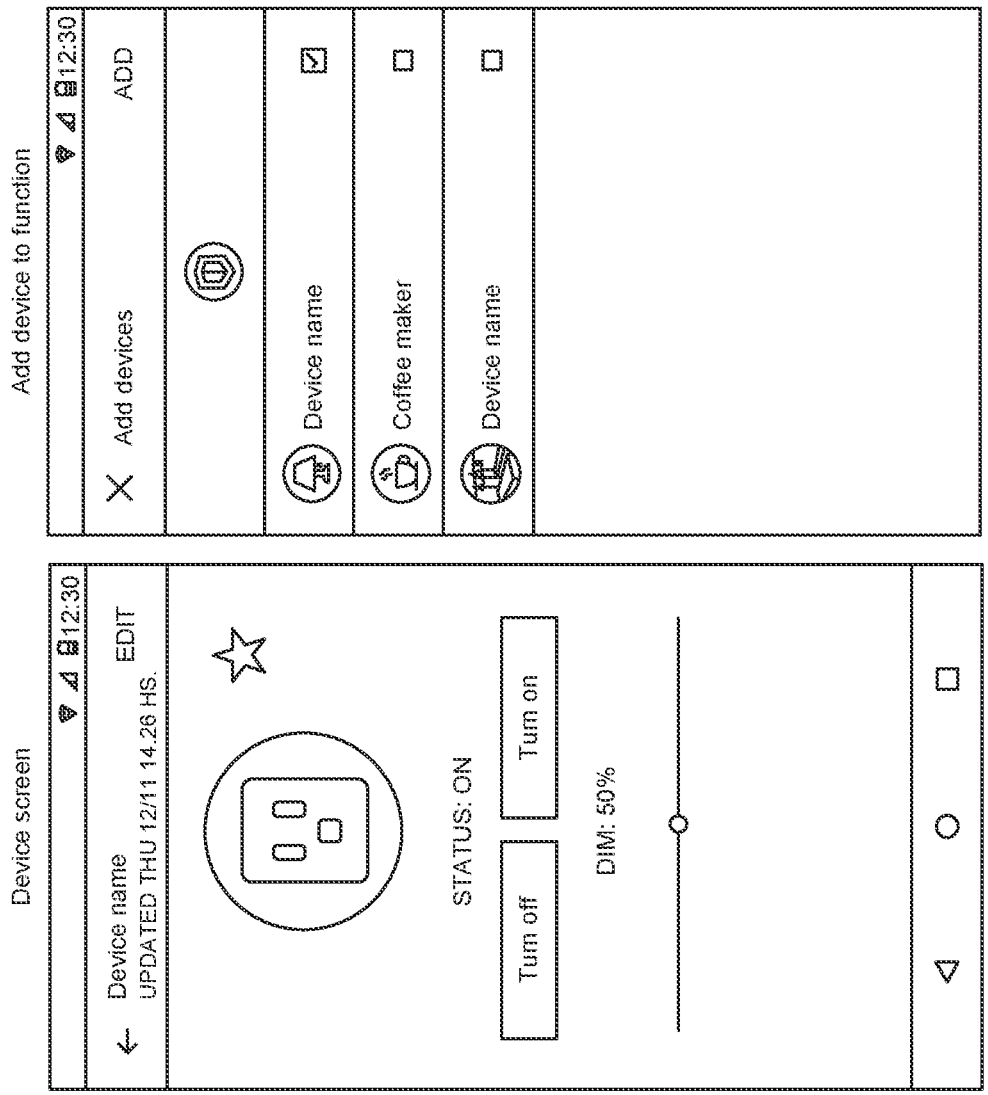
Figure 20S:
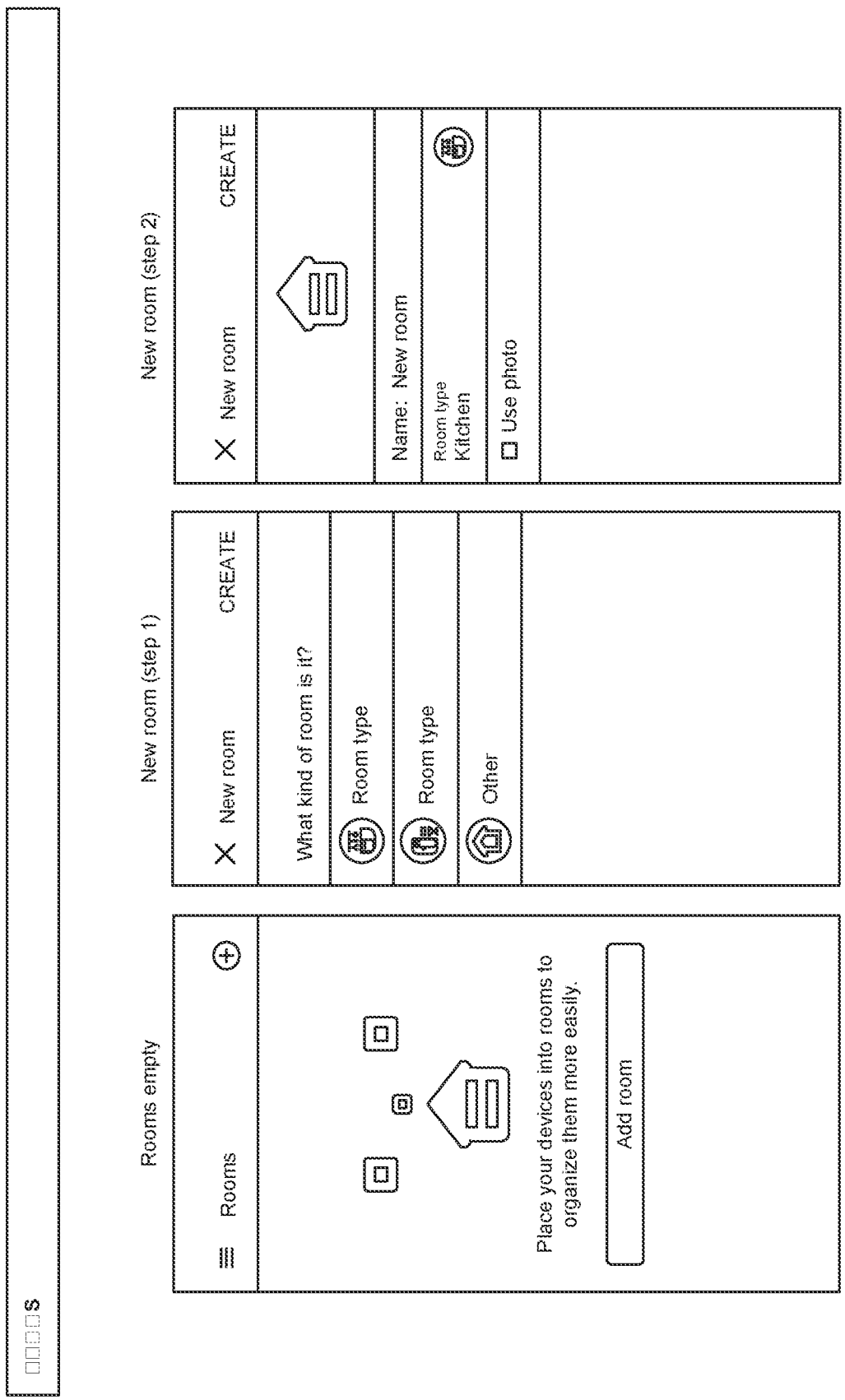
Figure 20T:
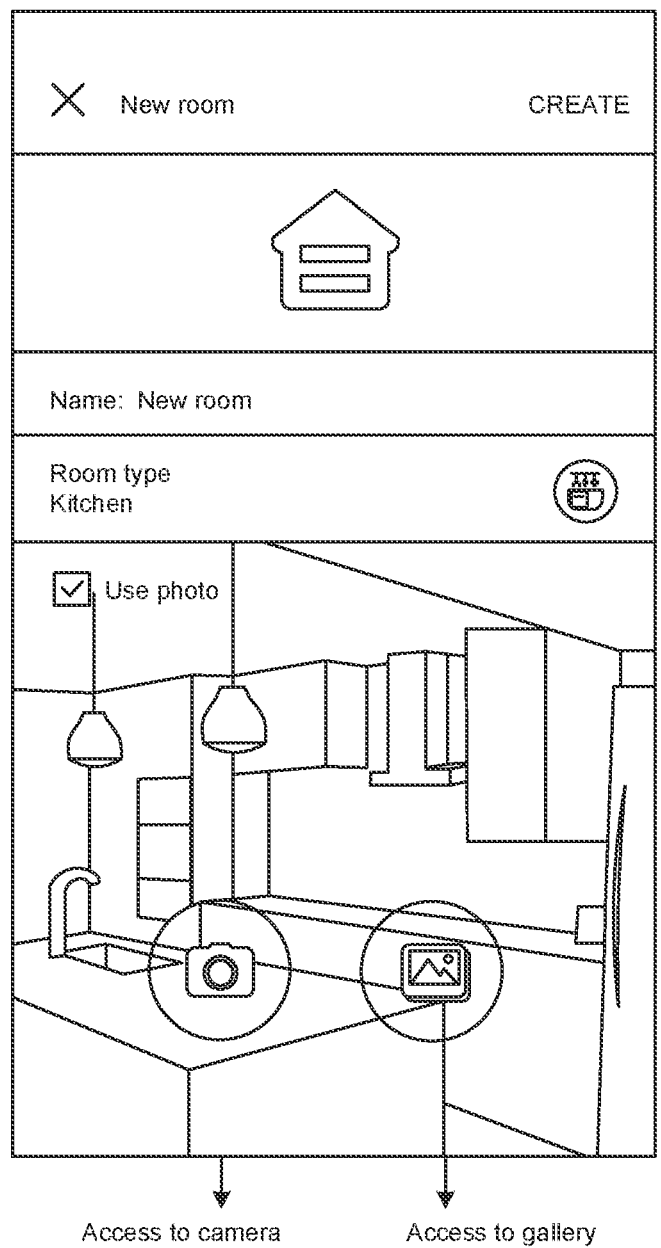
Figure 20U:
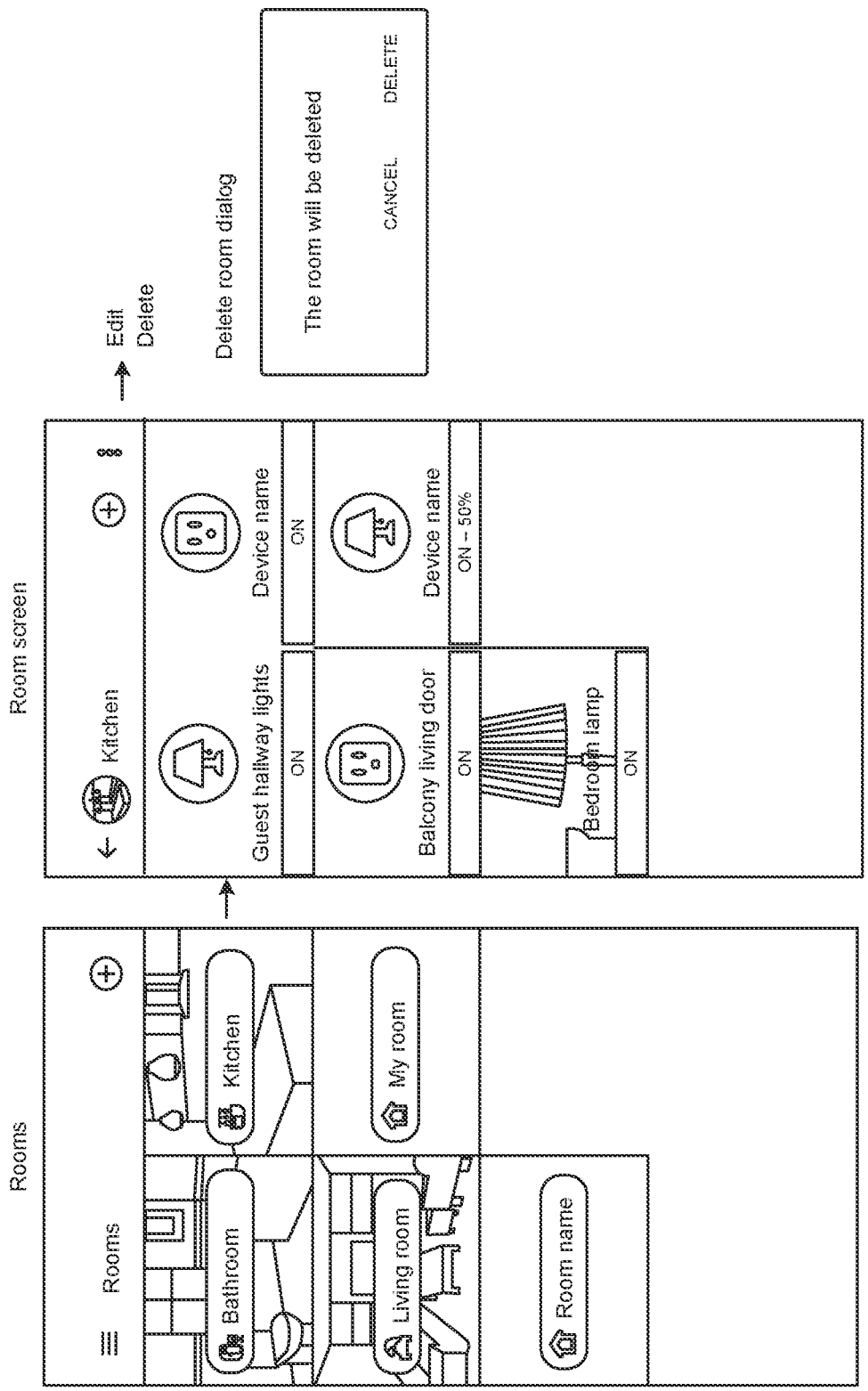
Figure 20V:
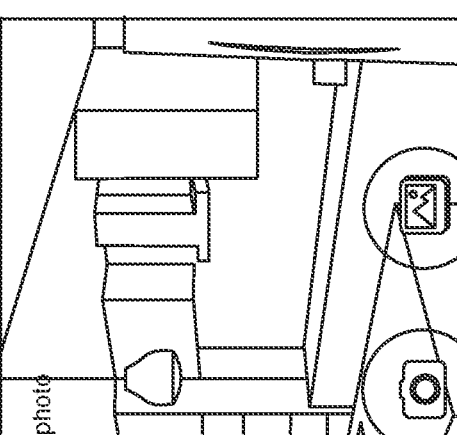
Figure 20W:
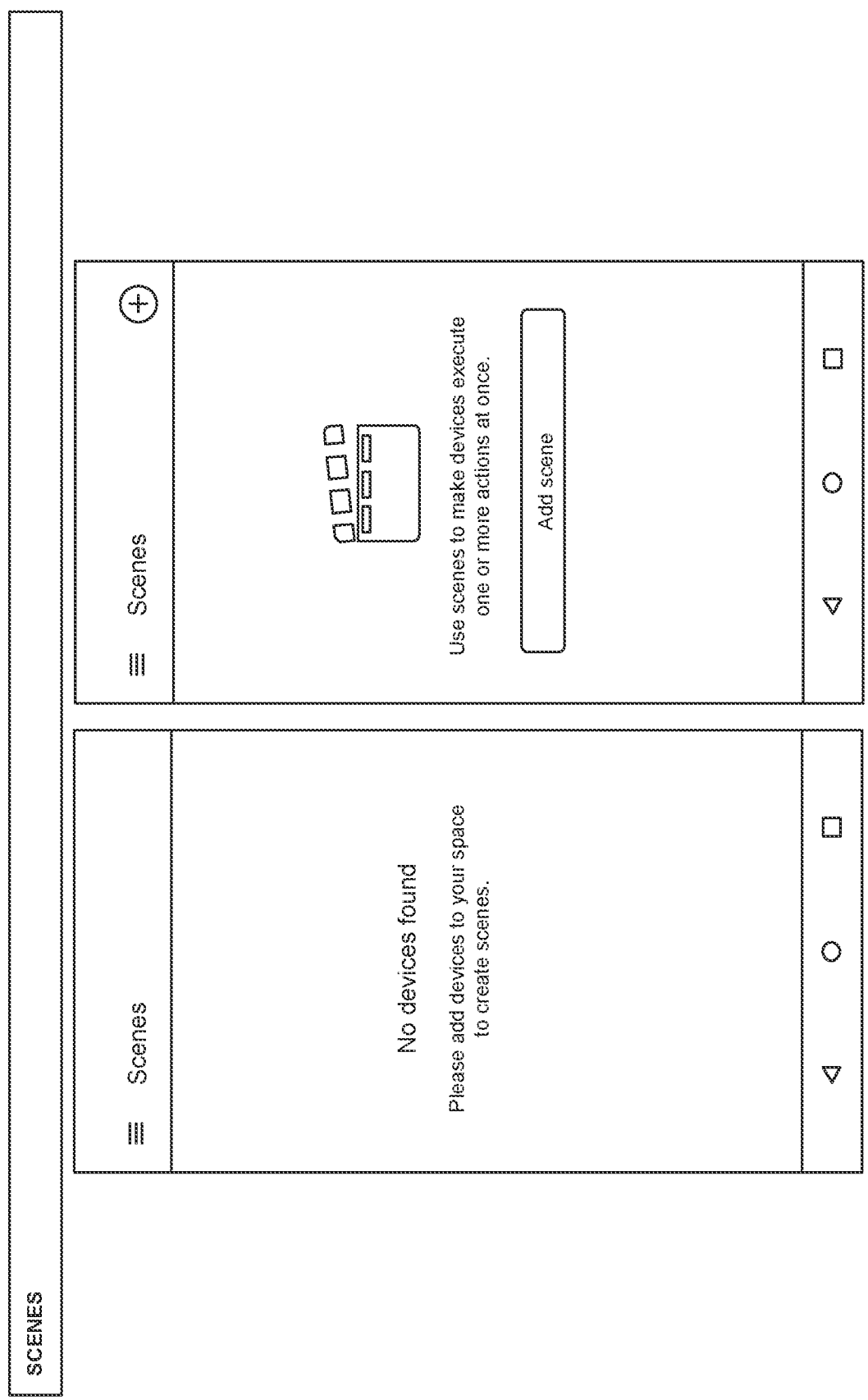
Figure 20Y:
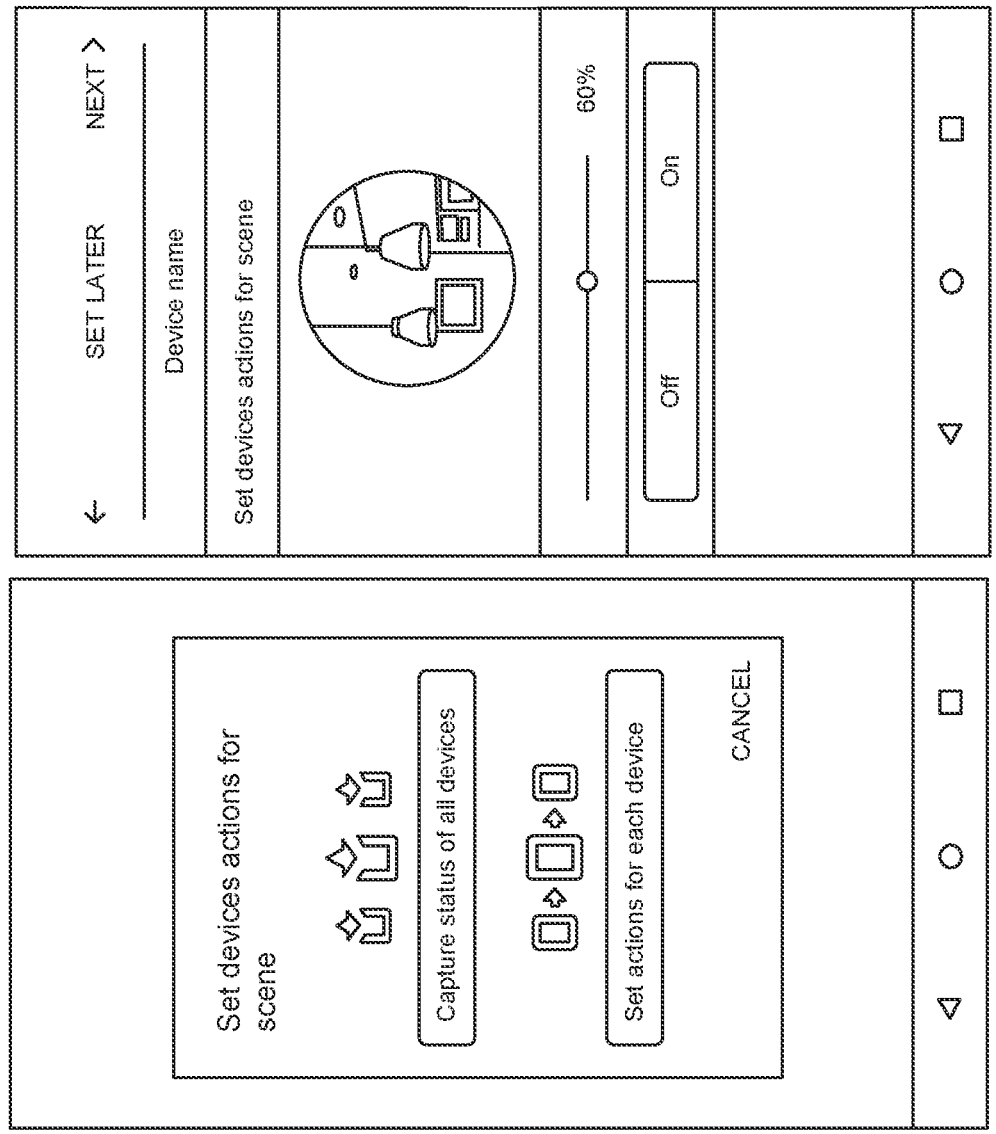
Figure 20B:
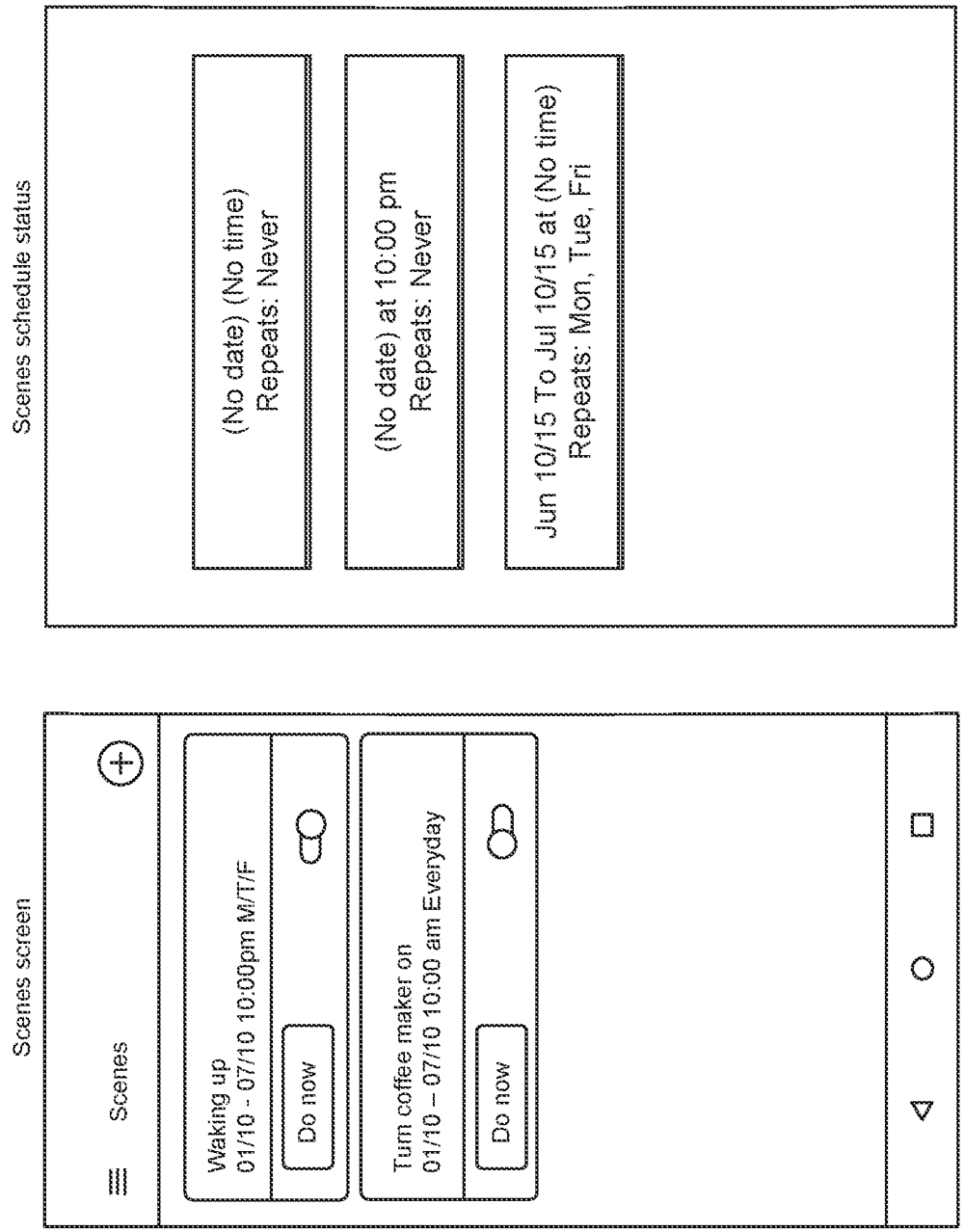
Figure 20C:
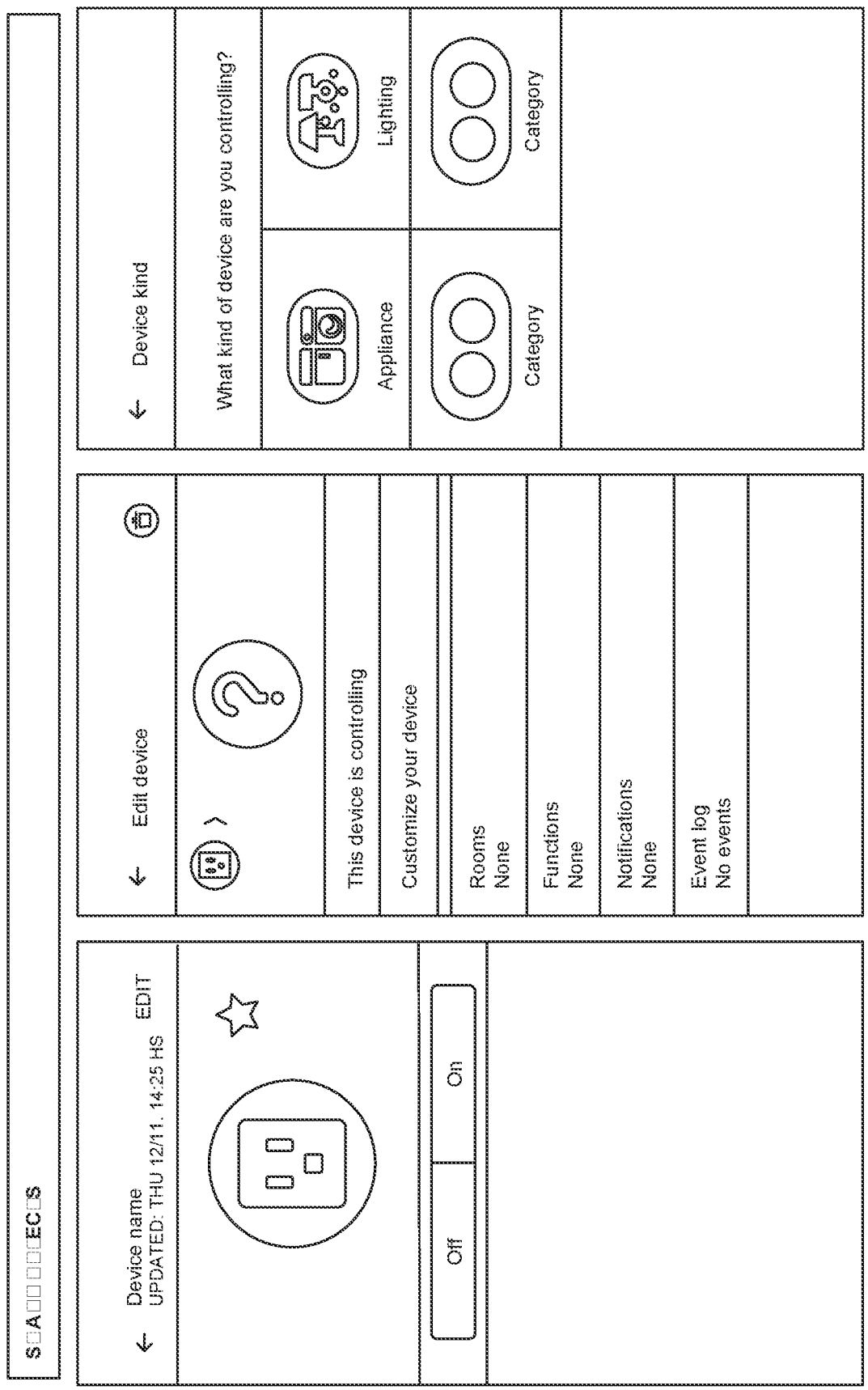
Figure 20E:
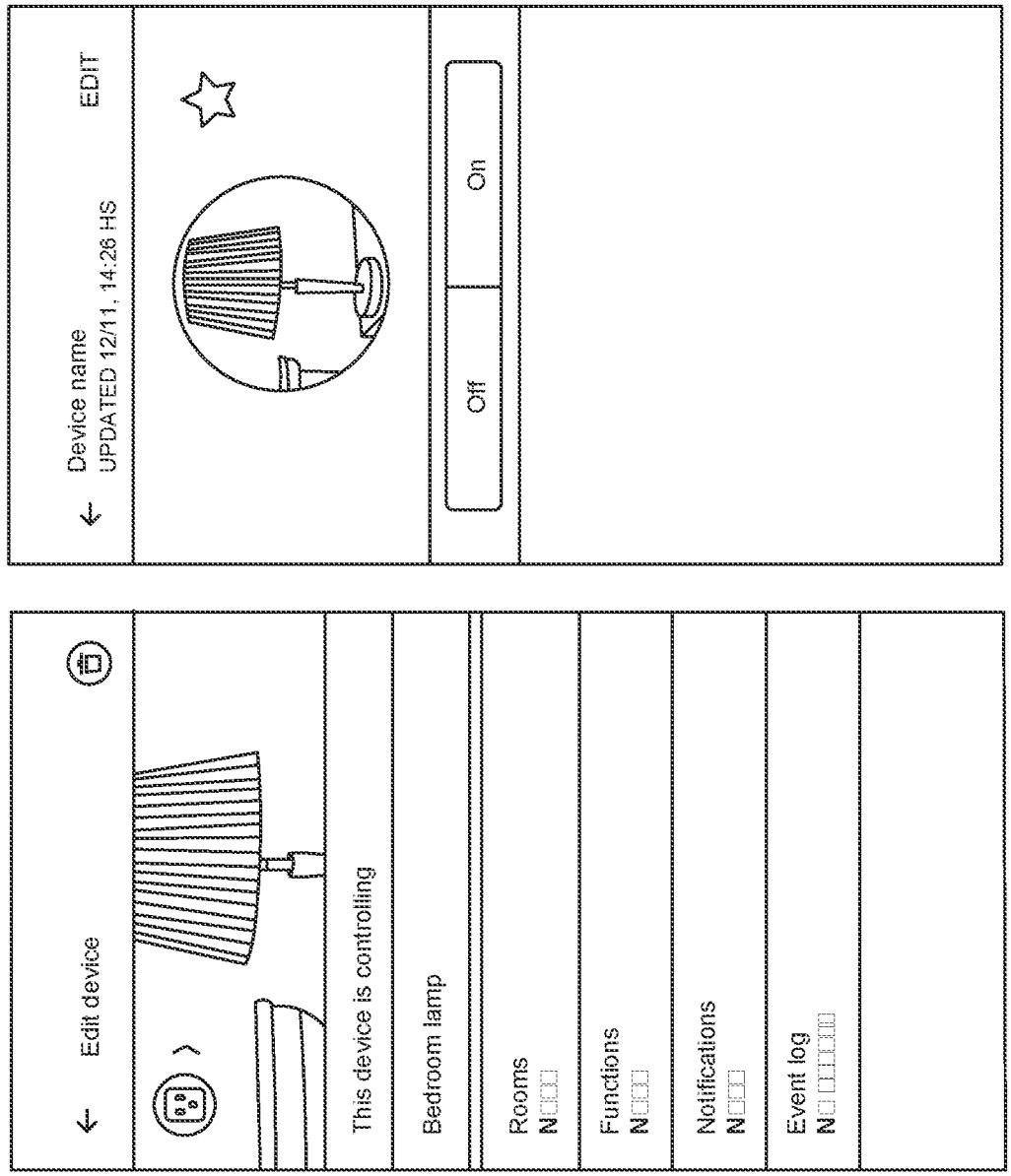
Figure 20F:
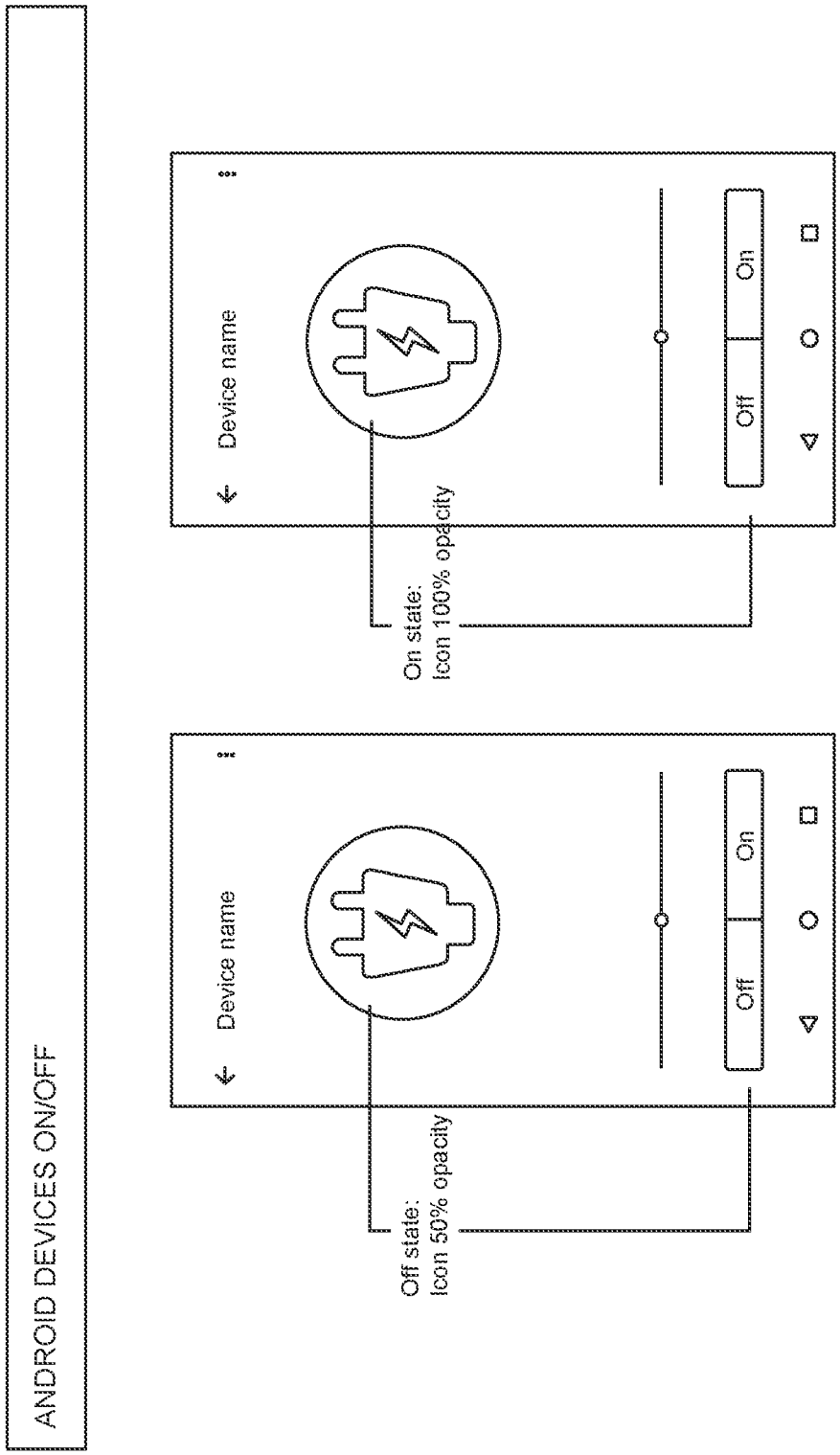
Figure 20G:
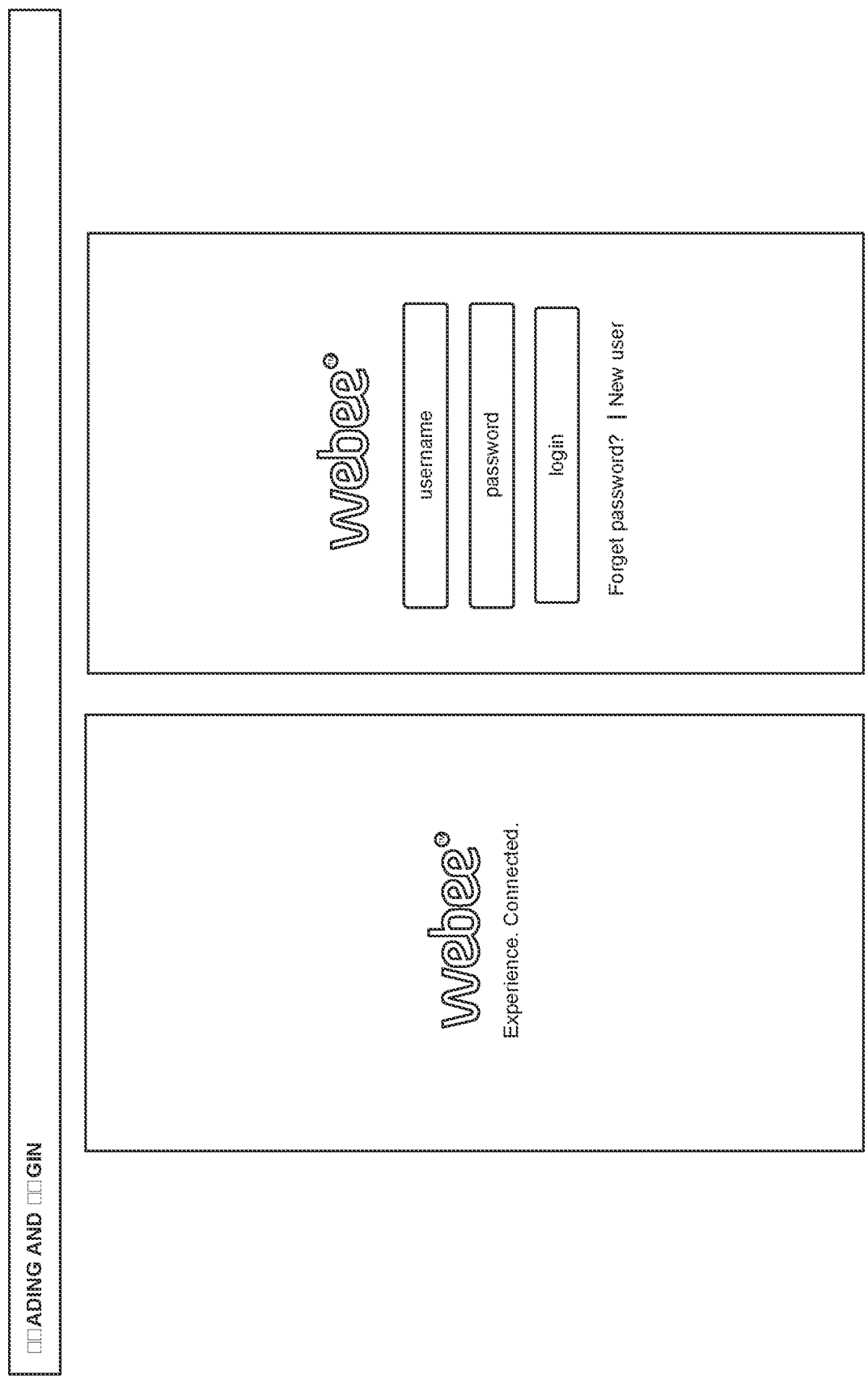
Figure 20I:
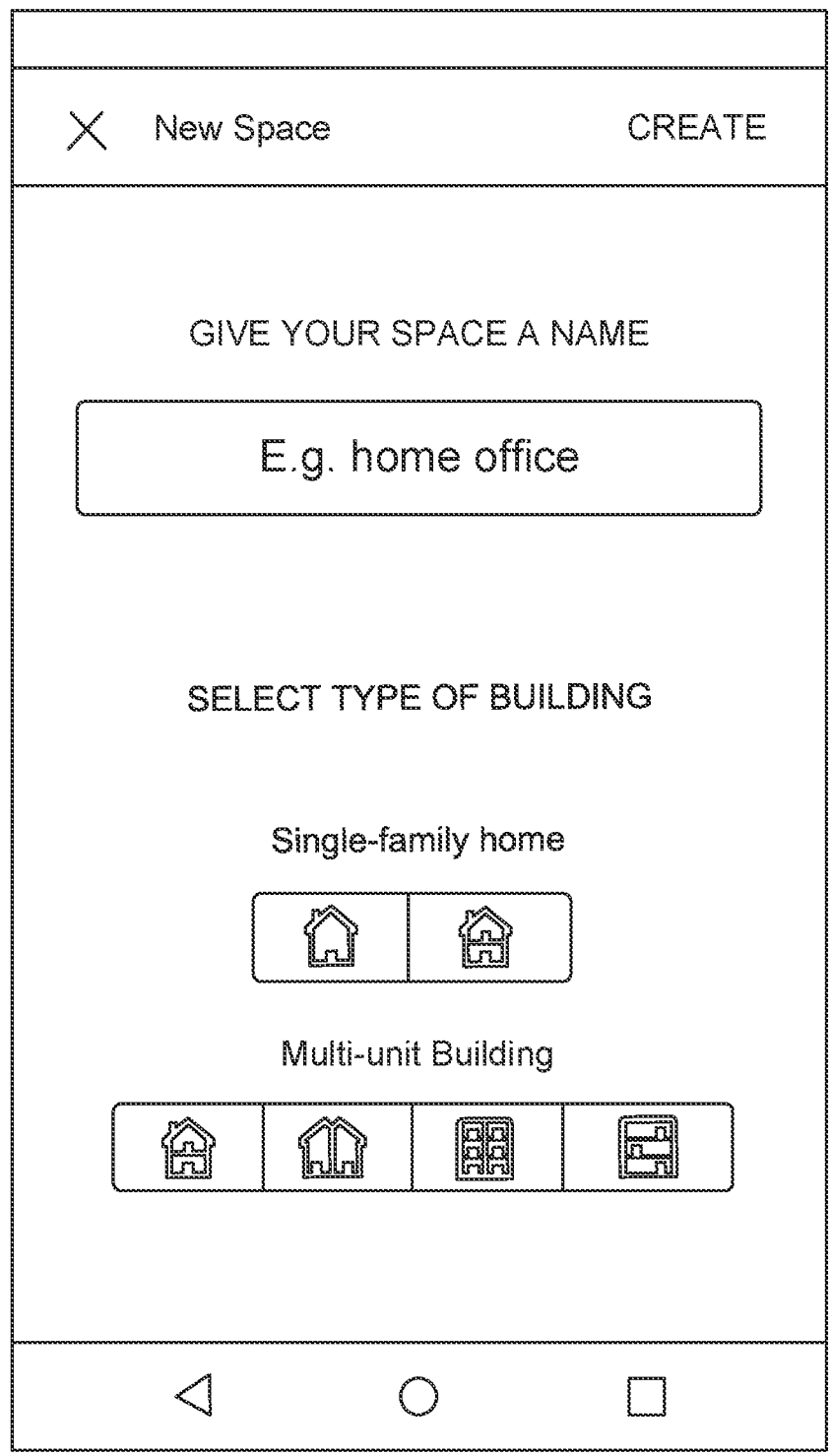
Figure 20J:
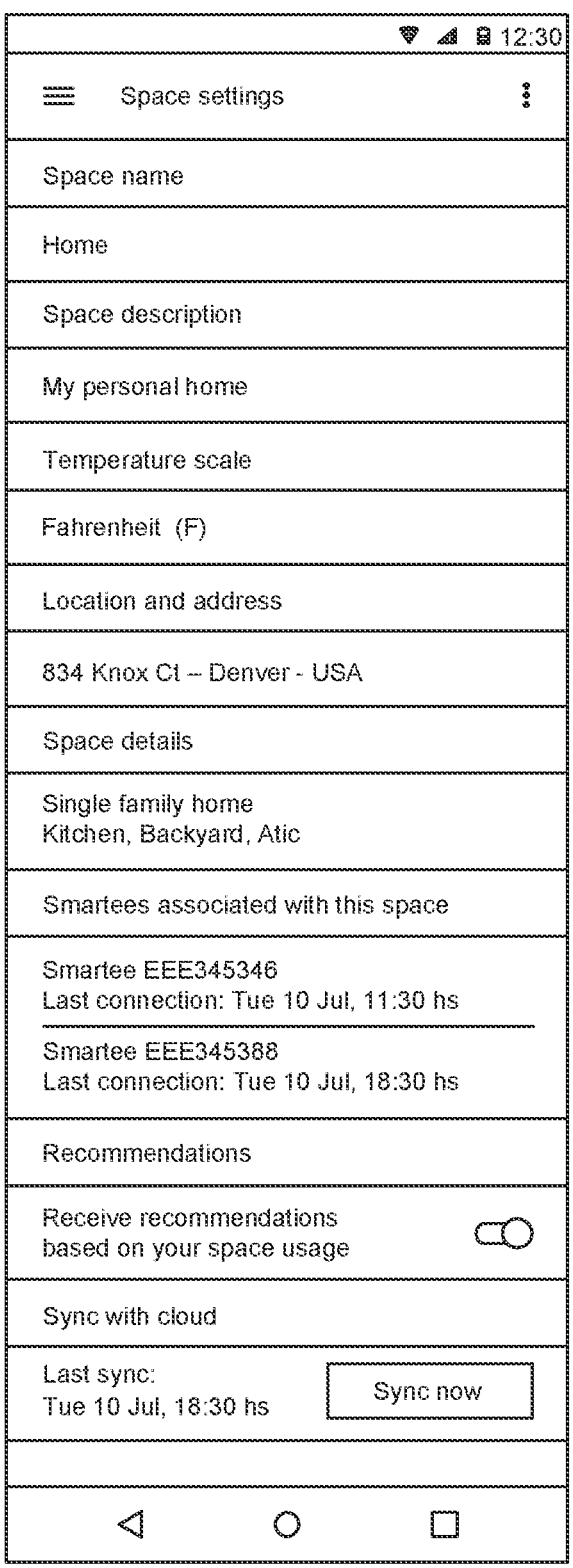
Figure 20L:
Figure 20X:
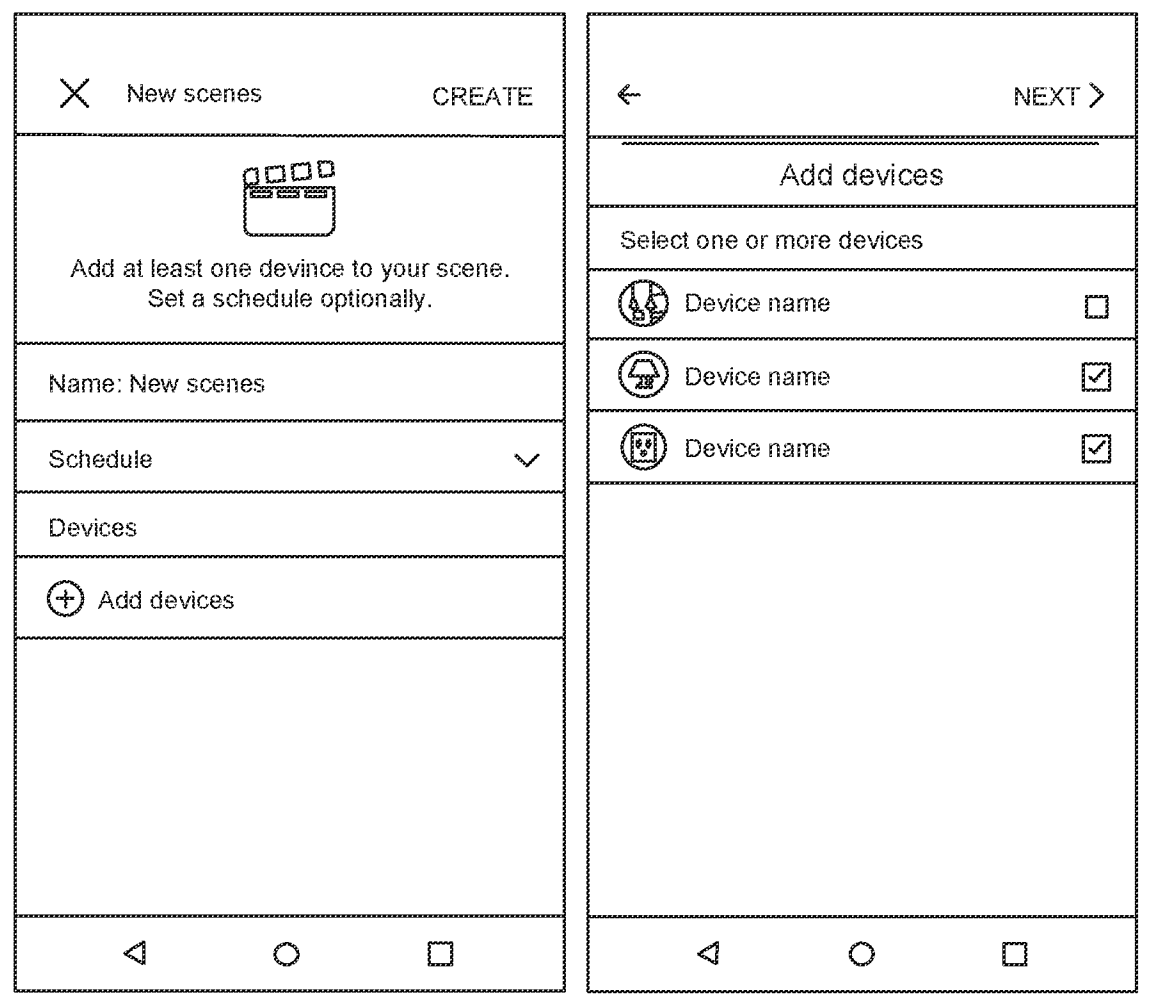
Figure 20Z:
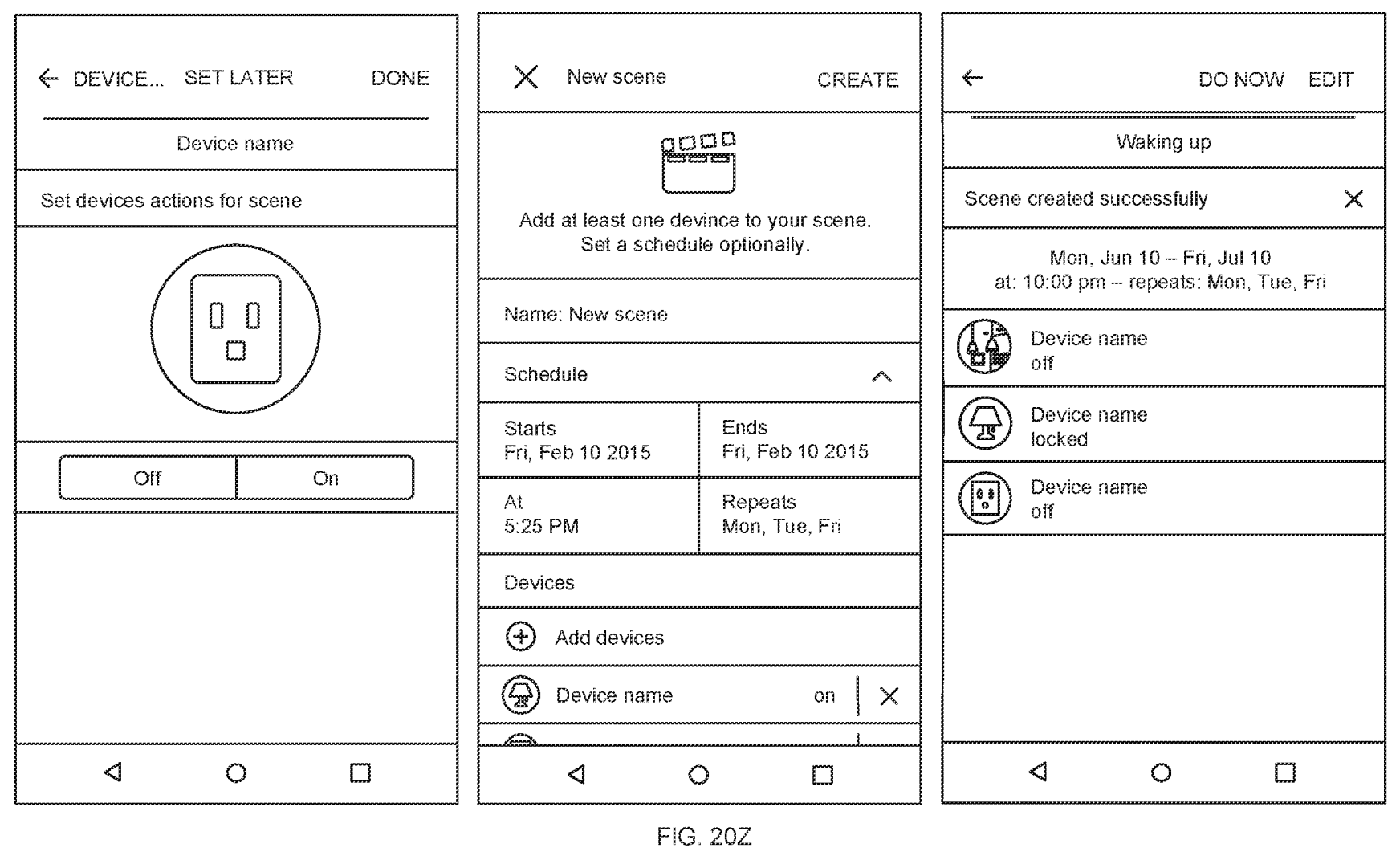
Figure 20N:
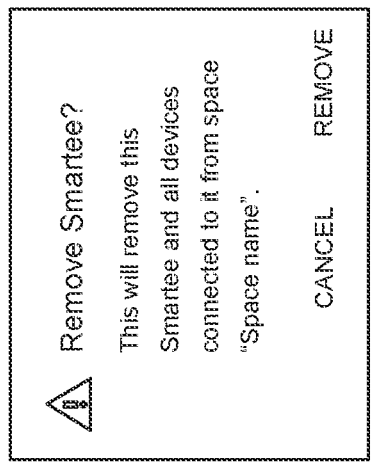
Figure 20N:
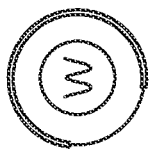
Figure 20O:
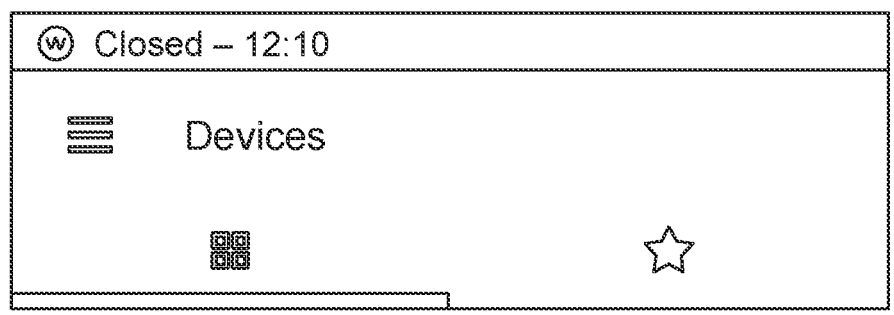
Figure 20O:
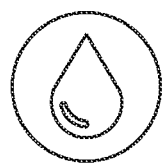
Figure 20O:
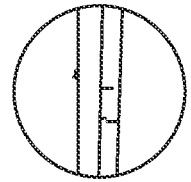
Figure 20O:
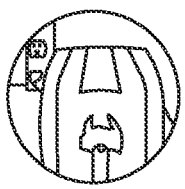
Figure 20O:
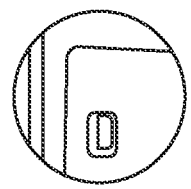
Figure 20O:
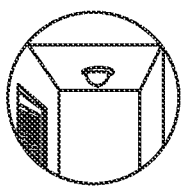
Figure 20O:
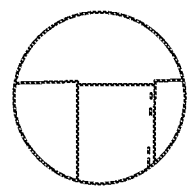
Figure 20O:
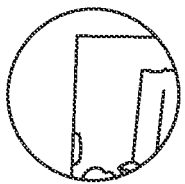
Figure 20O:
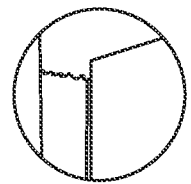
Figure 20P:
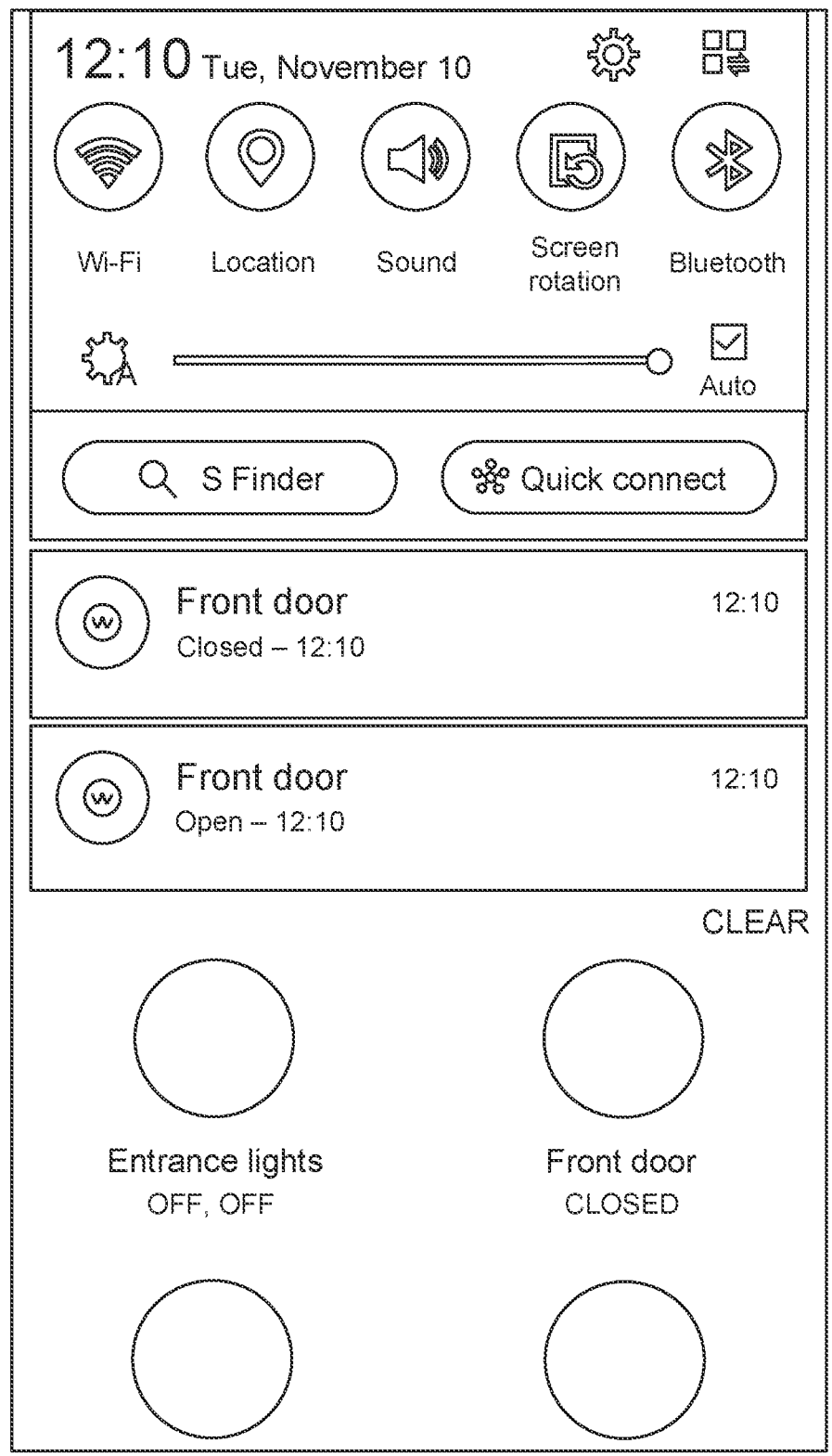
Figure 20Q:
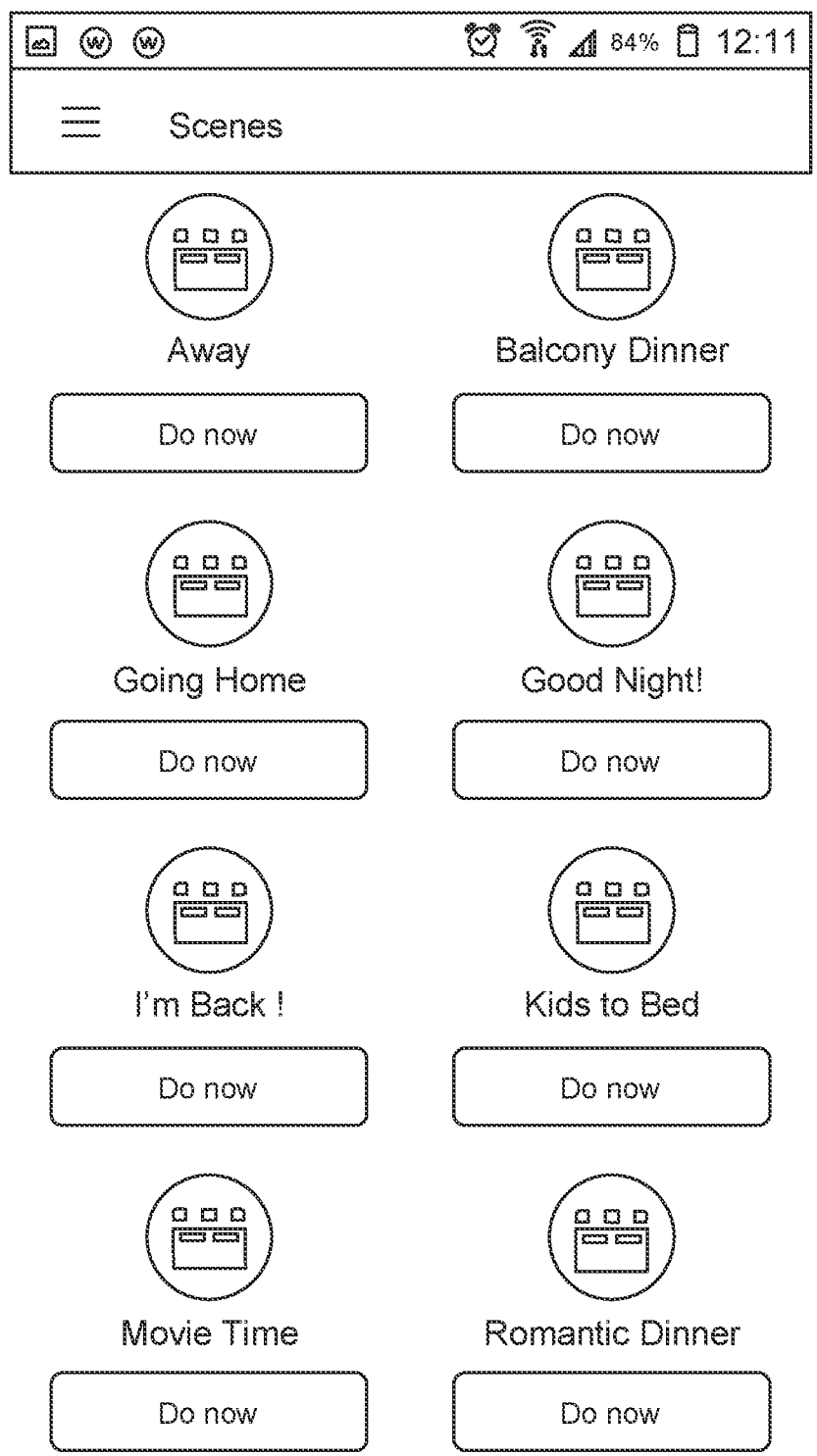
Figure 20R:
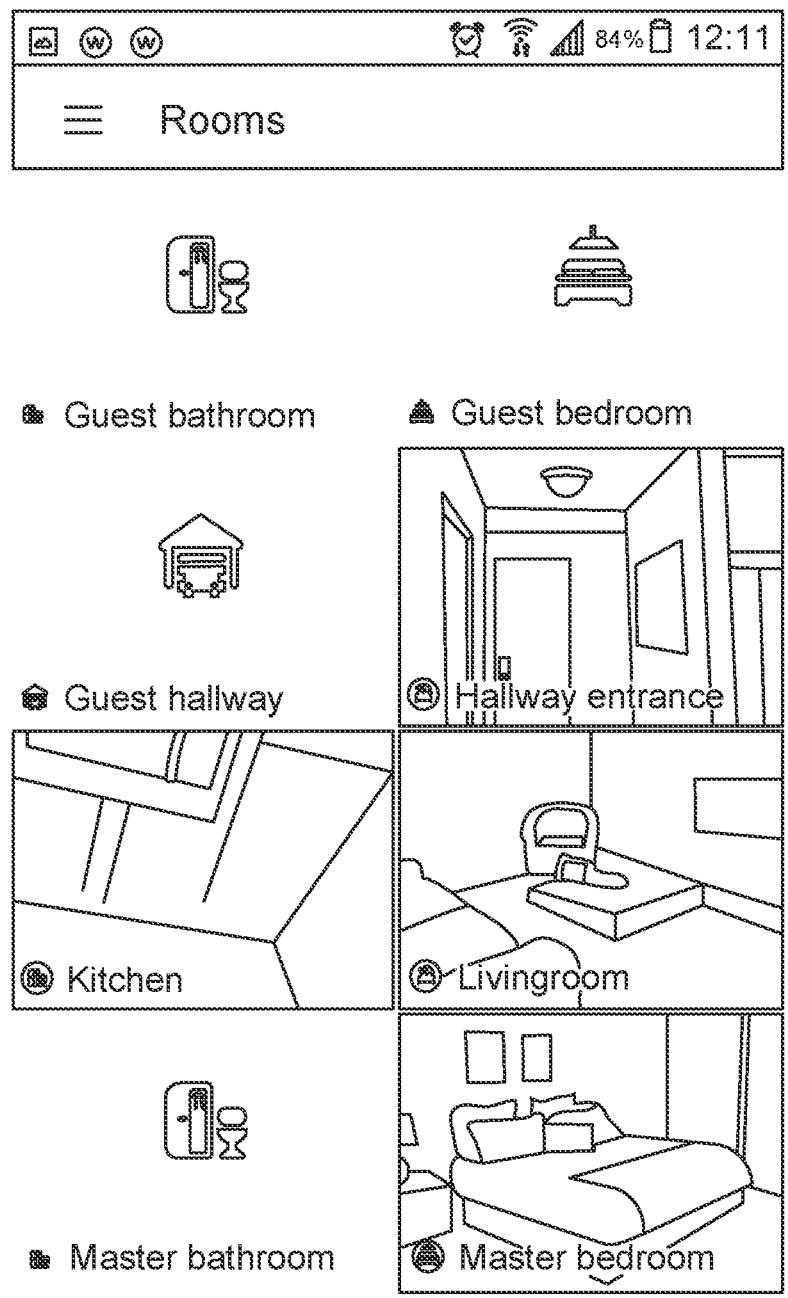
Figure 20S:
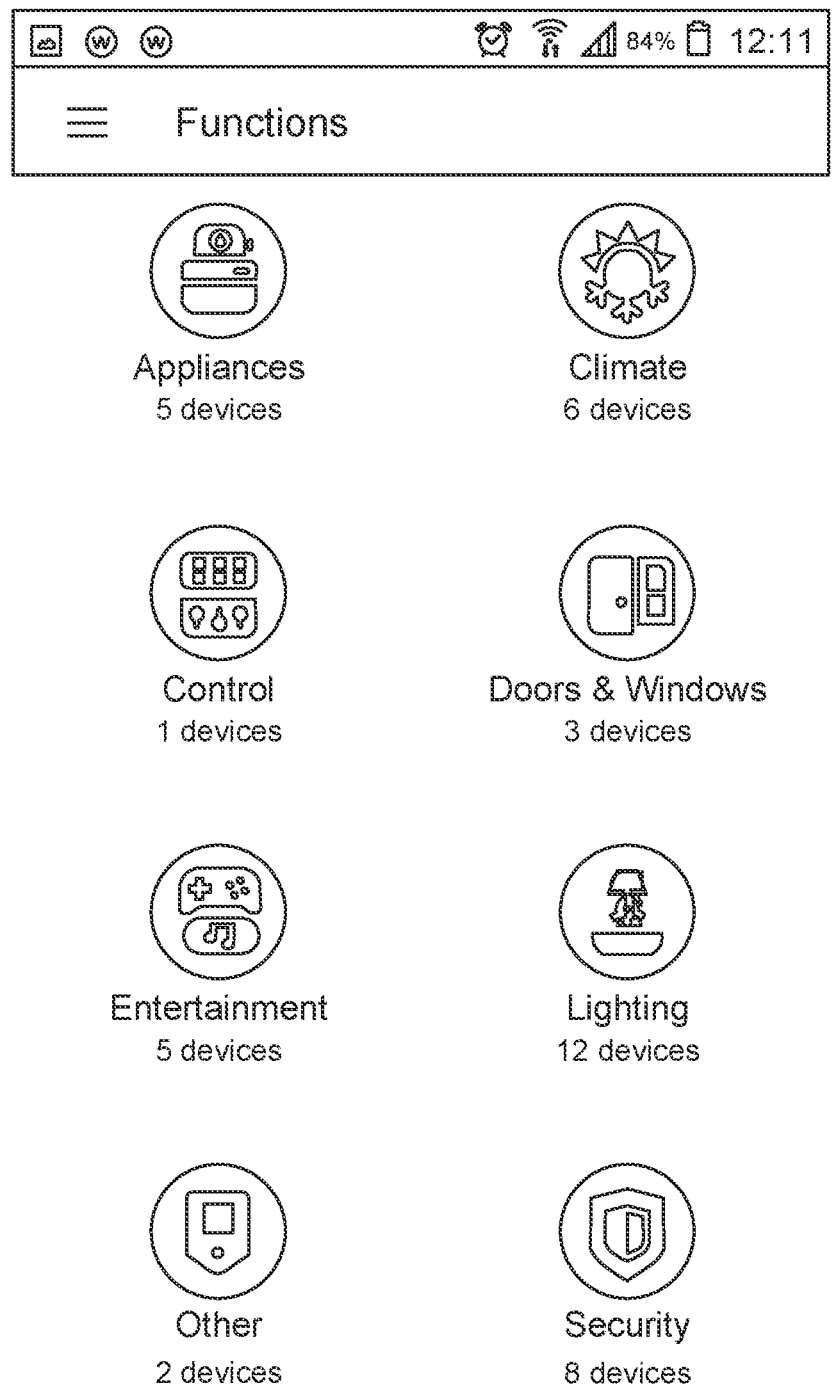
Figure 20T:
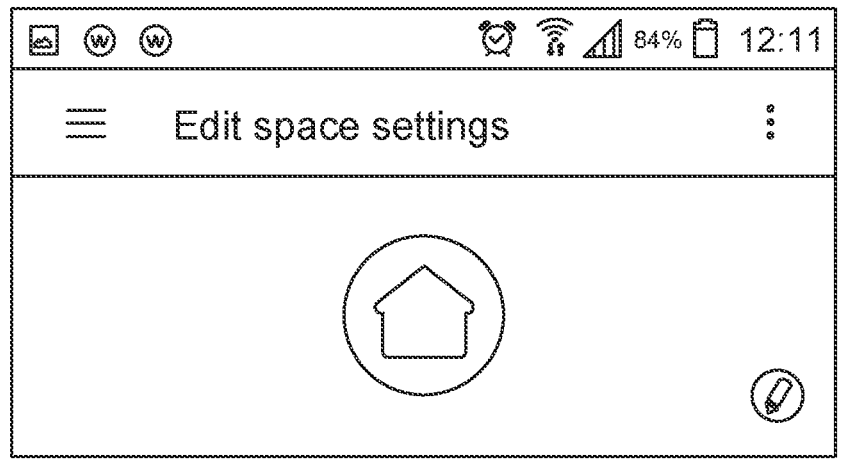
Figure 20T:
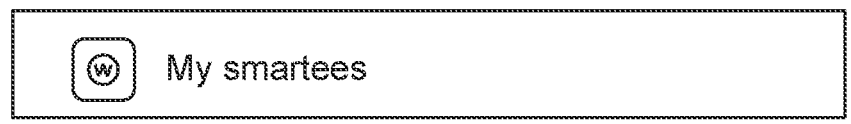

When the system is connected to the Internet it may launch an automatic plug and play registration process. Automatic registration process may begin when the system connects to a local network with Internet connectivity. FIG. 8 shows an example registration process according to an embodiment of the invention, wherein a hub 110 may register with a server 200 and, via mobile app 132/134 and/or web app 136, may be assigned to a smart space. For example app login, see FIG. 20GG-HH. After the system connects to the Internet, it may automatically connect to cloud services and automatically register itself with a registration server. In FIG. 8, the hub 110 may register with the server 200. A mobile app 132/134 may direct the device on which the app is installed to connect to the hub 110 and server 200. A web app 136 may direct the device on which the app is installed to connect to the server 200 and associate an account with the hub 110. After registration, the system may either be added or not added to a space in the cloud. If the user wants to add the system to a cloud space, the user may login to the cloud using an app. Via the app (e.g., the mobile app 132/134), a user may assign the hub 110 to a smart space. When login is on the same network as the system, the application may detect the system via UPnP and may give the user the option to assign the system to a defined space in the cloud. Optionally, if the system is not detected via UPNP, the mobile device application may allow and/or require the user to enter the system MAC address. The registration process may end upon confirmation of the system addition to the application. For an example interface for space creation/editing, see FIGS. 20II-20NN.

Figure 9:
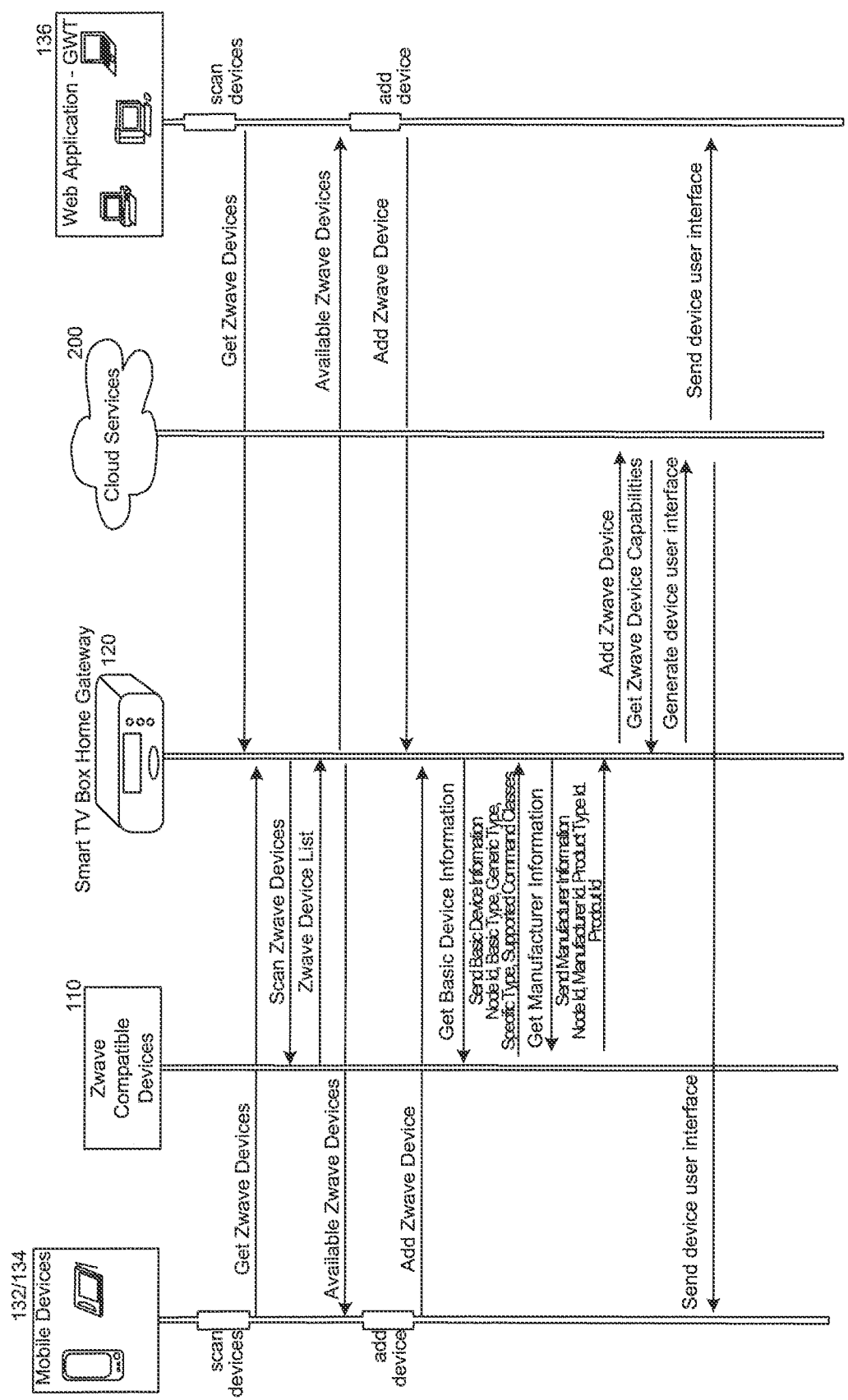
FIG. 9 shows a mapping process according to an embodiment of the invention.
Figure 10:
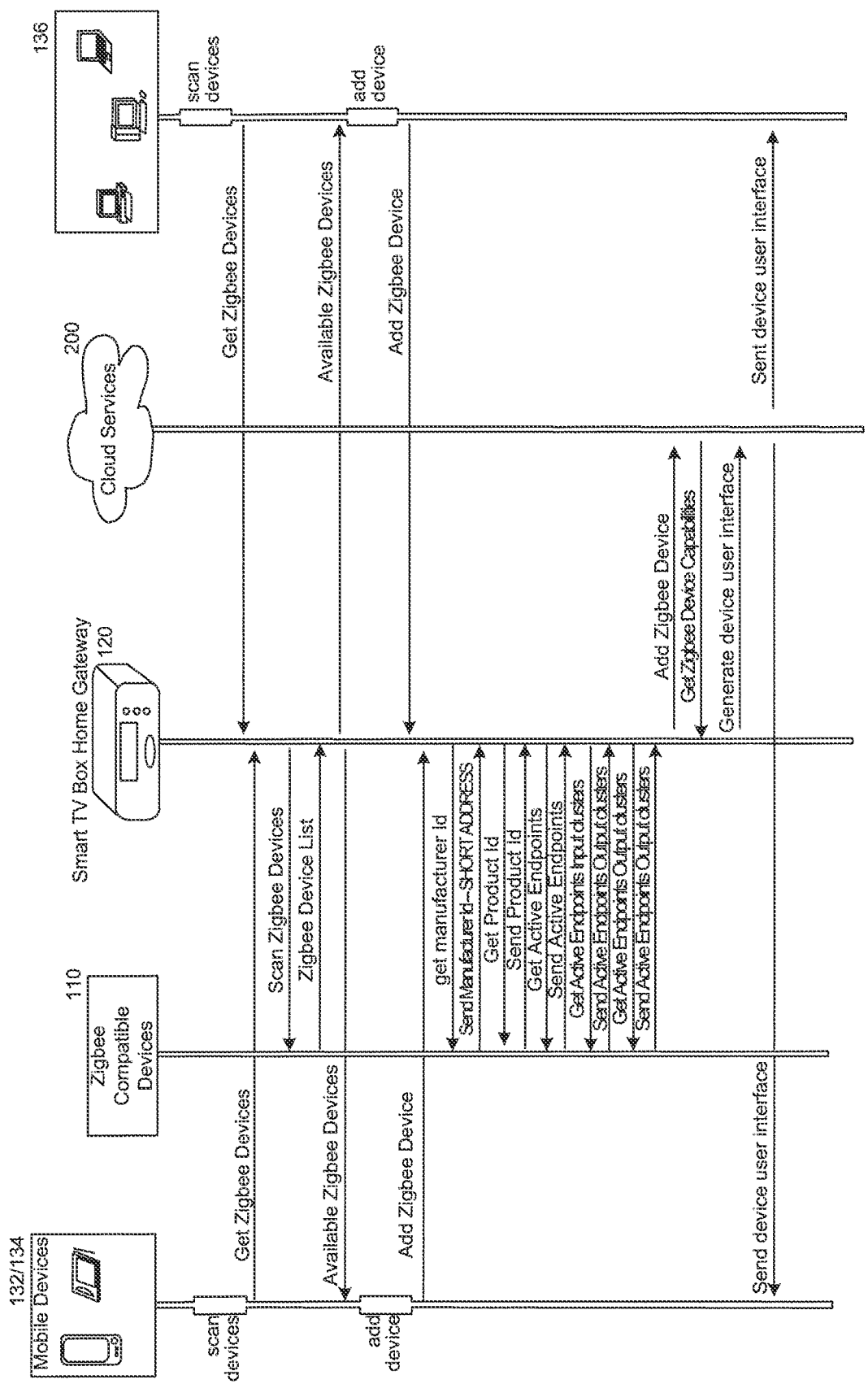
FIG. 10 shows a mapping process according to an embodiment of the invention.

FIGS. 9 and 10 illustrate example device mapping processes according to embodiments of the invention, wherein the hub 110 may discover devices 120 automatically and/or a user, via mobile app 132/134 and/or web app 136, may add devices 120. For an example of a user interface for adding devices 120, see FIG. 20A-20B. For an example of a user interface for editing devices 120, see FIG. 20J-200. A set of networking protocols may be installed as part of the system software/firmware that may permit networked devices, such as personal computers, printers, Internet gateways, Wi-Fi access points, mobile devices, or any enterprise-class devices to seamlessly discover each other's presence on the network and establish functional network services for data sharing, communications, and/or entertainment. For example, the protocol may be a Universal Plug and Play (UPnP) protocol.

In FIG. 9 in 901, a user (via app 132-136) may direct the hub 110 to scan for zwave devices. In 902, devices 120 may respond to the hub 110, and in 903 the hub 110 may request confirmation of the devices 120 from the user, or in some cases devices may be set up automatically without the interaction of the user and the hub 110 may scan automatically. The user may confirm to the hub 110 that the devices 120 should be added (via app 132-136) in 904. If the add device process is being performed automatically, the user may be able to delete devices that they don't want in the network. In 905, the hub 110 may communicate with each device 120 to be added, asking for and receiving basic device information and manufacturer information. In 906, the hub 110 may report the received information to the server 200, which may return the device 120 activities to the hub 110 in 907, allowing the hub to control the device 120. Additionally, in 908 the server 200 may generate a user interface for the device 120 and send the user interface to the app 132-136 in 909.

In FIG. 10 in 1001, a user (via app 132-136) may direct the hub 110 to scan for ZigBee devices. In 1002, devices 120 may respond to the hub 110, and in 1003 the hub 110 may request confirmation of the devices 120 from the user, or in some cases devices may be set up automatically without the interaction of the user and the hub 110 may scan automatically. In 1004, the user may confirm to the hub 110 that the devices 120 should be added (via app 132-136. If the add device process is being performed automatically, the user may be able to delete devices that they don't want in the network. in 1005, the hub 110 may communicate with each device 120 to be added, asking for and receiving manufacturer ID, product ID, active endpoints, active endpoint input clusters, and active endpoint output clusters. In 1006, the hub 110 may report the received information to the server 200, which may return the device 120 activities to the hub 110 in 1007, allowing the hub to control the device 120. Additionally, in 1008 the server 200 may generate a user interface for the device 120 and send the user interface to the app 132-136 in 1009.

The system may automatically start discovering devices in different networks like LAN (through Ethernet or Wi-Fi and different protocols like upnp/dlna), ZigBee, zwave, thread, homekit, etc. The system may perform an intelligent discovery and mapping process, whereby the system may add devices locally and then push the configuration to the cloud. The configuration and auto-joining and programming may be cloned into the client's smartphones, tablets, computers, etc.

When the networks needs specific security processes (for example zwave door locks) for discovering network devices, the system may establish secure connections and protocols to perform the discovery/mapping process. In lieu of automation, an event (physical button in devices, mobile apps, web apps, etc.) trigger may be required by the system to finalize the mapping/discovery process.

The intelligent mapping software may discover devices and communication protocols from third party vendors to integrate with the system. The discovery may be accomplished through the hub 110 and server 200 communicating with the devices 120 and checking the received data against known device API data, for example. The intelligent mapping software of the integration module may automatically load the devices' characteristics to the system. Additionally, the integration module may automatically back up the data to cloud. Moreover, the intelligent mapping software may generate automatic hardware handlers. These handles may be stored and used by different modules to communicate and control with these devices.

FIG. 9 illustrates a Zwave Intelligent Mapping Process in accordance with an embodiment. The process may involve triggering the system to scan devices available in the ZWave network and adding the device to the system ZWave network. Once a ZWave compatible device is added to the same network as the system, the system may get basic information from the device.

Next, the system may send the command "get manufacturer information" with the "Node Id". This may return the manufacturer information response from the network. The process may create a unique identifier for each new device detected. For example, the unique identifier may include a product type ID and/or a serial number of the device. The information obtained from the Zwave device may include serial number, manufacturer information, and commands supported by the device, for example. The machine learning algorithms may apply the information gathered, detect the devices' capabilities, and use the automatic user interface generation to produce the user interface for the device automatically.

FIG. 10 illustrates a Zigbee Intelligent Mapping Process in accordance with an embodiment. A trigger from a mobile device and/or web application may command the system to scan devices available in the Zigbee network and add detected devices to the gateway. The system may query manufacturer identity from the ZigBee compatible device. In case the device is not recognized after acquiring the data, the system may send a query to the device's active endpoints and receive a list of the active endpoints from the device. After getting the list of the device's active endpoints, the system may send a request to the input clusters and output clusters of each endpoint to get a list of all clusters in each endpoint. This may provide the device type, the endpoint's functionality, and commands supported by the endpoint. After gathering the aforementioned information, machine learning algorithms may be applied to the information. The machine learning may further detect the device's capabilities and may use the automatic user interface generation to produce the user interface for the device automatically.

Figure 11:
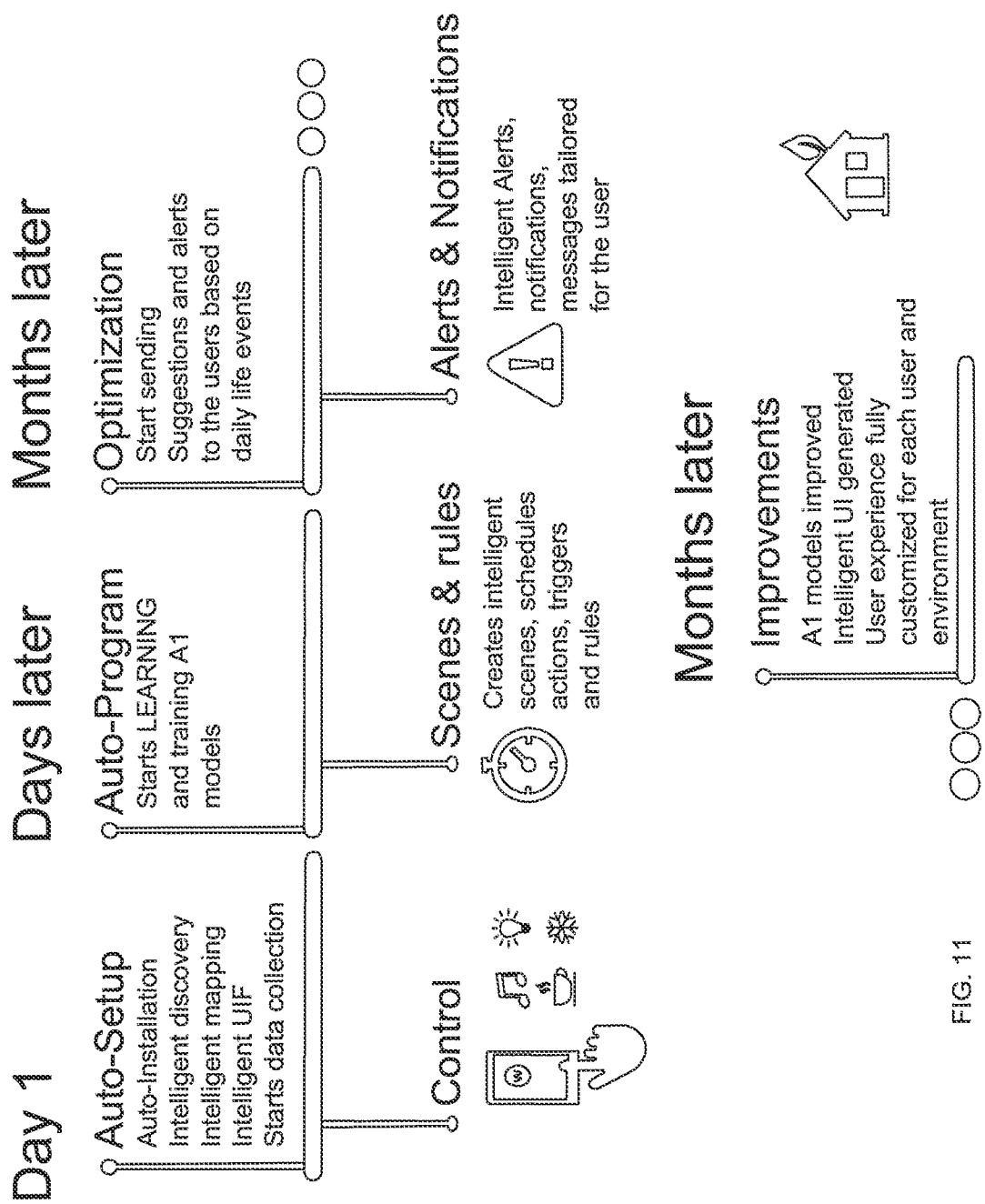
FIG. 11 shows a learning schedule and AI algorithm according to an embodiment of the invention.
Figure 12A:
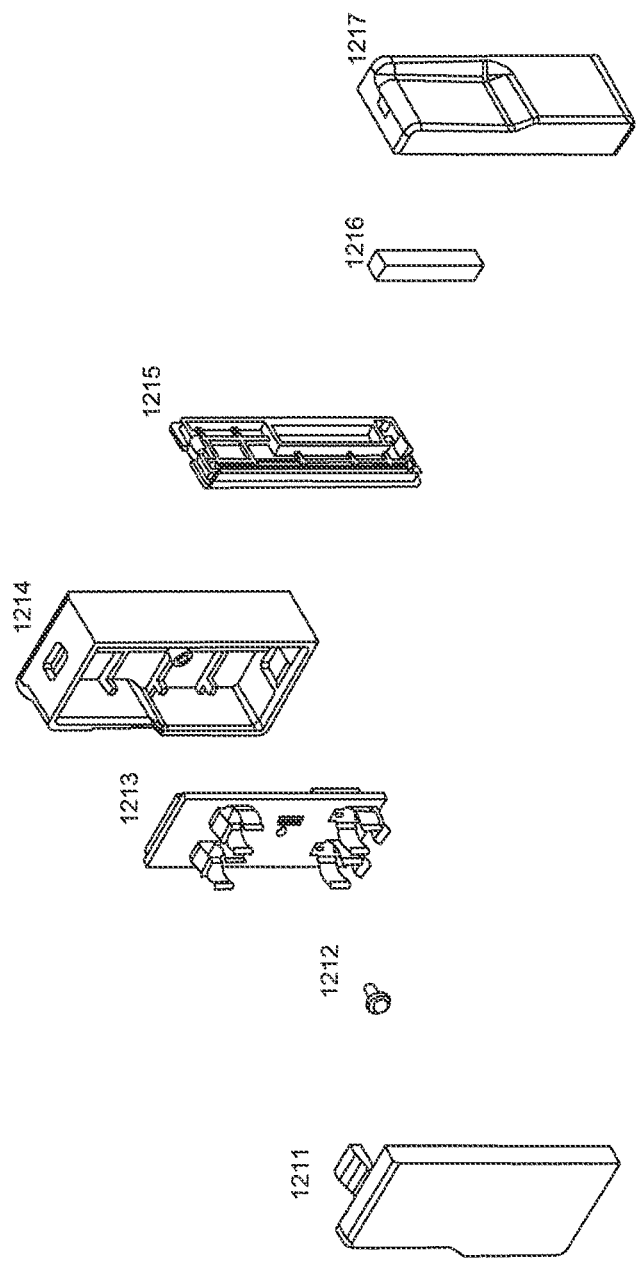
FIGS. 12A-12E show smart objects according to an embodiment of the invention.
Figure 12B:
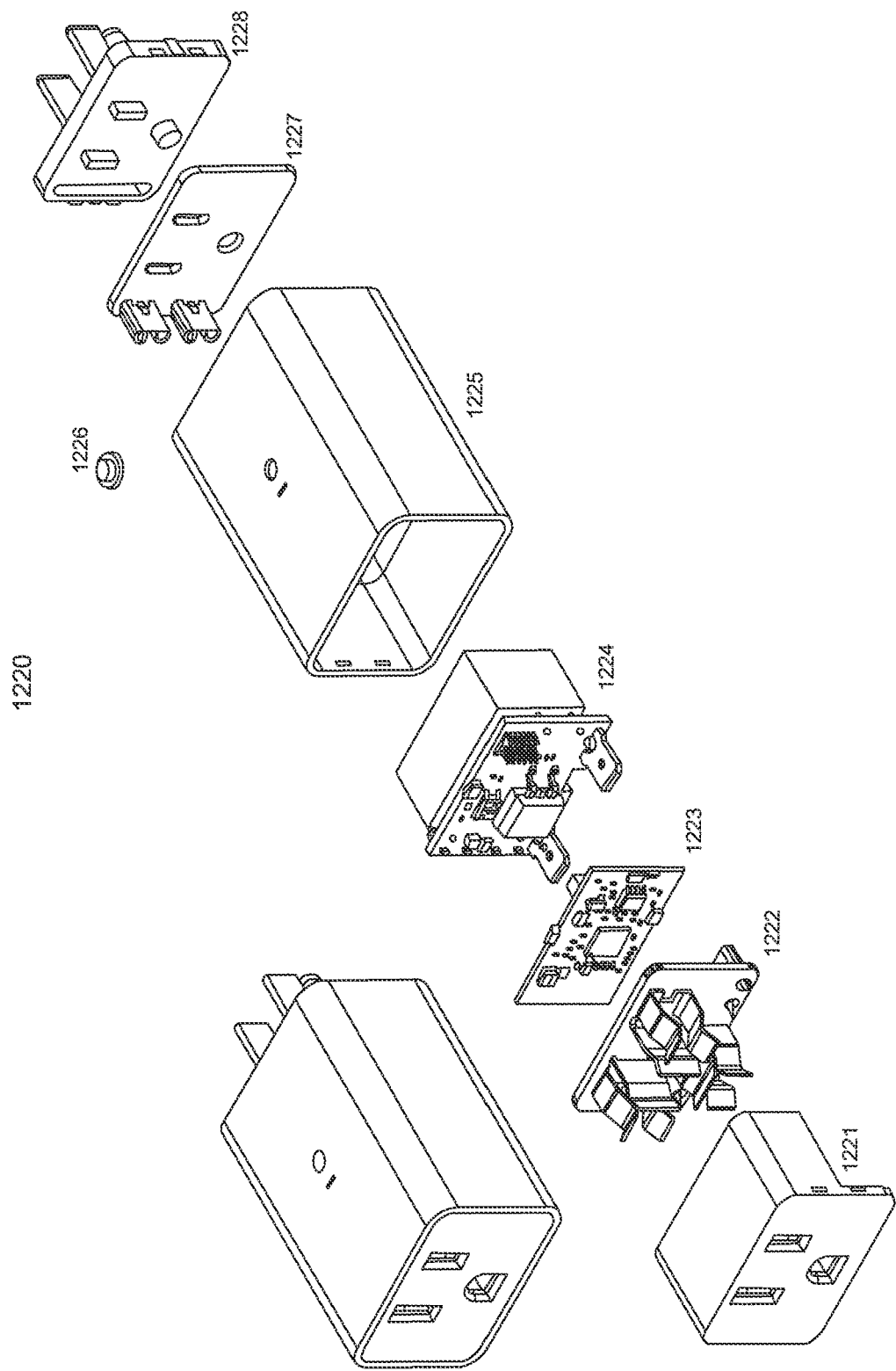
Figure 12C:
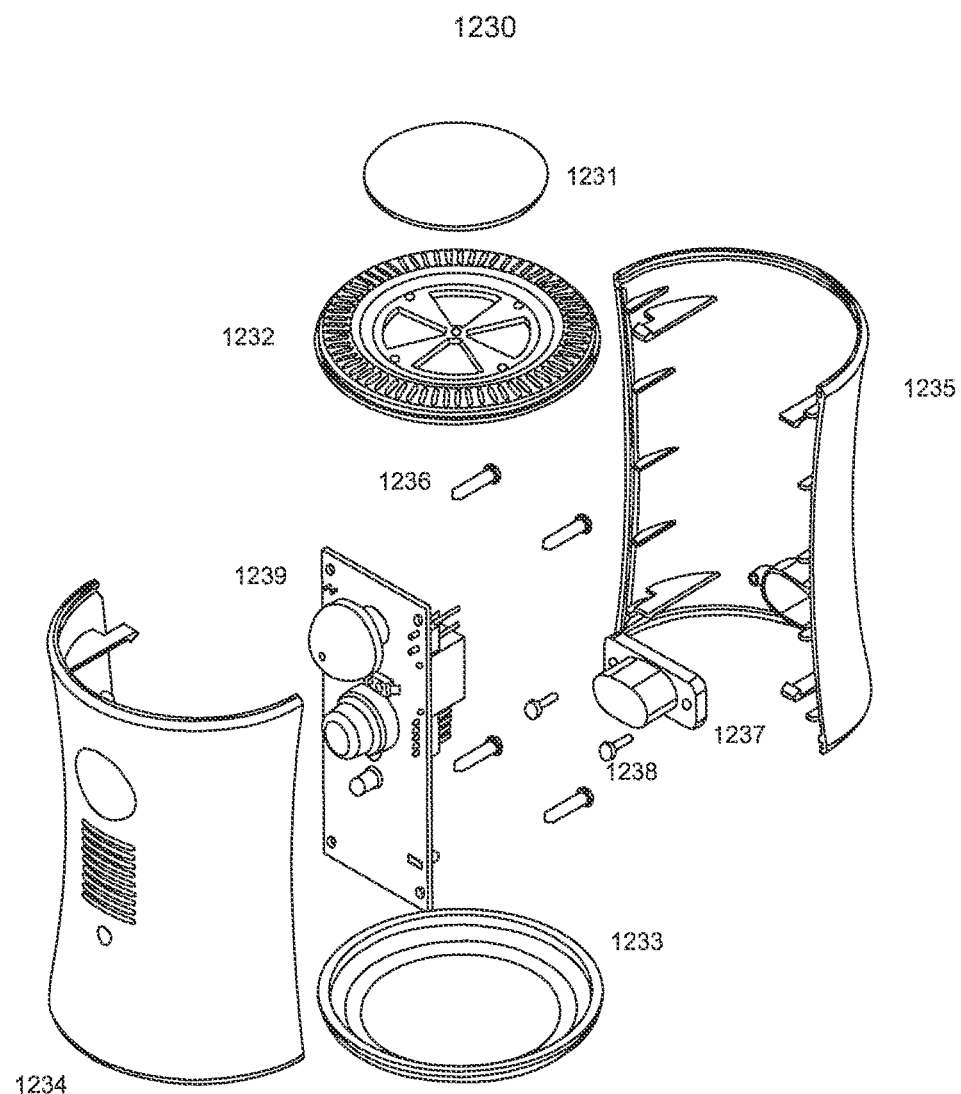
Figure 12D:
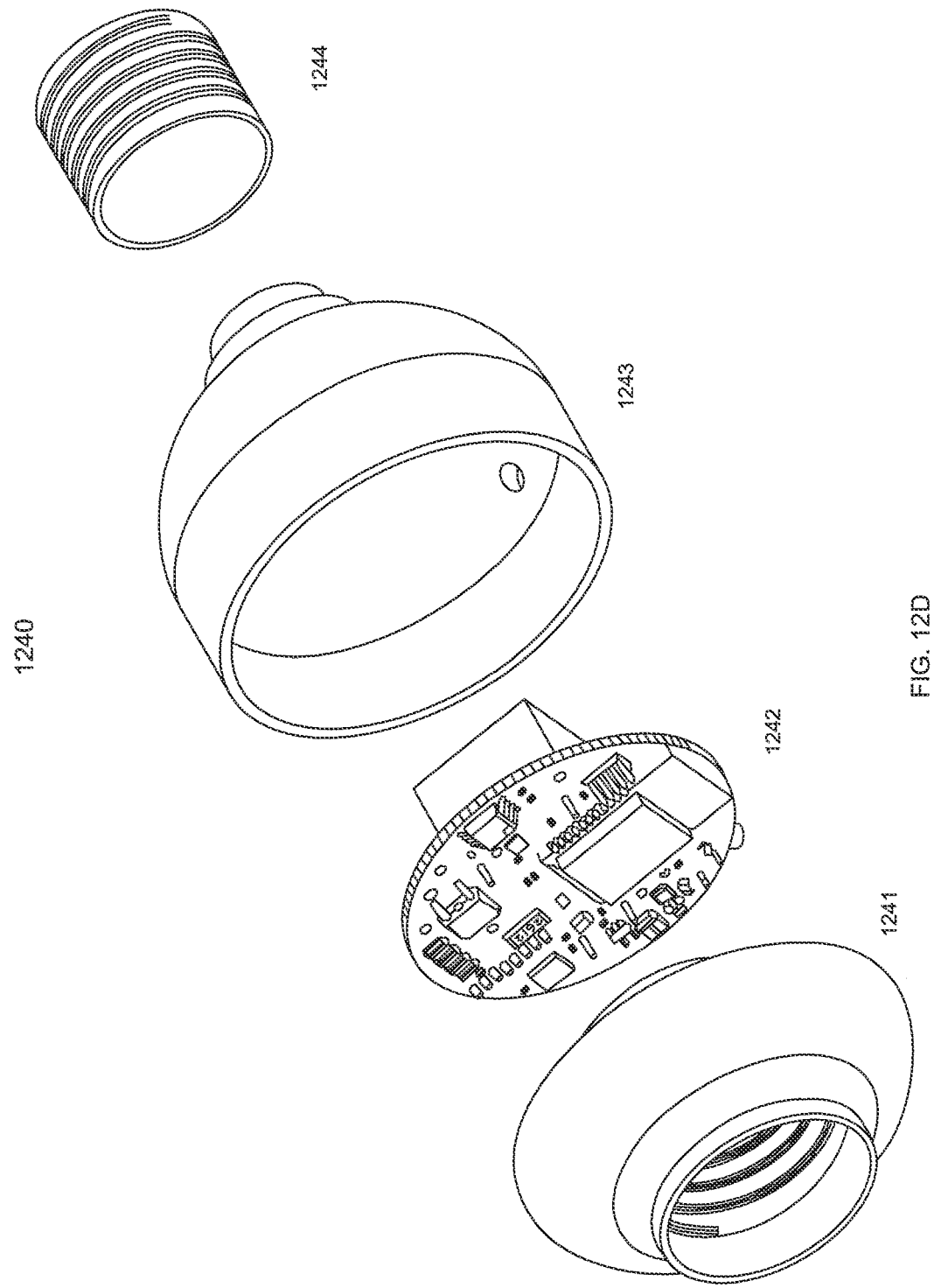
Figure 12E:
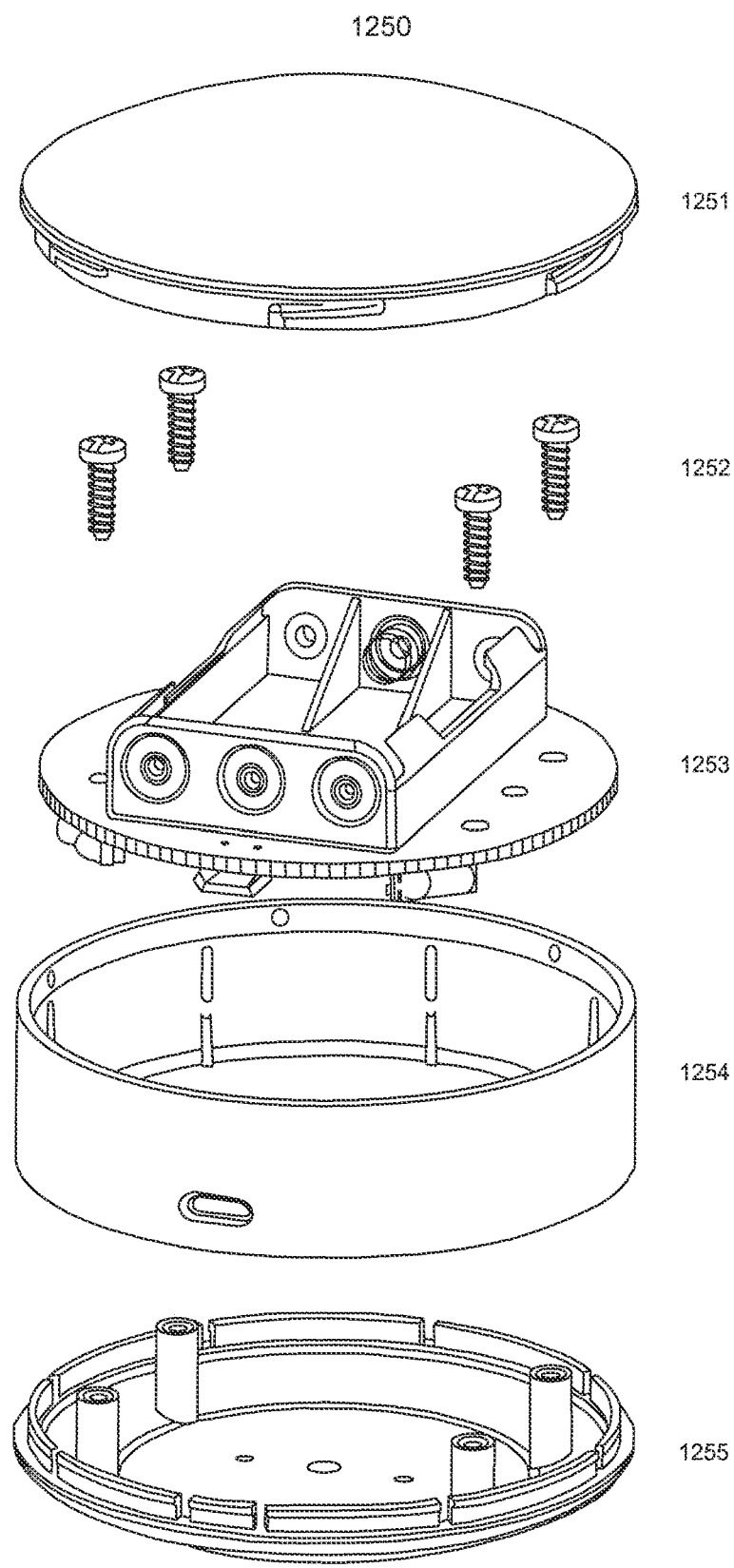

Once the hub 110 is set up and devices 120 are added, the hub 110 and server 200 may begin monitoring and control of devices 120 in the smart space. FIG. 11 shows a learning schedule and AI algorithm according to an embodiment of the invention. As described above, the hub 110 may first be set up, and then the hub 110 and server 200 (collectively "the system") may start to collect data from the devices 120. As data comes in, the system may learn patterns of operation of the devices 120 and train the modules 240-260. User-created scenes and rules may be input as well (e.g., defining when devices 120 may or may not operate and/or creating "scenes" or "butlers" which may be programmed sequences of device 120 activation and/or deactivation, alone or in combination with other devices 120). For an example interface for creating scenes or butlers, see FIG. 20D-I. For example interfaces for using created scenes or butlers and/or individual devices, see FIGS. 20P-20FF. As learning takes place, the system may recognize improvements that may be made to the smart space's efficiency and offer optimization suggestions (and/or take action to optimize), including sending alerts to a user (e.g., via an app 132-136, see FIG. 20C). As time goes on, the system may effect improvements in smart space efficiency and livability based on the data observation and learning.

Some objects controlled by the system may be smart objects. Smart objects may include data analysis and summarization features to provide data about device type, appliance behavior recognition, usage pattern recognition, anomaly detection, geo-localization usage, automated action, and/or other features. The hub 110 and/or server 200 may detect the kind of appliance connected through the smart device. The hub 110 and/or server 200 may perform activity, room/space, and/or geolocation detection and form clusters of the detected data from the smart object. The hub 110 and/or server 200 may detect device usage patterns over time based on the data clusters. The hub 110 and/or server 200 may detect different abnormal behaviors related to the data gathered by the smart object (e.g., the usage pattern data). The smart object may transmit gathered data to the hub 110, and the hub 110 and/or server 200 may perform usage pattern and/or anomaly detection, for example. The smart object may also include Automated scenes and butlers generation.

FIGS. 12A-12E show exploded views of smart objects according to an embodiment of the invention. These smart objects are presented as examples only, and those of ordinary skill in the art will appreciate that other objects and/or configurations may be possible.

A door/window sensor 1210 may include two units configured to be mounted in proximity to one another (one to the door/window and one to a stationary surface nearby) and sense when the door/window is opened/closed. For example, a first unit may include a front plate 1211, a fastener 1212, a circuit 1213, and a housing 1214. The second unit may include a front plate 1215, a magnet 1216, and a rear plate 1217. The circuit 1213 may detect the presence/absence of the magnetic field of the magnet 1216 and report this detection (e.g., via WiFi, Bluetooth, or some other connection) to the hub 110. This sensor may be attached to things that can be opened and closed (e.g., doors, windows, cabinets, drawers, etc.) and may generate alerts when they are opened. The open/closed sensor may detect motion with an accelerometer and/or may include sensors for temperature, humidity, and luminosity.

A smart plug 1220 may include an outlet 1221, a terminal 1222, one or more circuit boards 1223/1224, a housing 1225, a button 1226 that may be in contact with one or more of the circuit boards 1223/1224 and mounted in the housing 1225, and an inlet 1227/1228. The circuit boards 1223/1224 may include a circuit that may detect the presence and/or power usage of a device plugged into the outlet 1221 and report this detection (e.g., via WiFi, Bluetooth, or some other connection) to the hub 110. The smart plug may turn any electrical appliance into a smart device by simply plugging the appliance into the smart plug. The smart plug may be placed between the power outlet and the device. The smart plug, in conjunction with the system, may allow users to increase efficiency, turn devices on and off, and/or monitor and control energy consumption from anywhere. Users may be able to keep track of the energy usage and automatically interrupt the electrical supply if the smart plug detects high temperature in the environment. If the smart plug is plugged into a lamp, it may detect the lumens in the environment and turn the lamp when it gets dark. The smart plug may also dim the lights of the lamps. The smart plug 1220 may be configured to avoid covering other outlets (e.g., if the smart plug 1220 is plugged into a first outlet in a 2-outlet wall socket, it may not cover the second outlet).

A sensor unit or smart station 1230 may include a top cover 1231/1232, a bottom cover 1233, a front cover 1234, a back cover 1235, one or more fasteners 1236/1238, a power inlet 1237, and a circuit 1239. The circuit 1239 may include one or more sensors (e.g., light sensors, gas sensors, temperature sensors, etc.). The circuit 1239 may report sensor outputs (e.g., via WiFi, Bluetooth, or some other connection) to the hub 110. For example, the smart station may include a built-in camera and/or other sensors and may measure emotion, face detection, air quality, smoke, CO, temperature, pressure, presence, motion, humidity, luminosity, etc. For example, the smart station may automate lamps to turn on when darkness is detected. The smart station may detect motion using an accelerometer to remove false positives. The smart station may alert for fire and may include "Air Quality Detection" (Smart Station Protect) to send alerts and help prevent CO poisoning.

A smart socket 1240 may include a bottom cover 1241, a circuit 1242, a top cover 1243, and a socket thread 1244. The socket thread 1244 may supply power from the socket into which the smart socket 1240 is screwed to the light screwed into the smart socket 1240. The circuit 1242 may detect the presence and/or power usage of a device screwed into the smart socket 1240 and report this detection (e.g., via WiFi, Bluetooth, or some other connection) to the hub 110. The smart socket may allow a user to monitor energy usage, dim the lights, turn them on/off when from anywhere, set them in random patterns to provide the appearance of a crowded house, etc.

An infrared skipper 1250 may include a top cover 1251, one or more fasteners 1252, a circuit 1253, a middle cover 1254, and a bottom cover 1255. The circuit 1253 may include an infrared transceiver that may detect appliances using infrared remote control (e.g., televisions and other home theater components, etc.). The circuit 1253 may be configured to control such appliances as well as detect information about the appliances. The circuit 1253 may receive commands from and report data to (e.g., via WiFi, Bluetooth, or some other connection) the hub 110. Infrared is shown in this example, but in some embodiments, the skipper 1250 may communicate with appliances via Bluetooth or other connection in addition to or instead of via infrared. The skipper may function as a universal remote control and IR blaster. The skipper may be placed in a room, and it may detect all the appliances that have infrared technology (AC, TV, DVR, and audio system, for example). Using the infrared connection, the skipper may allow users to control the devices from anywhere.

The system may also include a presence tag (e.g., an RFID tag that may communicate with the hub 110 and/or a smart device such as those described above) in some embodiments. The presence tag may trigger an alert if the tag is removed from within a specified zone. The zone may be customizable using the system. For example, a child's backpack may be tagged, and the tag may trigger an alert when the child is back from school. The presence tag may be implemented with key chains, pet collars, etc. The tag may allow the system to know if the tag is within range. Optionally, the presence tag may automatically trigger actions based on a user's presence. For example, when a user walks into the living room, the system may play favorite music, turn the lights on, or preform any other customized function.

The system may also include a smart wall unit that may convert any socket or switch without having to change the outlet. It may be installed inside a box in a wall, and it may be compatible with standard electrical boxes (e.g., wall sockets or switches). The smart wall unit may allow on/off switching, dimming, and energy monitoring, among other functions, similar to the smart plug 1220 and smart socket 1240 except hard-wired within the electrical box.

The system may also be configured to communicate with third party devices such as smart thermostats, plugs, and dimmers manufactured by Centralite and others; and/or door locks manufactured by Kwikset and others.

The following is an example set of smart object classification category types that may be used by the system and artificial intelligence:
  Appliance
  Lighting
  Doors & Windows
  Entertainment
  Other Within each category, specific smart objects may be provided, for example as follows:
  Appliances:
    Coffee maker
    Toaster
    Refrigerator
    Microwave oven
    Washing machine
    Dryer
    Dishwasher
    Freezer
  Lighting:
    Reading lamp
    Bed lamp
    Spotlight
    Ceiling light
    Chandelier
    Wall light
    Outdoor light
  Doors & Windows:
    Front door
    Garage door
    Outside door
    Inside door
    Gate
    Window
  Entertainment:
    Tv
    Media player
    Game console
    Music player
    Speaker
    Computer
    DVR/TiVo
  Other:
    Telephone
    Router
    Heater
    Air conditioning
    HVAC
    Fan
    Ceiling fan The system may learn different aspects of its environment (e.g., users and devices) and perform smart object classification automatically. The system may include learning algorithms tuned to apply specifically to smart spaces and commercial systems and internet of things systems and architectures. The algorithm may work in conjunction with a big data module. The big data module may detect and capture events. For example, if a user manually turns on a switch, the big data module may capture that event, or if a bulb dies, the big data module may capture that event through one or more anomaly detection modules, and so on. The system may be able to learn more efficient ways to save energy. The AI module can learn from data collected from users, sensors, actuators, etc. and provide cost saving options to home and commercial environments. The AI module may further enable users to obtain metrics from appliances and provide suggestions on functions the user may not yet be applying.

The system may learn from a user's functions and behaviors and program itself. The data gathered may be updated on a cloud. For example, the AI module may learn habits, preferences, and schedules for a full range of appliances continuously. The learning algorithms and cloud event driven architecture may allow auto programming for rules, scenarios, actions, schedules, and triggers to create and send alerts, suggestions, notifications through multi-way channels like SMS, voice call, email, push notifications, etc.

Learning algorithms may also be connected to artificial intelligence application programing interfaces (API)s that may interact with multi-cloud 3rd party APIs in order to interact with different cloud services like IFTTT, email servers, etc. Some example artificial intelligence APIs are listed below:

ai.datastream.add
ai.datastream.delete
ai.datastream.get
ai.energy.getConsumption
ai.energy.getSaving
ai.energy.predictConsumption
ai.lifestyle.getHabit
ai.lifestyle.getUserPatterns
ai.lifestyle.predictScene
ai.prediction.analyze
ai.prediction.create
ai.prediction.delete
ai.prediction.get
ai.prediction.list
ai.prediction.update
ai.classifyOpenClose
ai.feedbackAnomalyDetection
ai.feedbackMoodFeedback
ai.feedbackOpenCloseClassification
ai.getBaseline
ai.getResult
ai.insertAnomalyDetectionRecommendation
ai.insertMoodFeedback
ai.insertOpenCloseClassificationRecommendation
ai.isAnomaly
ai.smartobject.getDetectedObj
ai.smartobject.getDetectedCompoundObj
ai.smartobject.getHabit
ai.smartobject.getAutomatedActions
ai.sendRecommendation
ai.sendRecommendationV2
ai.getEnvironment
ai.getEnvironmentByDevice
ai.getEnvironmentDetailsByDeviceByHour The learning features may enable energy saving and energy management capabilities for the system. A system may monitor energy consuming devices, user data, and environmental data collected by sensors, users, and devices such as smartphones, tablets, computers, appliances, electrical devices, etc. The system may analyze the data collected with artificial intelligence algorithms and machine learning algorithms to auto-program a set of one or more actions, rules, scenarios, notifications, suggestions, and/or alerts, and execute different actions and scenarios to provide strategic reduction of power usage in home, offices (or any space) combined with a multi-sensing, wirelessly communicating smart TV and smart TV box home gateway.

The artificial intelligence and learning algorithms may allow efficient learning for energy management and energy saving features. Different schedules, scenarios, actions, and/or rules may be created in the system and may be automatically generated based on immediate-control inputs. Artificial intelligence and machine learning methods may also be used for receiving user input relating to the user's preference and environments. The energy monitoring and management system may also run in a cloud energy monitoring and energy saving system that may interact with the system and any electrical device in a location or space.

Figure 13:
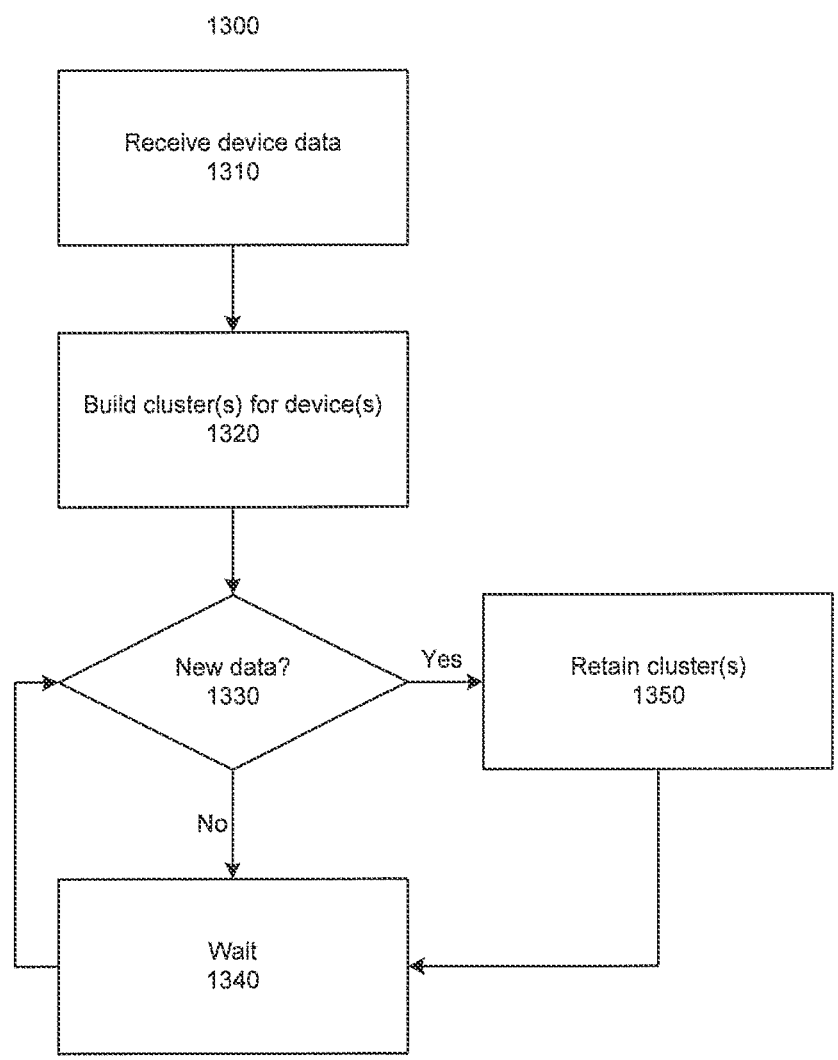
FIG. 13 is a machine learning process according to an embodiment of the invention.

Each of the functions described below may use machine learning. FIG. 13 is a machine learning process 1300 according to an embodiment of the invention. In 1310, data may be received at the hub 110 from one or more devices 120. This data may be passed to the server 200 which, in 1320, may build clusters of recent historical data for each device 120.

In 1330/1340, the system may wait for new data to come in. When it does, in 1350 the hub 110 may pass the data to the server 200 which may retrain the cluster or clusters.

The learning features may provide the system with anomaly detection functionality which may be used to identify abnormal behaviors related to energy consumption of devices within a smart space. The system may apply filters and classifiers to data from the devices monitored in real time or near real time to detect abnormal behavior (e.g., behavior that is different from an established pattern of normal behavior). The system may notify a user when abnormal behavior is detected.

Data received from smart devices may be processed to aggregate with historical data related to the owner, the space, and the device. The aggregated data may be filtered with a filter, fixed with the last coming events for the related device.

The real-time data collected may be used to fit and fix filters and classifiers. At the start of the life cycle of the system, or each time than an abnormal behavior is detected, filters and classifiers may be re-trained with the incoming data stream from devices in the smart space, assuming the data represent the actual normal behavior for the measured signal of the device.

Figure 28:
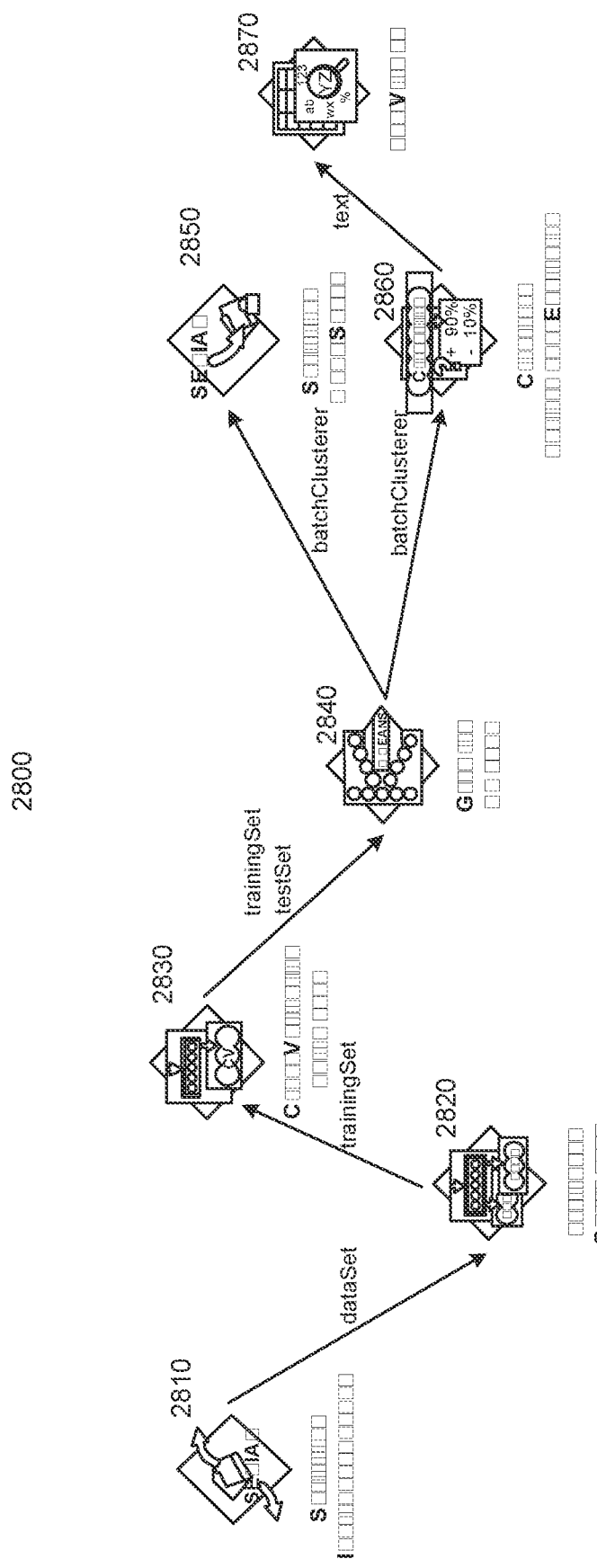
FIG. 28 is a clustering processor according to an embodiment of the invention.

FIG. 28 is a clustering processor 2800 according to an embodiment of the invention. The clustering processor 2800 may include a serialized instances loader 2810, a train/test split maker 2820, a cross validation fold maker 2830, a growing k-means generator 2840, a serialized model saver 2850, a cluster performance evaluator 2860, and a text viewer 2870. The clustering processor 2800 may be used to perform a variety of processes related to anomaly detection, device detection, user activity detection, scene discovery/generation, etc., described below.

Figure 14:
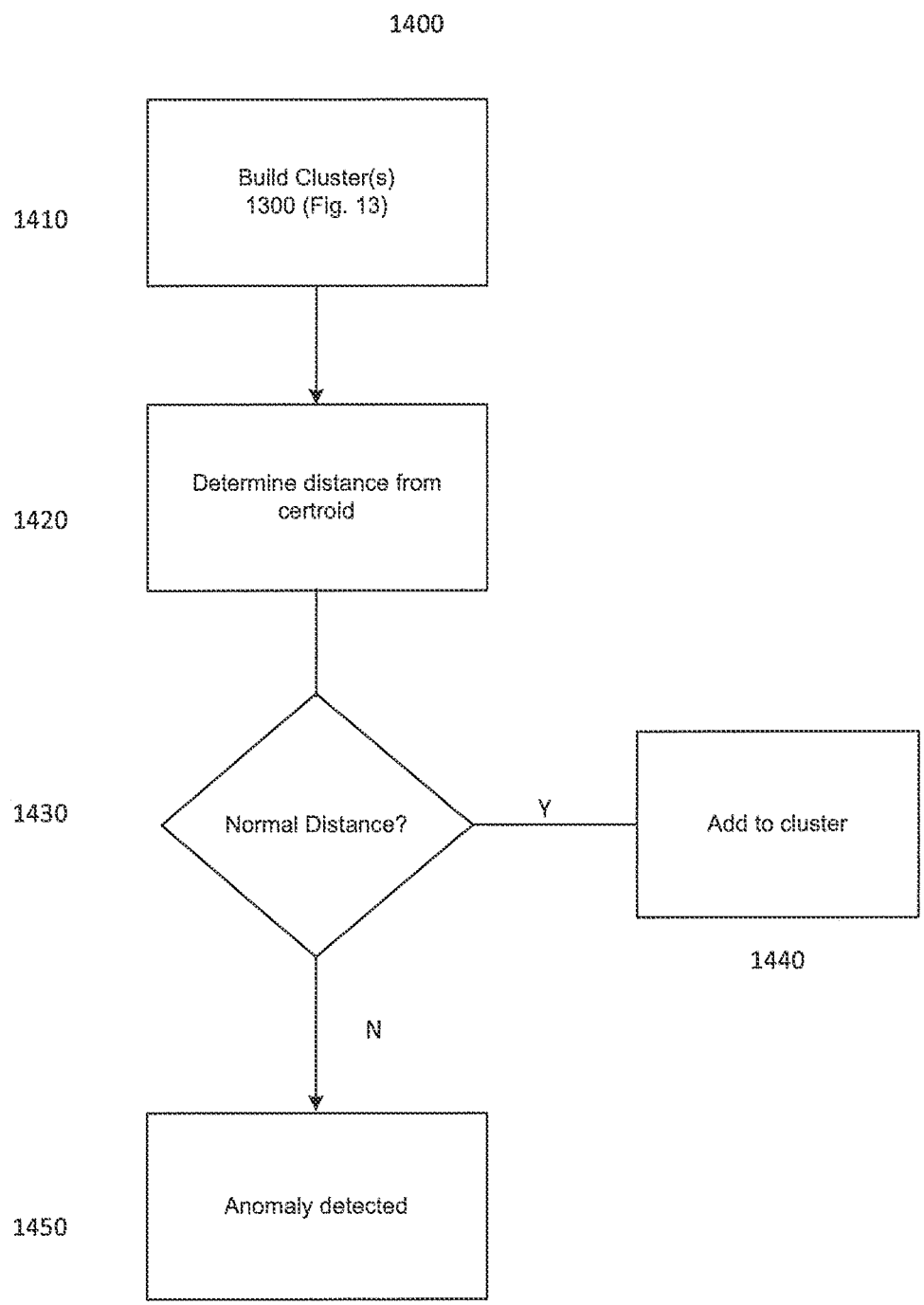
FIG. 14 is an anomaly detection process according to an embodiment of the invention.

FIG. 14 is an anomaly detection process 1400 according to an embodiment of the invention. In 1410, the system may use the recently collected historical data to build a classifier based on time series clusters (i.e., clusters of the signal values arranged by time) to find the normal status of the behavior of the device based on the incoming signal (FIG. 13). When clusters are determined, in 1420, the distance of any new event (detected by the hub 110) to the nearest centroid may be determined by the server 200. That is, in this case the filters may be intervals around centroids of each cluster. In 1430/1440, if the distance is normal (e.g., below a threshold), the data may be added to the cluster. In 1450, an abnormal behavior may be detected if there are many successive (or near in time) events out of the filter (i.e., away from a centroid).

Figure 21:
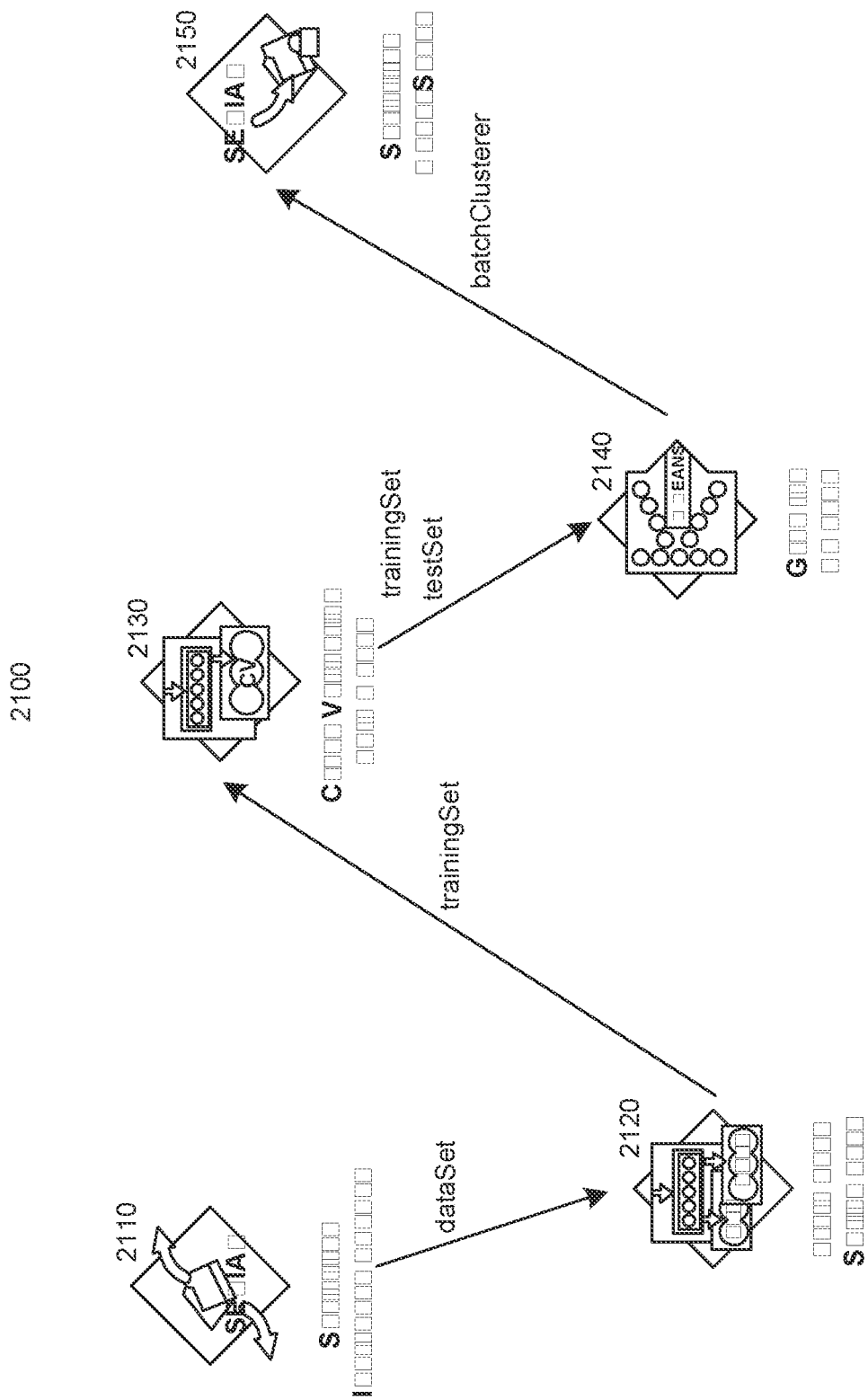
FIG. 21 is a cluster generation process according to an embodiment of the invention.

A specific example of a cluster generation process 2100 for anomaly detection according to an embodiment of the invention is shown in FIG. 21. In 2110, a serialized instances loader may accept the historical data and output a data set. In 2120, a train/test split maker may receive and process the data set and output a training set. In 2130, a cross validation fold maker may receive and process the training set and output a training set and a test set. In 2140, a growing K-means algorithm may use the training set and test set from the cross validation fold maker to generate the clusters. In 2150, the clusters may be saved.

Figure 22:
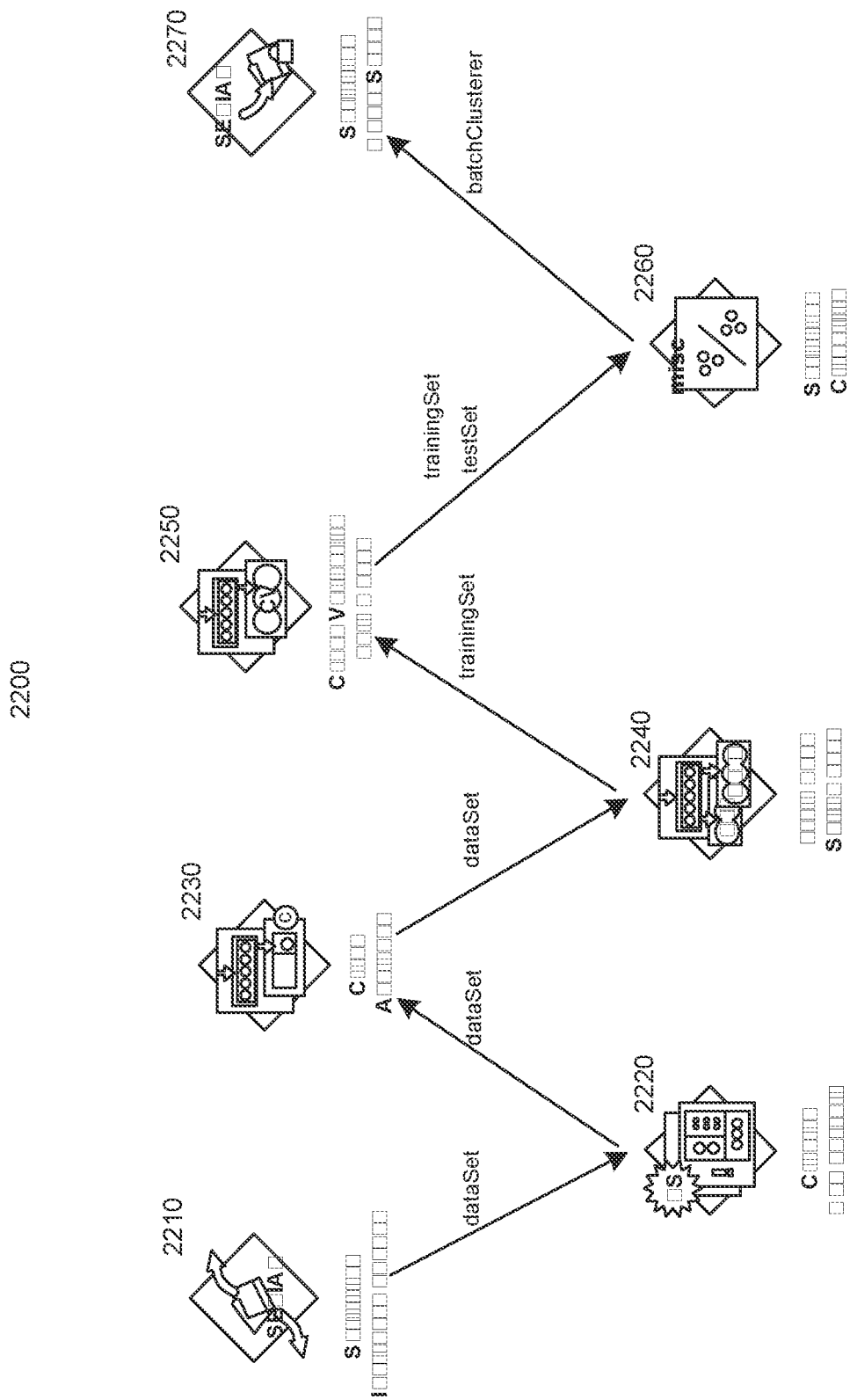
FIG. 22 is an anomaly detection process according to an embodiment of the invention.

FIG. 22 is an anomaly detection process 2200 according to an embodiment of the invention, wherein the clusters generated by the process 2100 of FIG. 21 may be used to identify anomalies. In 2210, the saved data from step 2150 may be loaded, and in 2220, the cluster memberships may be determined and output as a data set. Cluster classes may be assigned for the data set in 2230. In 2240, a train/test split maker may receive and process the data set and output a training set. In 2250, a cross validation fold maker may receive and process the training set and output a training set and a test set. In 2260, a serialized classifier may classify data against the outputs to identify anomalies. In 2270, the anomaly data may be saved.

In one anomaly detection example, the smart object may be a light with a dimmer and/or on-off control (e.g., the smart socket described above or a light with its own smart communications and data gathering features). A filter may be set for the device based on observed historical device data. In the case of a dimmer, clusters may be formed around frequently observed dimmer settings. For example, a user may set the dimmer to 20% when they come home from work. In this case the filter may be a simple interval around the average of the historical data stream in a time window. (e.g., quartiles 2 and 10 of 11 partitions, over a window time data stream).

The baseline for the smart object may be calculated as range of minimal and maximal samples, for example taking the lowest and highest second quantiles of 11 buckets. If the number of samples covered in the date range is less than some threshold (MIN_REQ_SAMPLE_BASELINE), the baseline may be discarded.

To determine whether a light device has an abnormal behavior, the system may take the last samples (from the last 24 hours or at least the last MIN_REQ_POWER_SAMPLES), count how many samples are out of the baseline range, and count how many samples are after the first anomaly. If the percentage of abnormal samples on the last samples is over some threshold (ANOMALY_TOL_LIMIT), an anomaly may be registered by the system.

Similar monitoring may be performed for smart plugs and outlets and other energy-using devices, for example based on energy use samples wherein when a percentage of abnormal samples on the last samples is over some threshold (ANOMALY_TOL_LIMIT), an anomaly may be registered by the system. In addition, the type of device plugged into a smart plug may change. Hence when an abnormal behavior is detected it may indicate that a real abnormal behavior is taking place or that the appliance connected was changed. In the latter case, the system may notify the user of the change but, over time, may learn the new behavior pattern and thus recognize that a new device has been connected and start looking for anomalies with that new device.

The system may detect anomalies in user behavior. The system may register actions executed by any user with any client through the IoT cloud to any device. The system may periodically look for anomalies in user behavior, through actions or occurrences/omissions of events, on the devices. For each kind of device, the system may store a collection of typical abnormal behavior patterns, codified as rules, against which currently monitored behavior may be evaluated. When an abnormal user behavior is detected, depending on the severity of the situation, the system might perform different actions, such as notify the user about the issue or request a secure validation of the action, denying access to the device if secure validation is not received.

The system may detect anomalies in data streaming patterns. This is a generalization of the energy anomaly detection functionality. The system may process the recently historical data and build a classifier based on clusters for time series to find the normal status of the behavior of a signal. For example, data from a smart station (e.g., temperature, humidity, luminosity, and/or activity/motion frequency) may be monitored for departures from frequently observed measurements.

The system may periodically look for anomalies in the movements of users attempting to access the IoT cloud from different geo-locations. Each time the system receives a user command from a remote location (e.g., from a user editing smart space settings in her home while she is at the office), the data sent from the device including the command may also include a GPS location of the device. The system may place a point on the map corresponding to a GPS location of the device sending the command. After several commands are received from a user, the system may generate a cluster of points over the map. Then, each time a new command is received and thus a new point appears, the system may measure the distance to the nearest centroid. An abnormal geolocation may be detected when this distance exceeds some limit.

When an abnormal user geolocation is detected, the system may notify the user about the abnormality and request a secure login, and if the secure login is not received, access to the smart space controls from the abnormally located device/account may be denied.

Figure 15A:
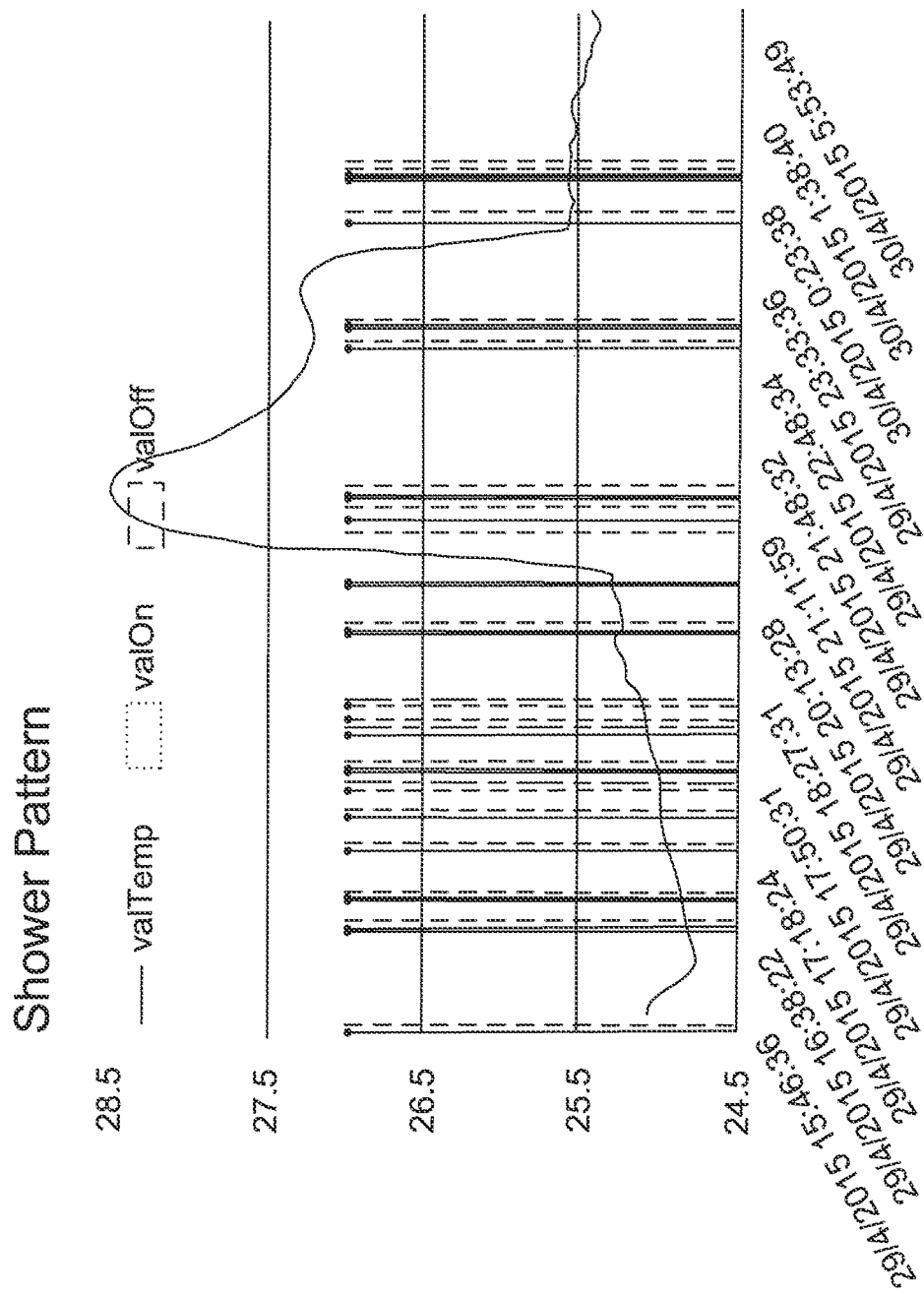
FIGS. 15A-15B show data gathered by a system according to an embodiment of the invention.
Figure 15B:
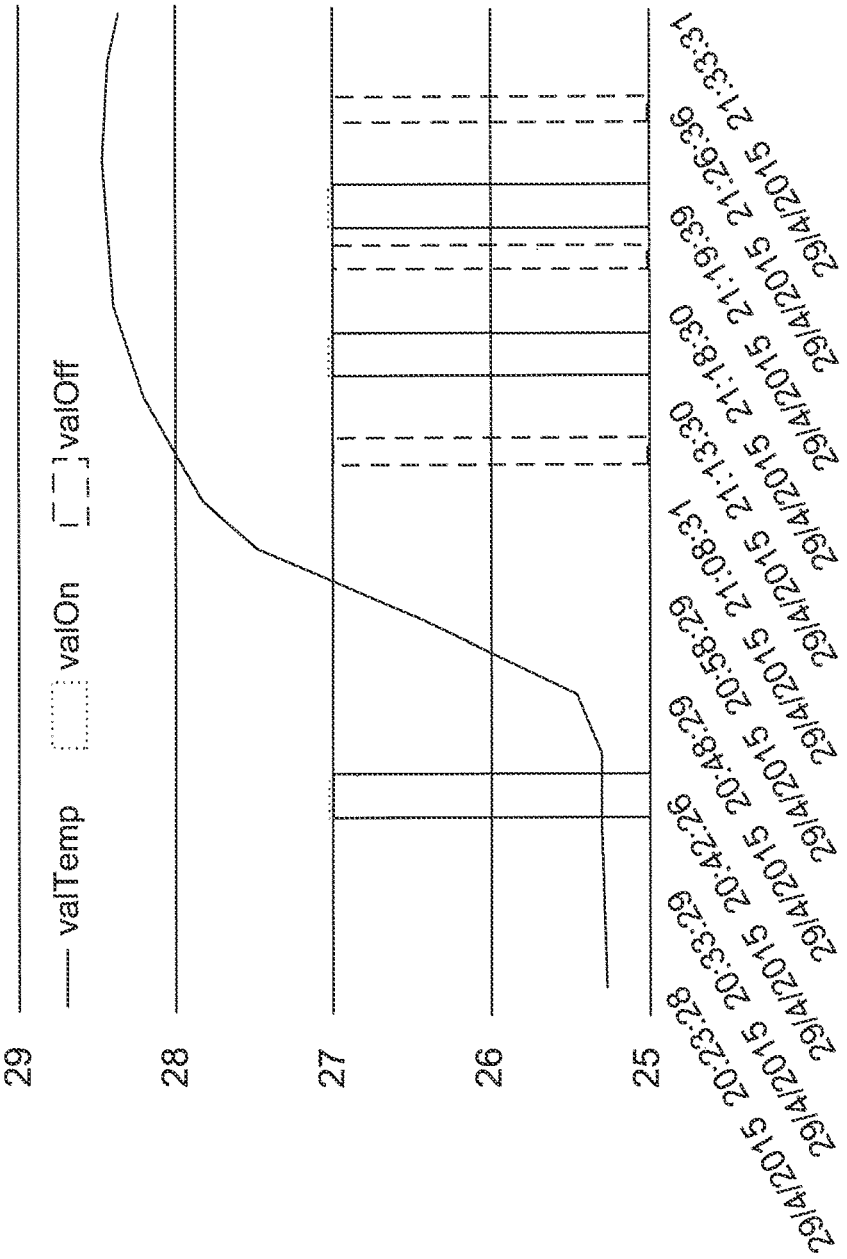

In one specific example, the system may use data collected by a bathroom light switch and a temperature sensor to detect average shower length and shower frequency for a user. FIGS. 15A-15B show an example of data gathered illustrating a shower use pattern. For example, if the system determines that a user takes long showers, it may generate a message recommending a shorter shower duration including a display of potential energy savings associated with reducing shower time.

Figure 16A:
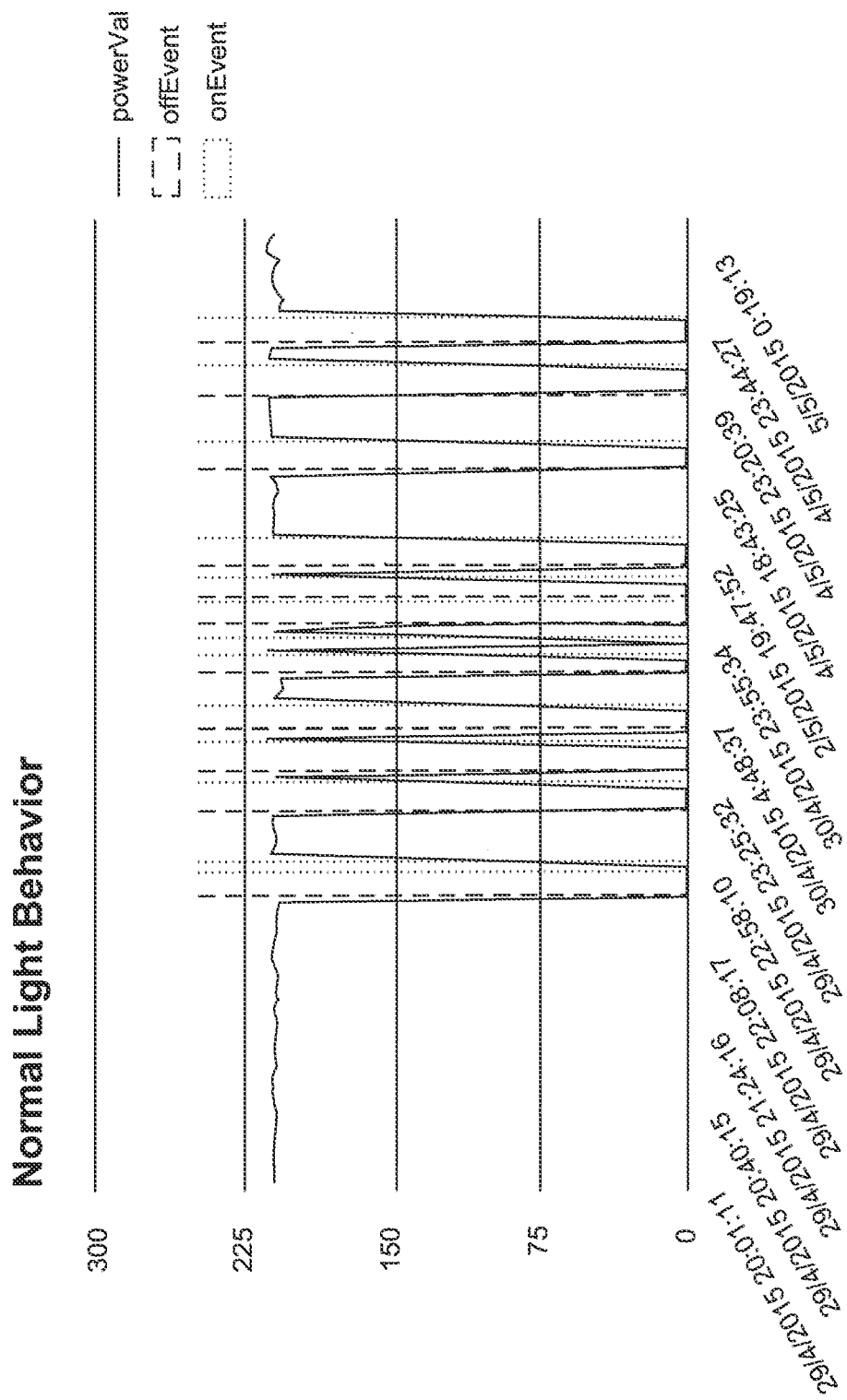
FIGS. 16A-16B show data gathered by a system according to an embodiment of the invention.
Figure 16B:
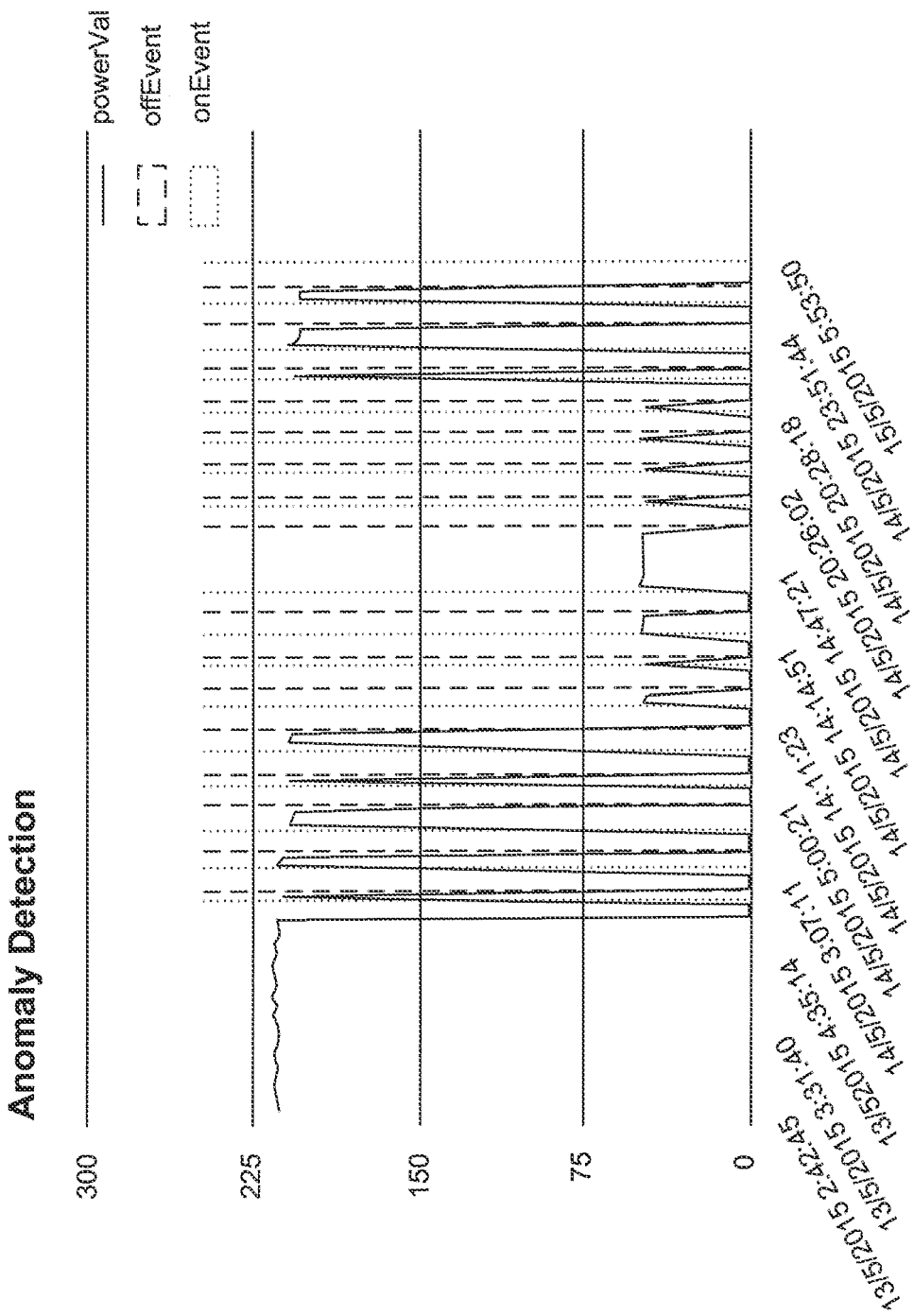

In another example, the system may use data collected by a smart light switch equipped with a power consumption reporting module to detect malfunctioning lights. For example, if the system determines that a light is malfunctioning, it may generate an alert to facility management notifying that a light bulb needs to be replaced. FIG. 16A shows an example of normal light behavior, and FIG. 16B shows an example of abnormal light behavior as compared with the normal light behavior of FIG. 16A.

The system may create an environment that is operating system independent. This may allow open APIs for smart spaces and commercial systems and IoTs to utilize the system's capabilities to provide a friendly environment for developers. With open APIs for software and hardware, developers may be able to integrate third party software and hardware to the system. Thus, devices 120 may be preprogrammed with the ability to communicate with the hub 110 in some cases. However, in other cases, the system may perform appliance detection automatically.

Smart devices may be used in combination with a variety of appliances to perform appliance detection. For example, a smart plug may be installed in a smart space, and an appliance which may or may not have smart IoT features may be plugged into the smart plug. The smart plug may be able to determine the type of appliance, even if the appliance itself does not have any smart features.

The smart plug may include a smart object module configured to collect data about the behavior of the events from the device. Based on the signals of the device such as energy consumption, number of on/off events, execution regimen time, and others, the smart object module may learn which appliance is connected. The smart object module may also measure the correlation of events between many different devices (other device types such as open/close, motion sensor, etc.) from the same user, or in the same network, and determine if the devices are in the same room or if the devices are working together as a composite smart object.

Figure 17:
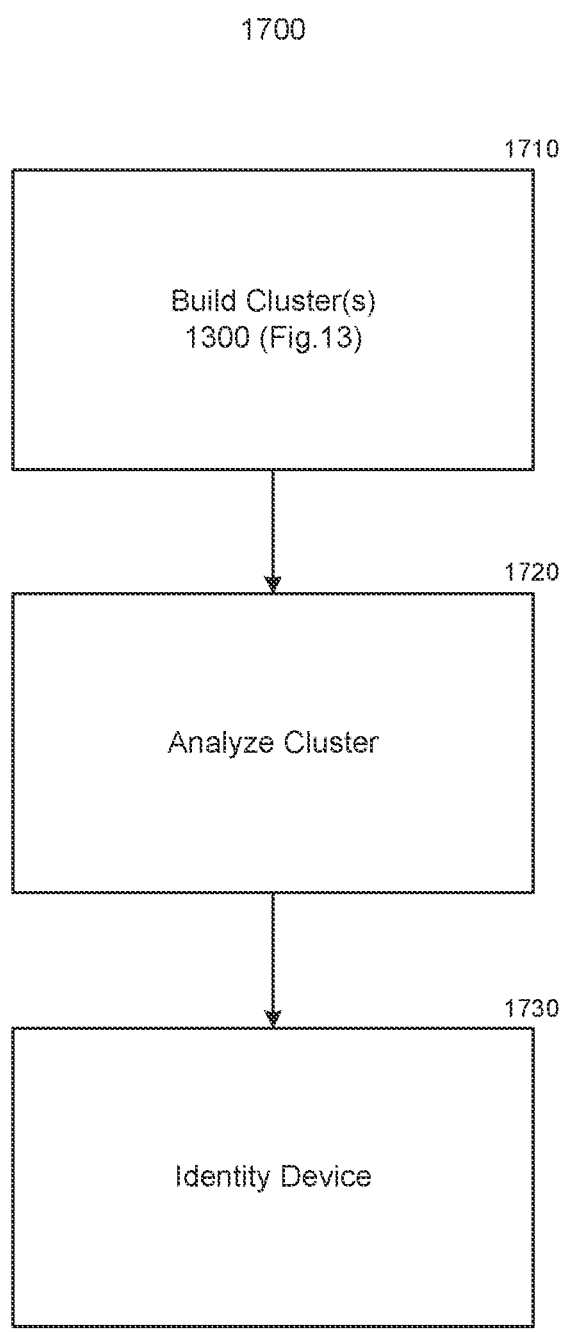
FIG. 17 is a device detection process according to an embodiment of the invention.

FIG. 17 is a device detection process 1700 according to an embodiment of the invention. Similar to the anomaly detection described above, in 1710 the appliance detection may use clustering on time series on real time or near real time data to identify different statuses of the smart object in time. In 1720 the appliance detection may use pattern matching and linear regression over the data for each status to characterize the wave of each status. Based on the identified pattern, in 1730 the system may identify the device (e.g., a toaster may have one pattern, while a blender has a different pattern). The system may also measure the correlation of the events between many different devices (other device types such as open/close, motion sensor, etc.) from the same user or in the same network and determine if these devices are in the same room and/or if these devices are working together as a composite smart object.

Figure 23:
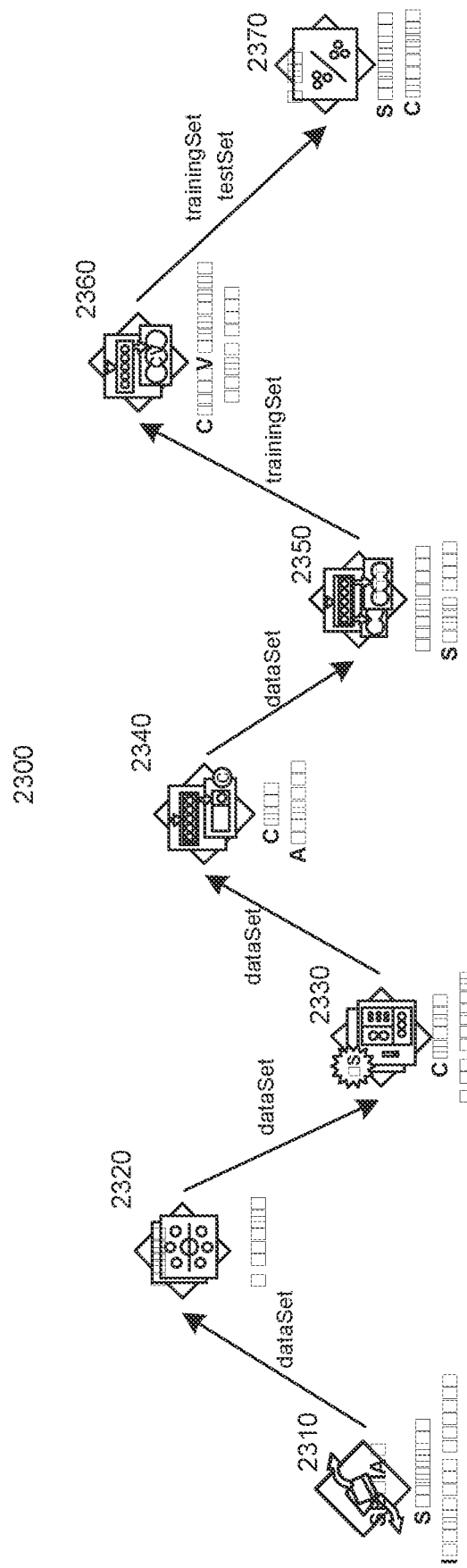
FIG. 23 is a device detection process according to an embodiment of the invention.

FIG. 23 is a specific example of a device detection process 2300 according to an embodiment of the invention. In 2310, a serialized instances loader may accept the historical data and output a data set. In 2320, a wavelet filter may receive and process the data set and output a data set including a wave for the input data. In 2330, cluster membership for the wave may be determined. In 2340, a class may be assigned to the data based on the wave and cluster membership. In 2350, a train/test split maker may receive and process the classified data and output a training set. In 2360, a cross validation fold maker may receive and process the training set and output a training set and a test set. In 2370, a serialized classifier may output a device identification.

Figure 25A:
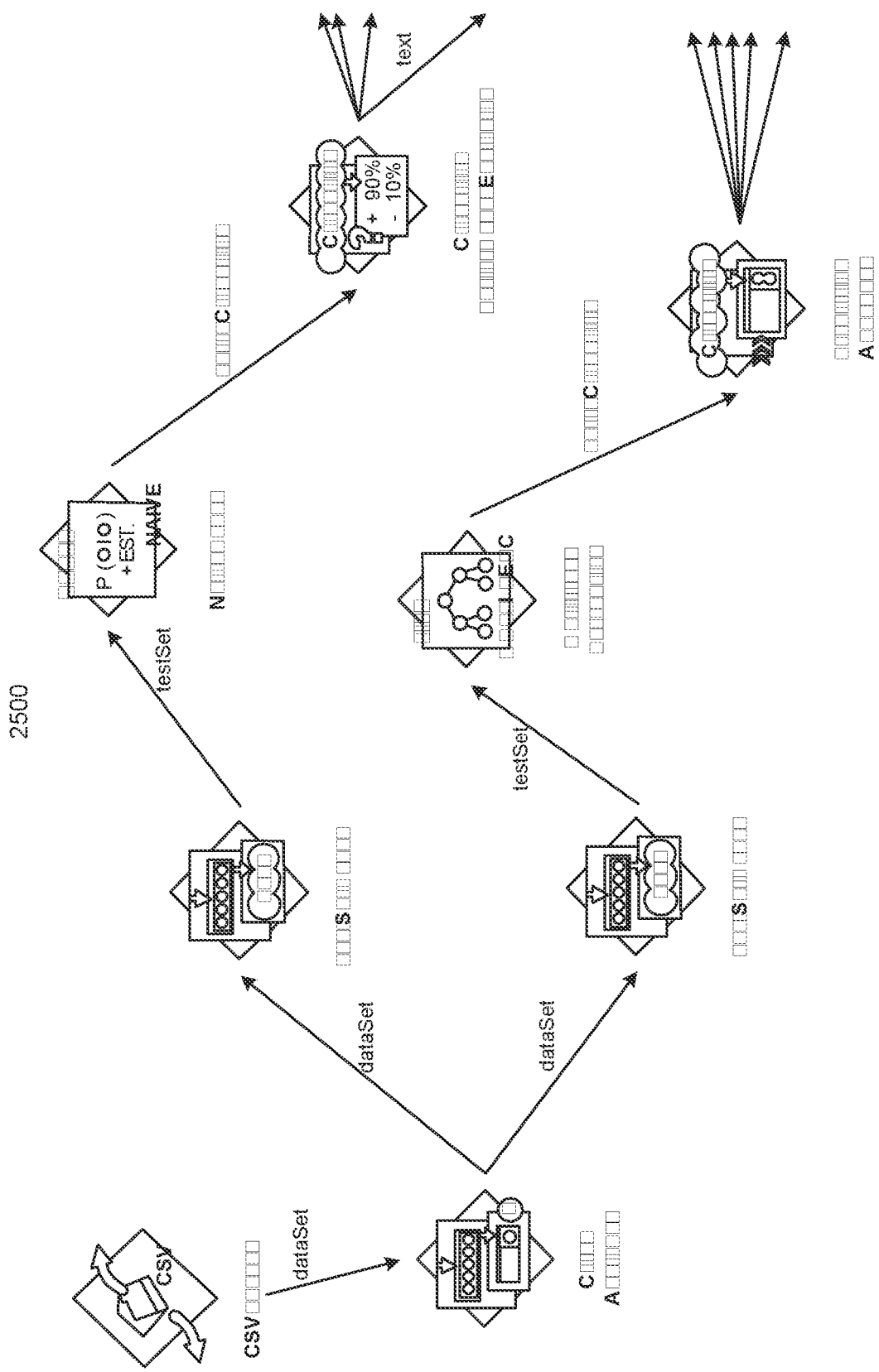
FIGS. 25A-25B are an open/close classifier according to an embodiment of the invention.
Figure 25B:
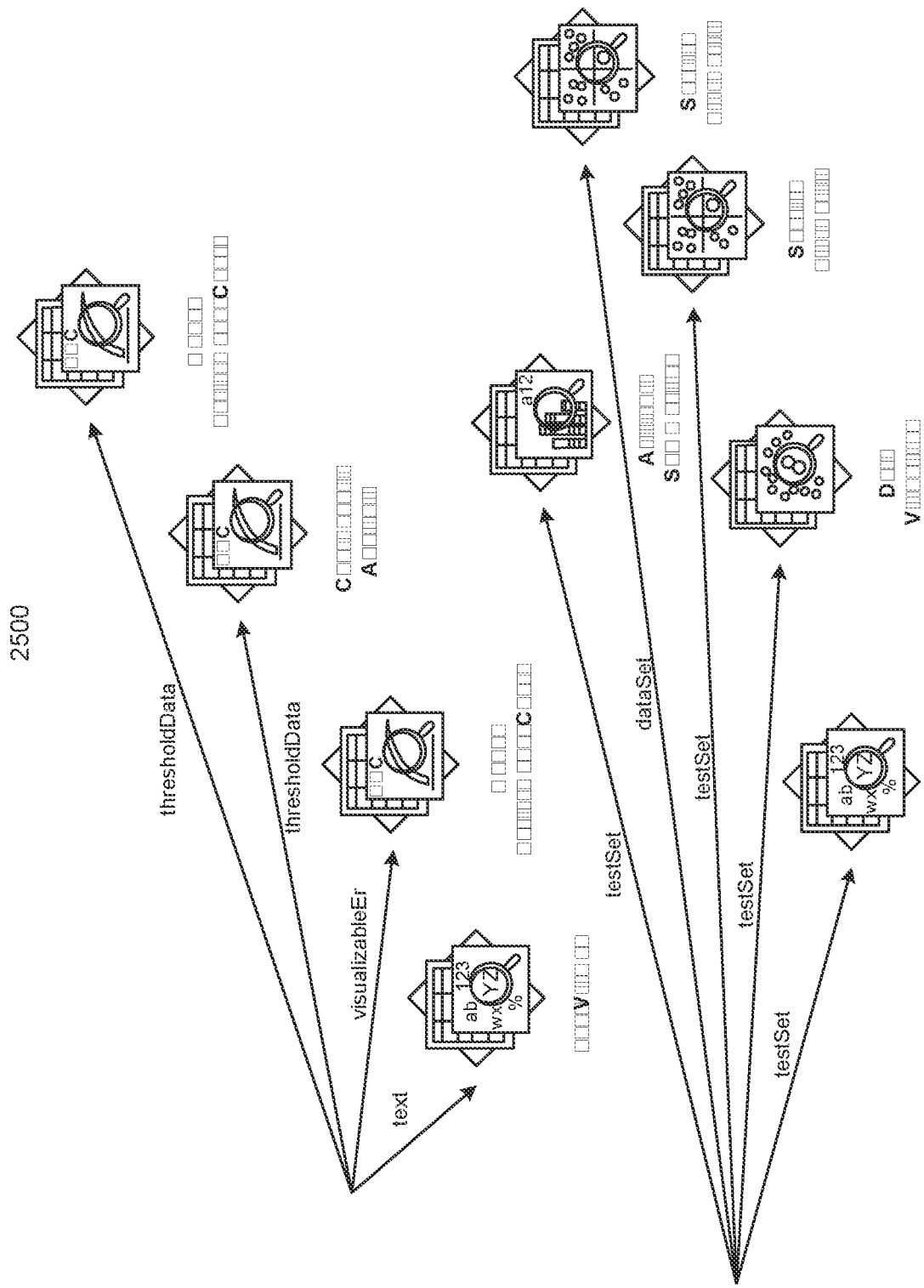

For example, an open/close classification may be a classifier specific for open/close devices and may run as a batch process over all the devices that have enough accumulated data and are not tagged as a specific smart object yet. A sample classifier 2500 is shown in FIGS. 25A-25B. The classifier may use detected features (difference between open and close time, the average of the temperature sensed in the device, the amount of events along the day, and others) to classify the device from among the different possible door/window classes. Once a determination has been made, the system may automatically tag the device and/or notify the user suggesting to tag the device with the detected door/window class. In one example, a door/window sensor may detect a front door based on a pattern of when the door is opened generated as described above. For example, if the door is used daily at certain times of day (e.g., morning and evening), the detected door openings and closings may reveal a pattern consistent with a resident coming and going from a home, suggesting a front door. The system may automatically create and enable entrance light activation triggers at the time of a user's typical arrival based on this detection, for example. The system may change behavior based on detected anomalies. For example, the system may determine a user is away from home based on the door not being used for a period of time and may temporarily disable the entrance light trigger.

Figure 26:
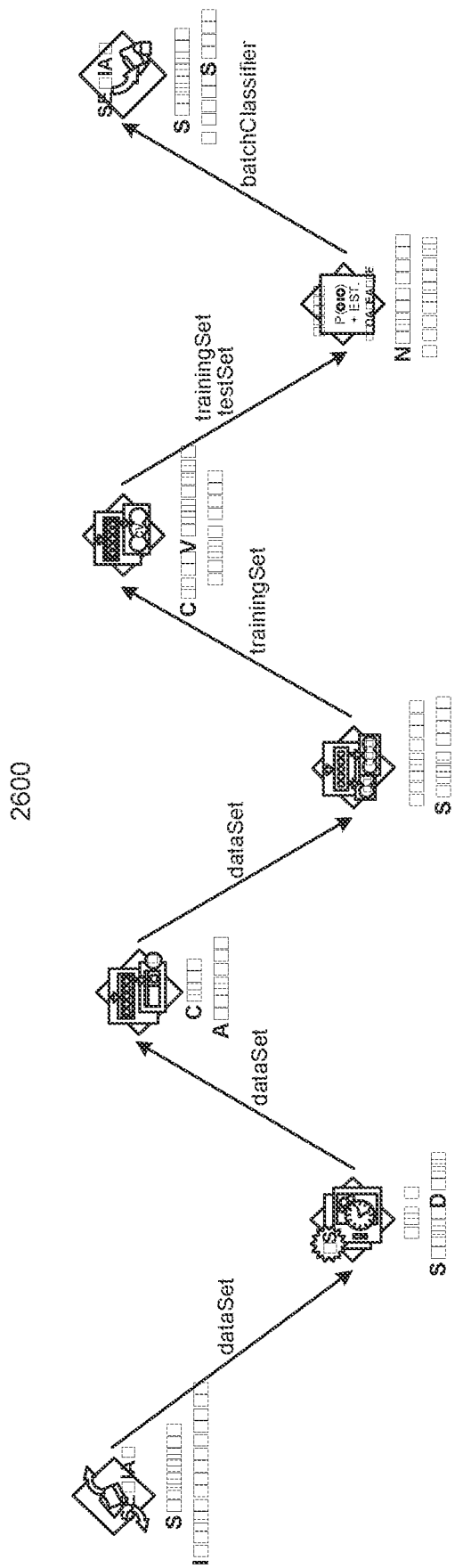
FIG. 26 is a composite smart object classifier according to an embodiment of the invention.

In some cases, the system may automatically detect composite smart objects. FIG. 26 is an example composite smart object classifier 2600 according to an embodiment of the invention. For example, the system may identify correlations in the activities of different devices during the same time period to determine if a relationship between the devices may exist (e.g., TV and receiver are always on at the same time). If such combinations are detected, the system may recommend to the user to make a "composite smart object" with the related devices or may automatically generate the composite smart object.

Figure 24:
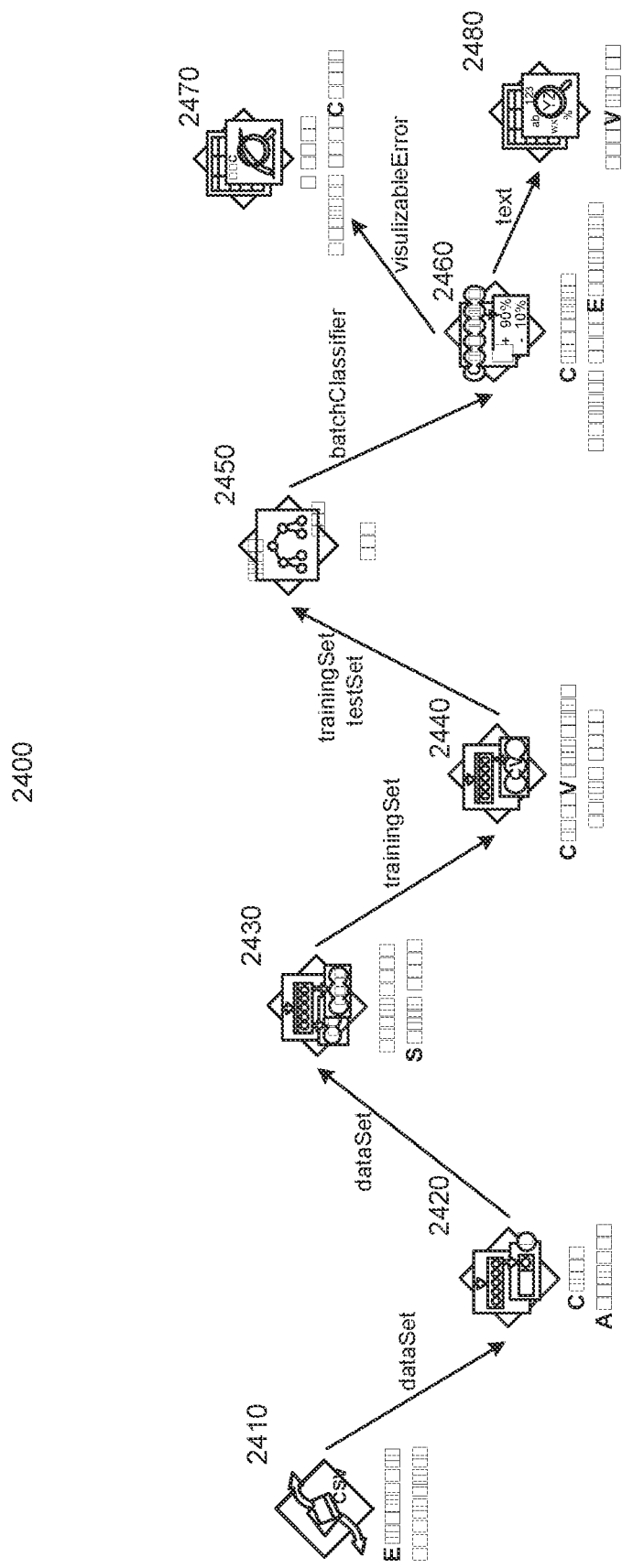
FIG. 24 is a composite device detection process according to an embodiment of the invention.

FIG. 24 is a composite device detection process 2400 according to an embodiment of the invention. In 2410, electronic footprints for devices (e.g., as generated in the process 2300 of FIG. 23) may be retrieved. In 2420, a class may be assigned to the retrieved data. In 2430, a train/test split maker may receive and process the classified data and output a training set. In 2440, a cross validation fold maker may receive and process the training set and output a training set and a test set. In 2450, a relationship tree may be generated to define relationships among devices. In 2460, a performance evaluator may correlate activities/uses of the related devices. In 2470 and 2480, outputs illustrating these relationships in a chart and in text may be output, respectively.

Figure 18:
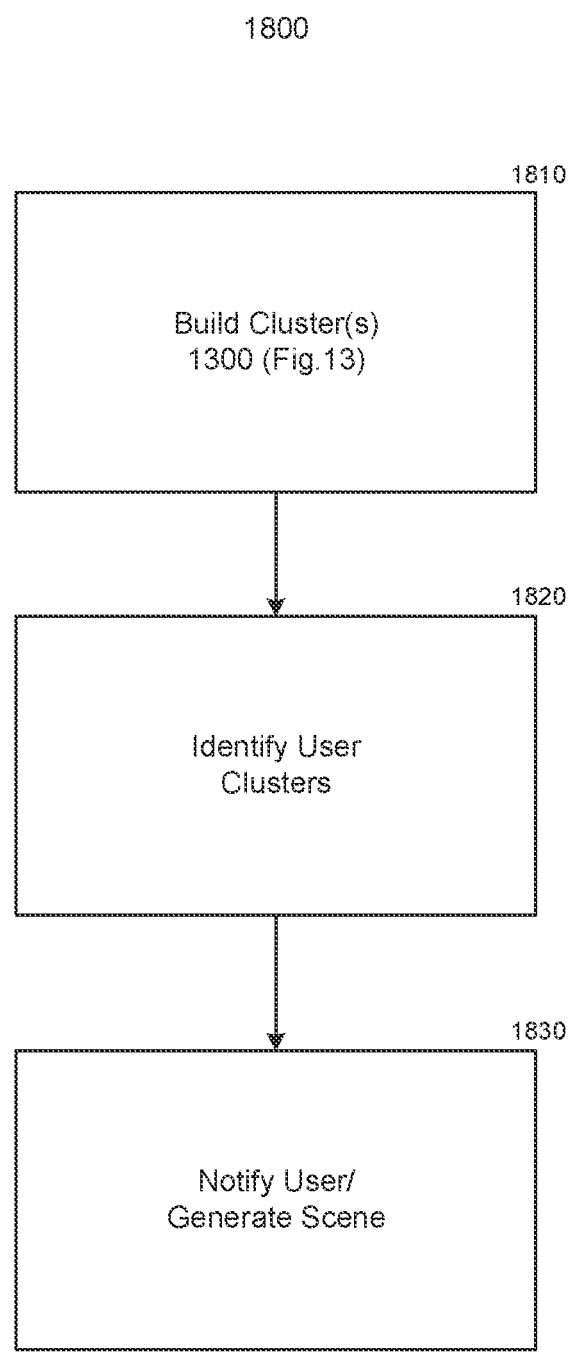
FIG. 18 is a pattern detection process according to an embodiment of the invention.
Figure 19A:
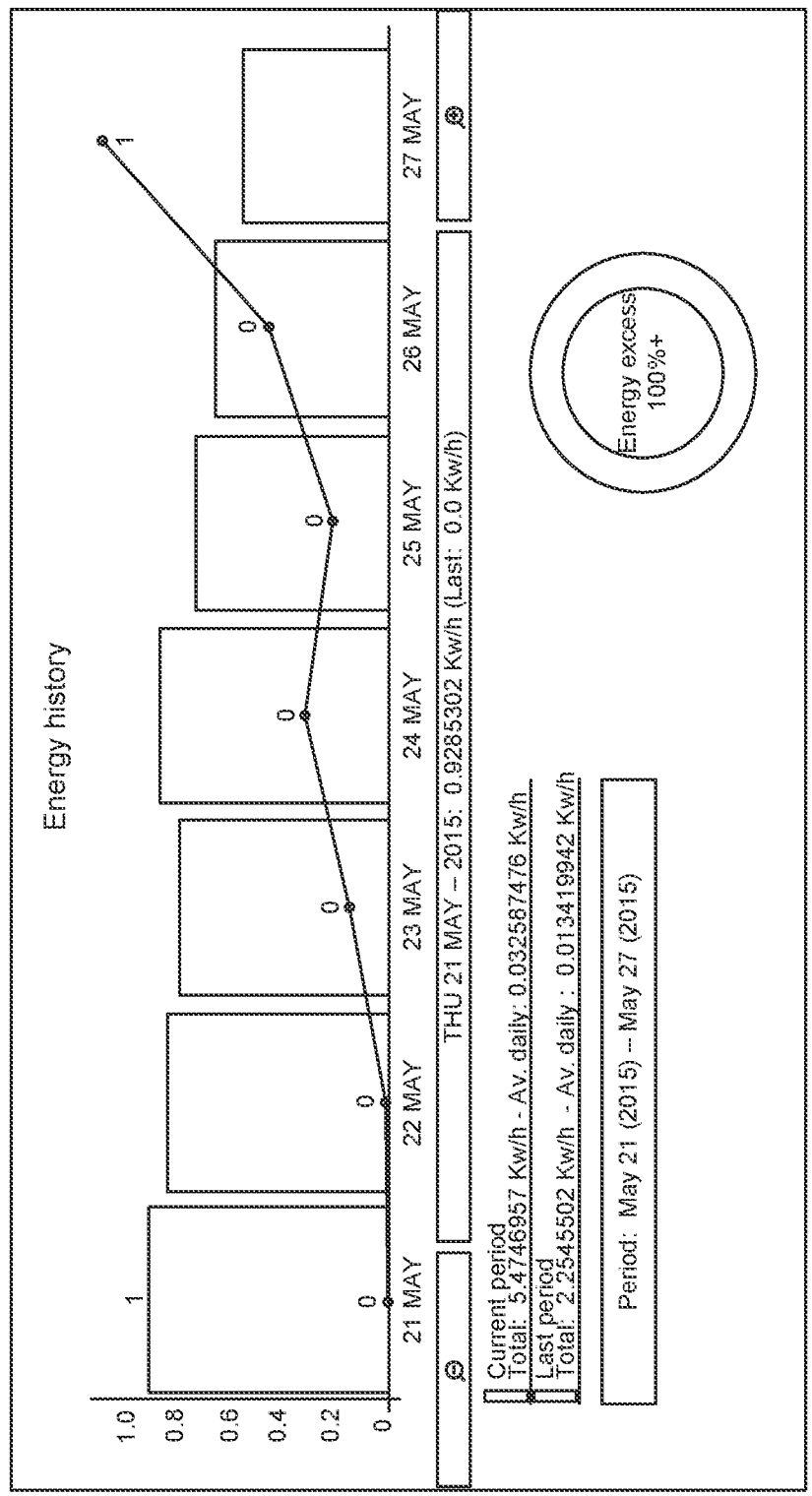
FIGS. 19A-19D are energy audit screenshots according to an embodiment of the invention.
Figure 19B:
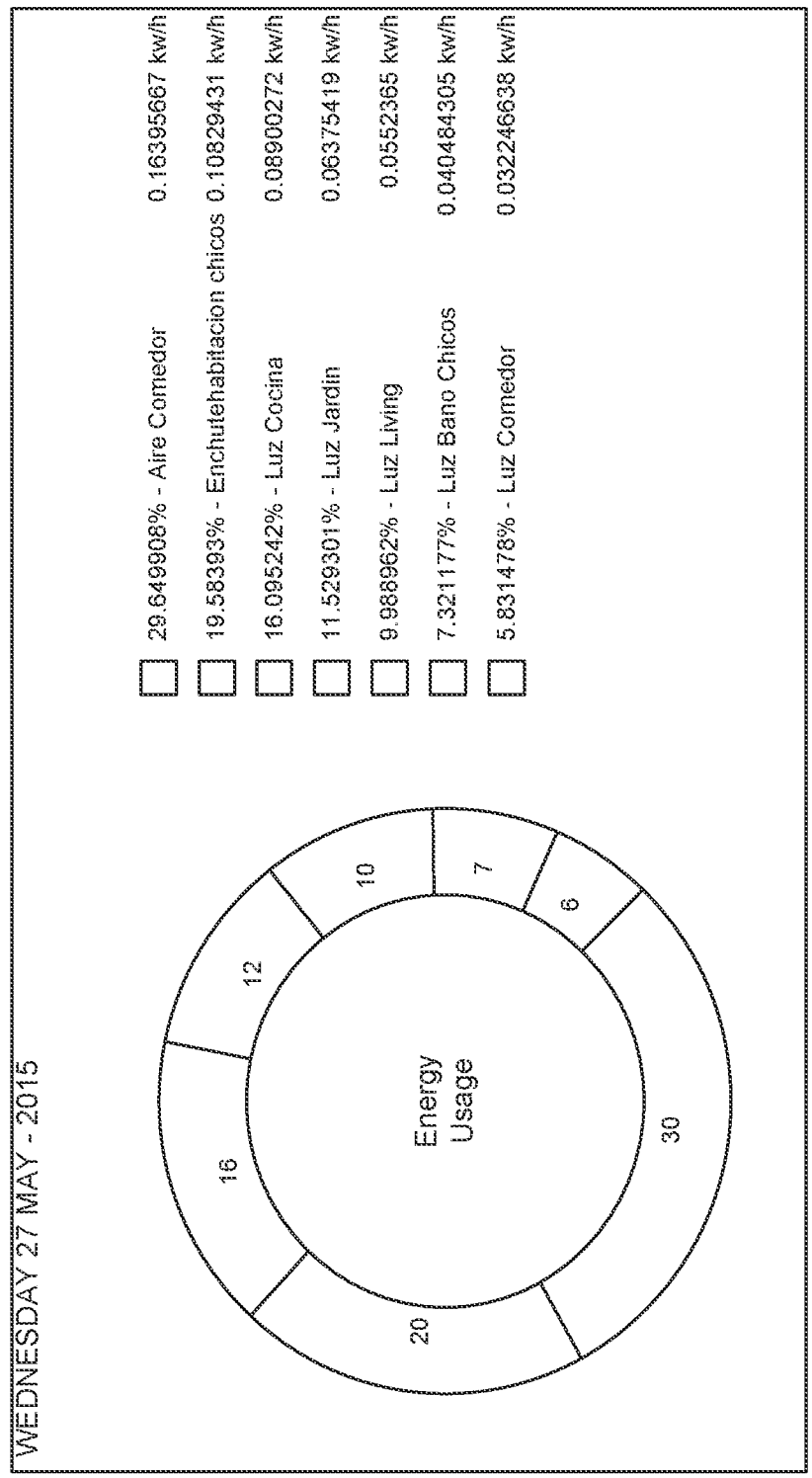
Figure 19C:
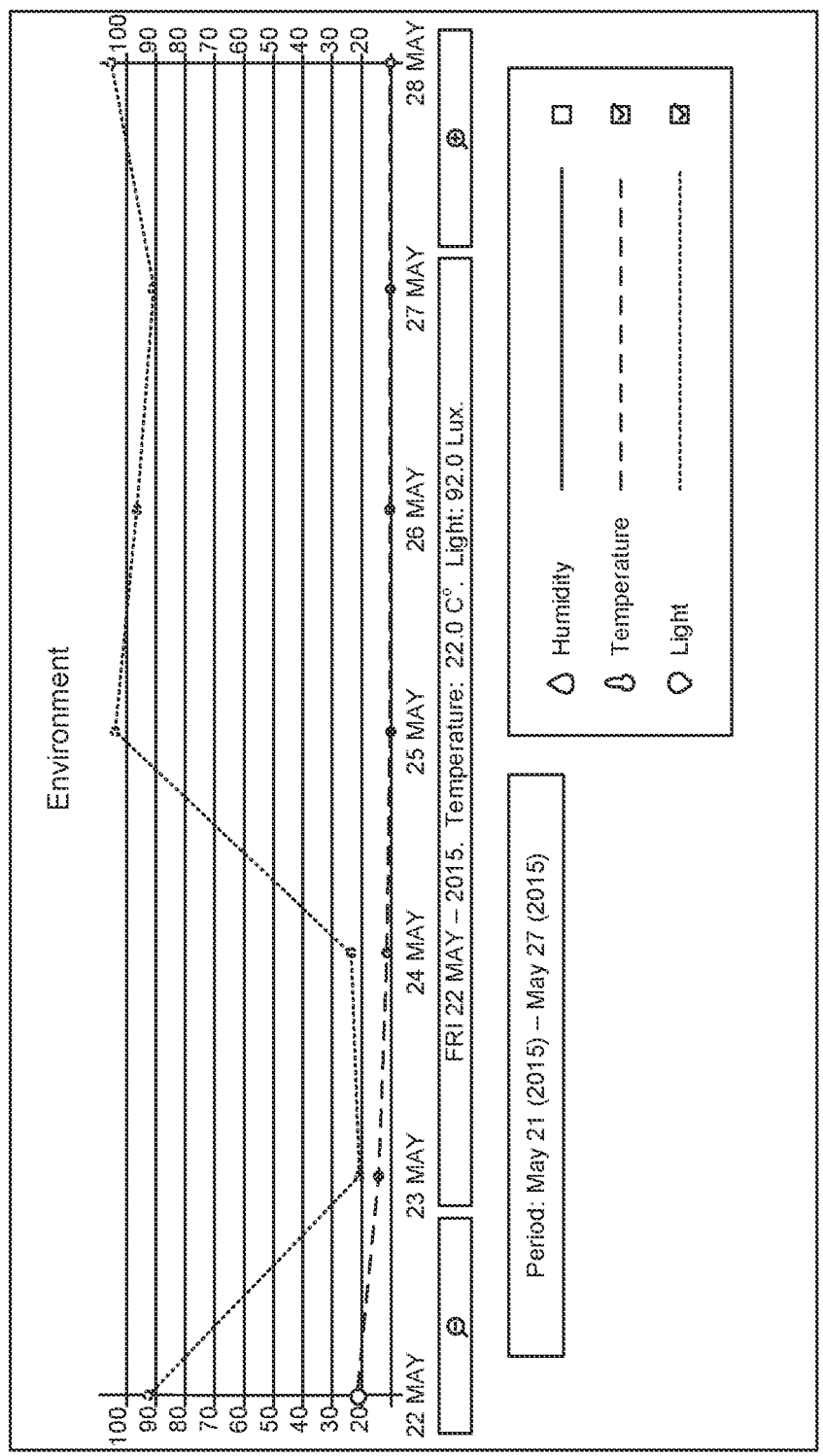
Figure 19D:
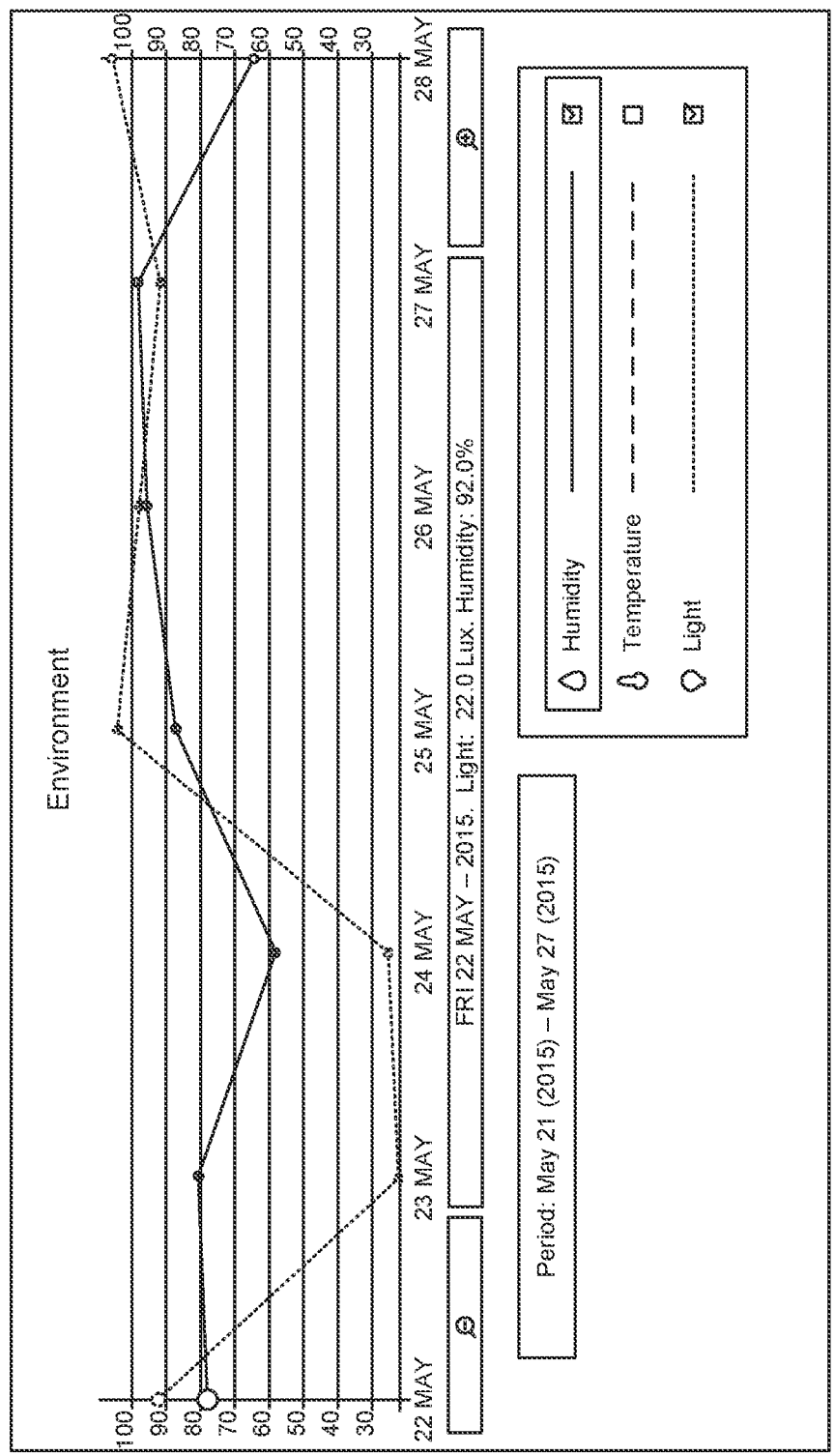
Figure 27:
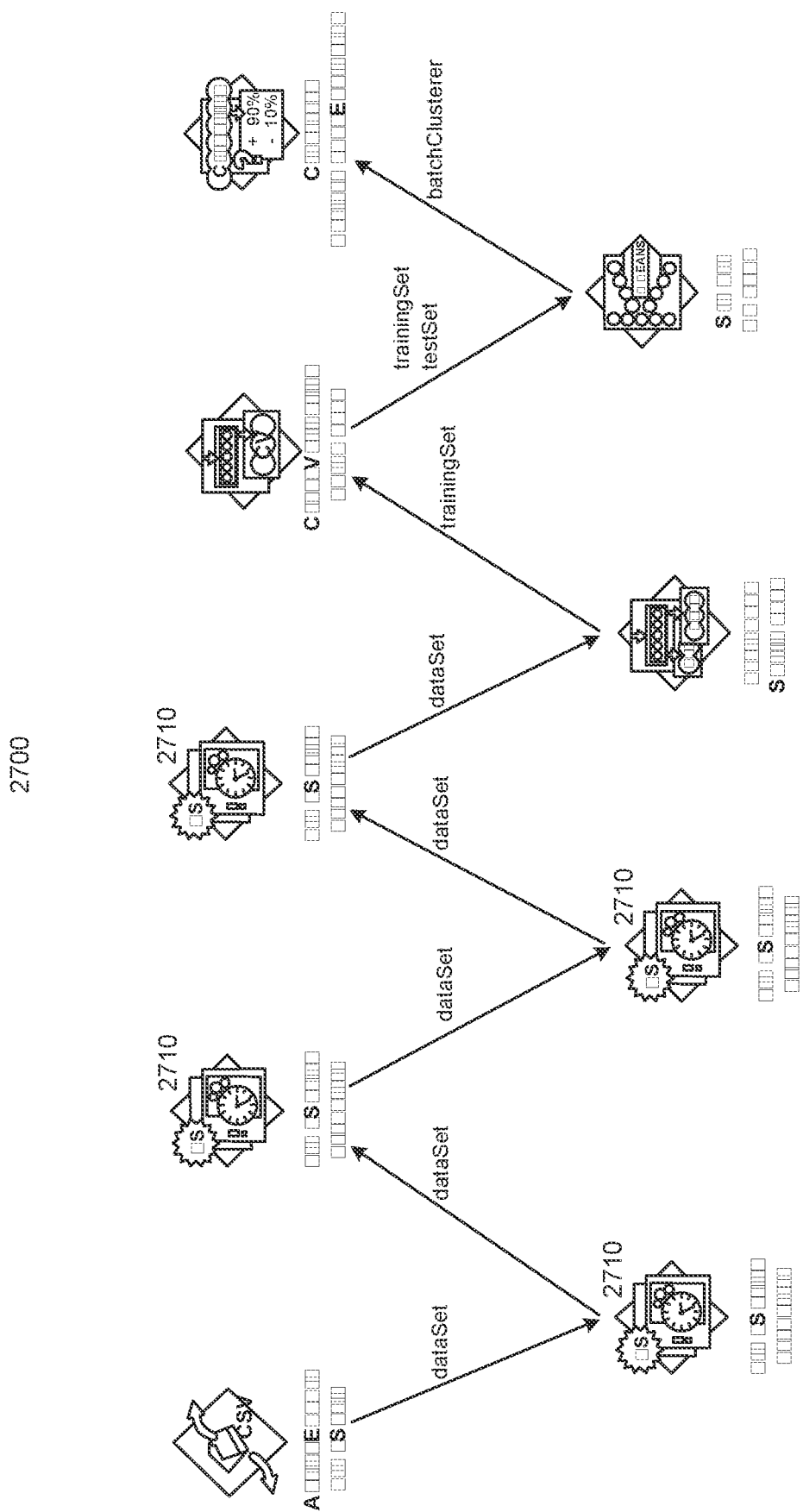
FIG. 27 is an automated action classifier according to an embodiment of the invention.

FIG. 18 is a pattern detection process 1800 according to an embodiment of the invention. In addition to automatically detecting anomalies and devices via the clustering, the system may also detect user patterns by performing similar processing (e.g., in 1810 identifying clusters). In 1820, this functionality may look for clusters of events on devices that persist in time (e.g., for weeks) and may be scheduled (e.g., events that are executed some days at about some specific time). Then in 1830, the system may take some action in response. For example, the system may recommend to the user to set a schedule for this action at this specific time. The system may also send notifications in cases where events that typically happen at some time do not happen. Automated actions functionality may include a planning system, a grammar induction process, a ranking algorithm, and a notification manager system to detect the situation and rules that trigger some action or event. FIG. 27 is an automated action classifier 2700 according to an embodiment of the invention. Each time series translator 2710 may add a set of selected features from a previous event instance. The result may include a time window instance with features from the current event and (in this example) three previous events.

Figure 29:
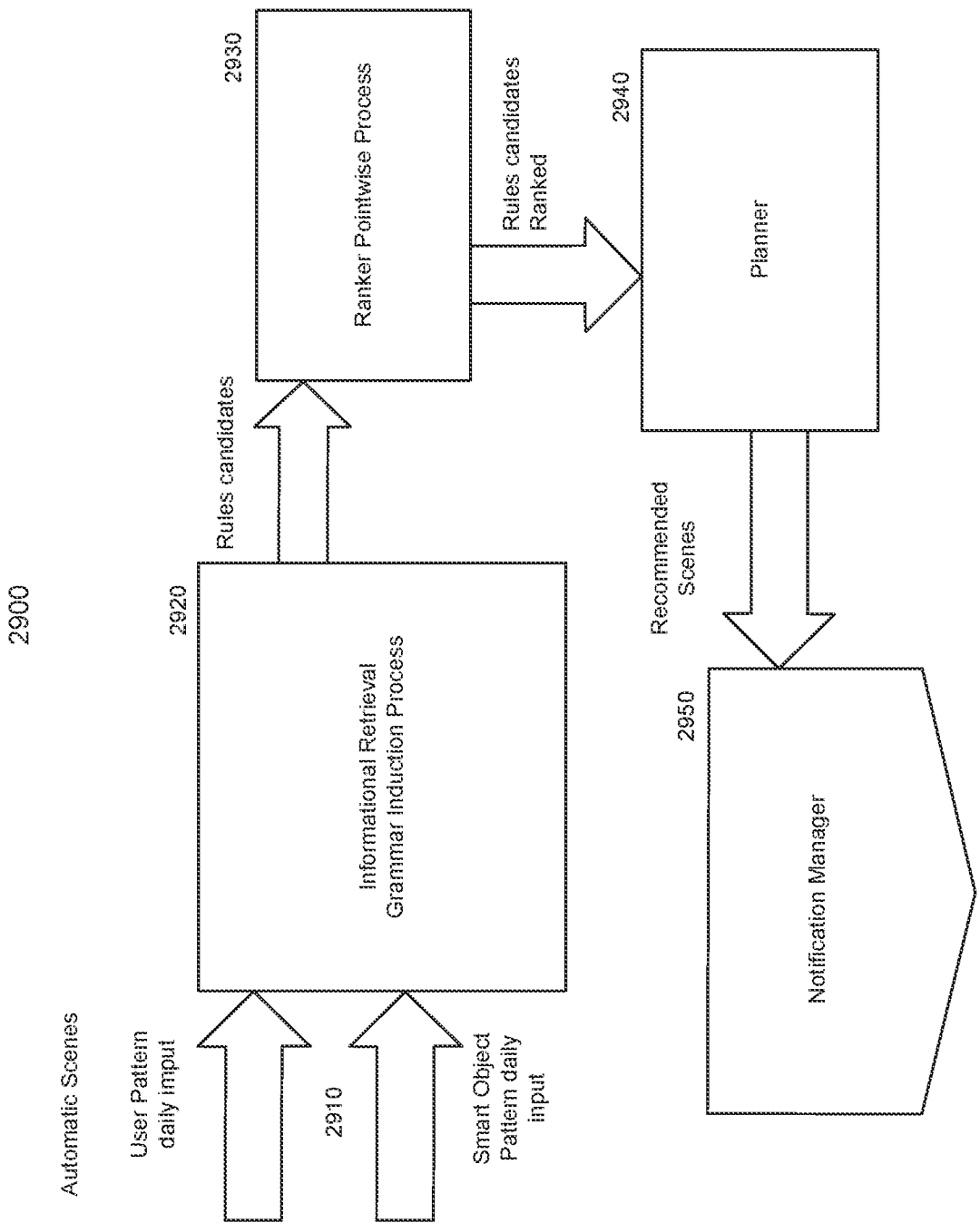
FIG. 29 is a scene generation process according to an embodiment of the invention.

In some cases, the user patterns may be used to generate automated scenes. Thus, if a user always performs some combination of actions near the same time each day, the clustering processing described above may detect this, and the system may automatically generate commands to cause the actions to be performed automatically. For example, if a user always turns on the lights and the radio when they arrive home from work at or near 7 PM each weekday, the system may generate an automated scene that may cause the hub 110 to turn on the lights and the radio at 7 PM each weekday without user input. FIG. 29 is a scene generation process 2900 according to an embodiment of the invention. User pattern data and/or smart object pattern data may be received by the system in 2910, and in 2920 the system may identify possible scenes associated with the data (e.g., based on frequently observed clustered activities). Candidates may be ranked by the system in 2930, and in 2940 the system may recommend scenes based on the rankings. In 2950, the system may present recommendations to the user for approval. If approved, a scene may be run automatically in the future.

Figure 30:
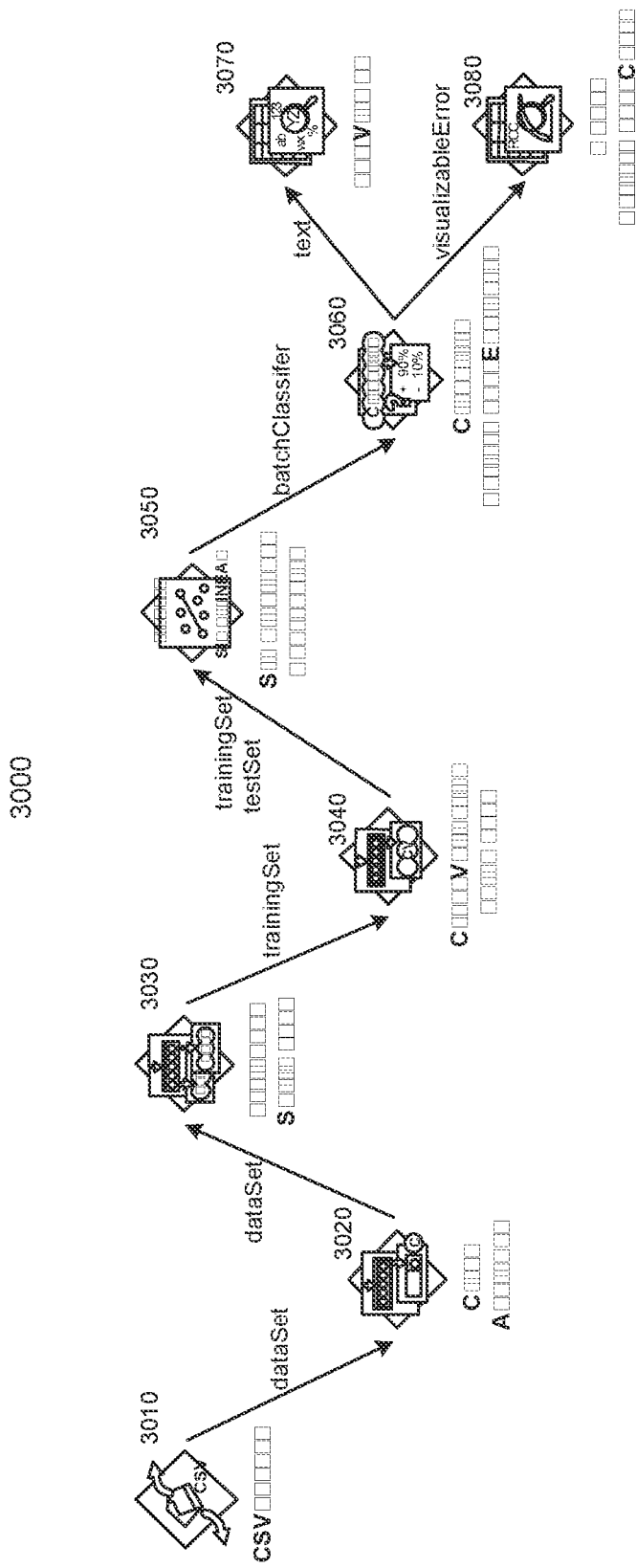
FIG. 30 is an audit process according to an embodiment of the invention.

The system may also use clustering to perform an energy audit. FIG. 30 is an audit process 3000 according to an embodiment of the invention. In 3010, a CSV loader may load energy data. In 3020, classes may be assigned to the data. In 3030, a train/test split maker may process the classified data, and in 3040, a cross validation fold maker may process the data. A linear regression may be performed in 3050. In 3060, a classifier performance evaluator may evaluate the energy performance based on the linear regression. In 3070 and 3080, text data and a performance chart may be output, respectively. For example, the system may examine data from smart object behaviors (e.g., in door/window smart objects, temperature sensor, and thermostat) to determine the thermal isolation of the space and the best time to condition the environment. To do this, the system may use linear regression techniques and consider the weather forecast. For example, weather forecasts may be obtained by the hub 110 and/or server 200 through external APIs like Accuweather and Weather Underground, among others, and/or the hub 110 and/or server 200 may consider real time weather through data shared by external devices of the current location (e.g., weather stations in the smart space) or nearby locations.

Figure 31:
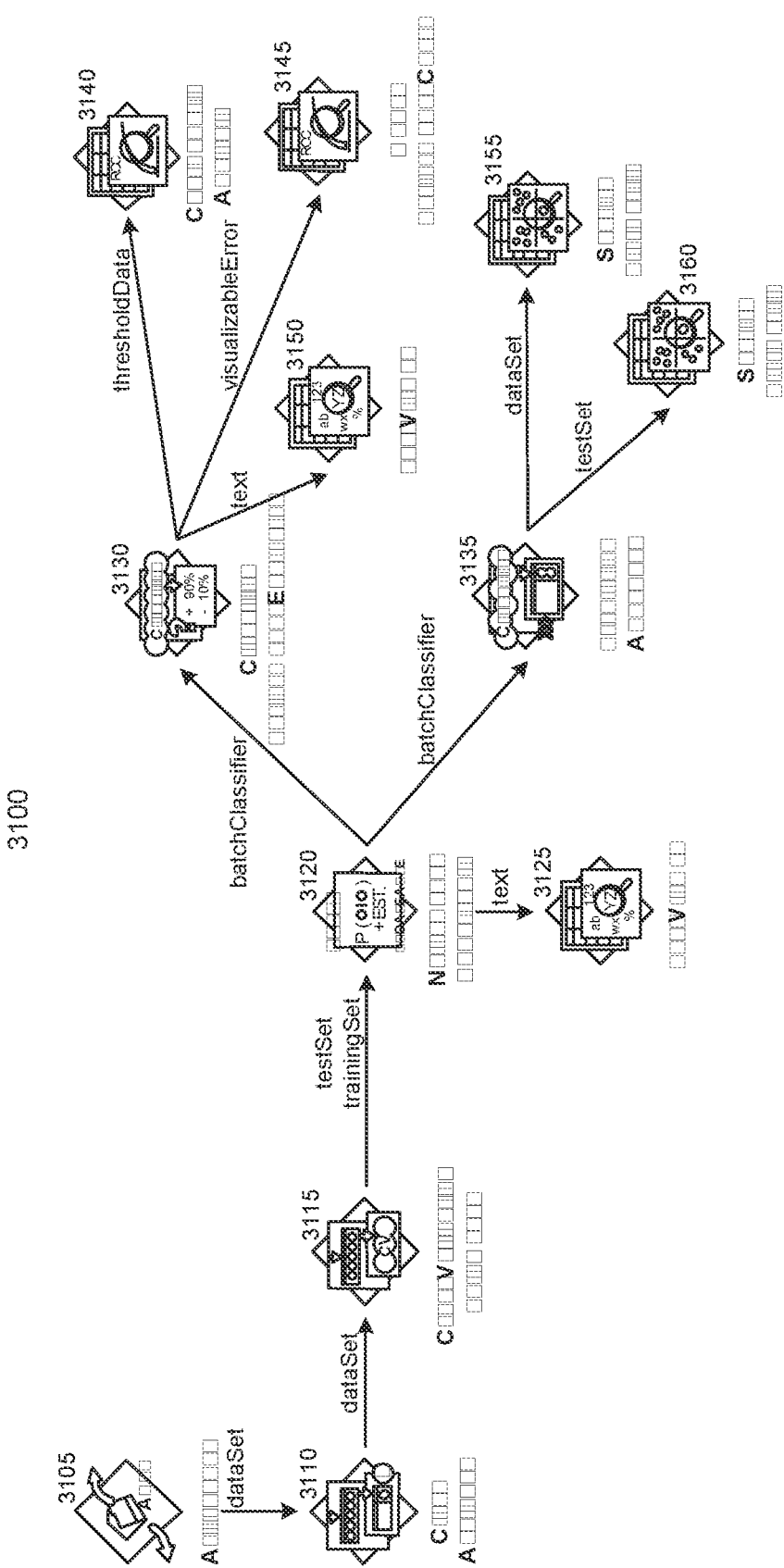
FIG. 31 is a recommendation process according to an embodiment of the invention.

Based on these determinations, the system may recommend when to condition the atmosphere (using energy for heating or cooling and ventilation), and when to use natural ventilation, according to the weather forecast and reading the various sensors from home. Smart objects (e.g., thermostat) may be scheduled to work at the optimal times based on the energy audit analysis to achieve improved energy efficiency. In some cases, this may be combined with hard rules. In one example, detection of door/window smart object with status open while the thermostat is on and cooling or heating may trigger a notification and, depending of the configuration, turn off the thermostat. In another example, if it is raining and the automatic sprinkler is working, the system may to turn of the sprinkler and/or notify the user. FIG. 31 is a recommendation process 3100 according to an embodiment of the invention. In 3105, an energy audit analysis outcome data set may be loaded. In 3110, classes may be assigned to the data. In 3115, a cross validation fold maker may process the data. Bayesian processing may be performed in 3120. In 3125, output of the Bayesian processing may be generated. In 3130, a classifier performance evaluator may evaluate the energy performance based on the Bayesian data. In 3140, 3145, and 3150, a cost-benefit analysis, model performance chart, and text report may be output, respectively. In 3135, a prediction appender may predict when conditioning may be best performed. In 3155 and 3160, scatter plot matrices defining when conditioning may be performed may be output.

The system may summarize the environment based on collected data. The information from some or all sensors in the smart space may be collected and summarized it a data structure useful to data analytics and may be displayed to a user. Example screenshots of the data presentations are shown in FIGS. 19A-19D.

Figure 32:
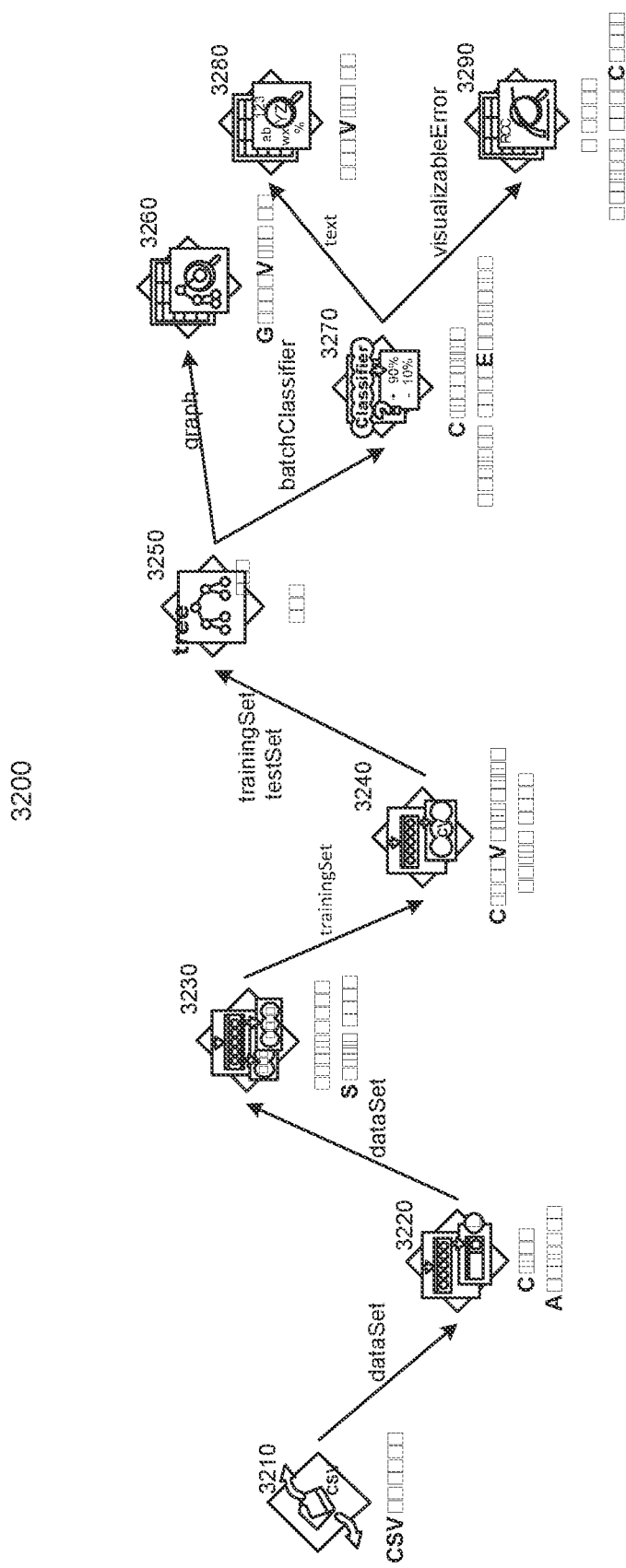
FIG. 32 is a mood feedback process according to an embodiment of the invention.
Figure 33A:
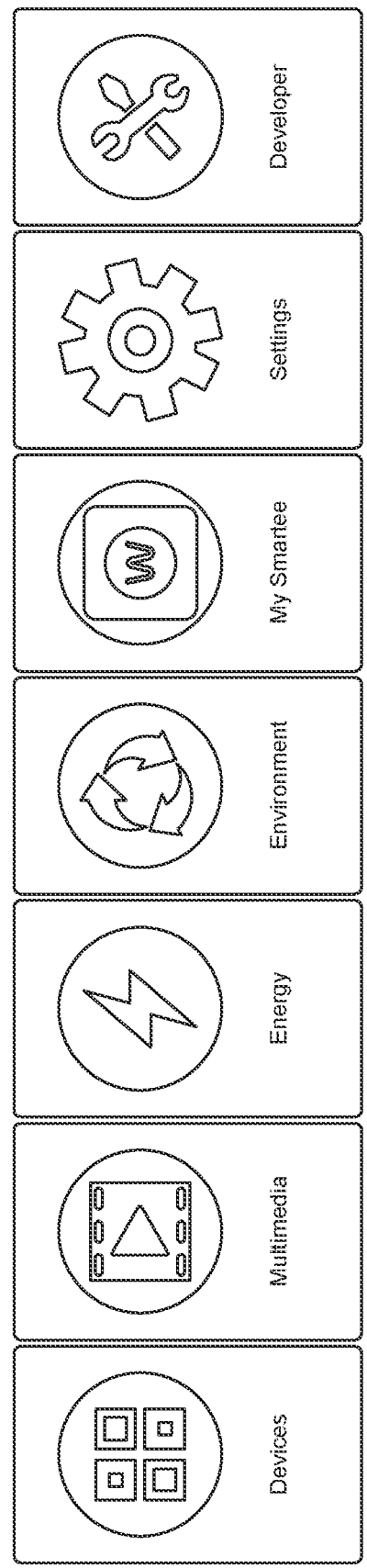
Figure 33D:
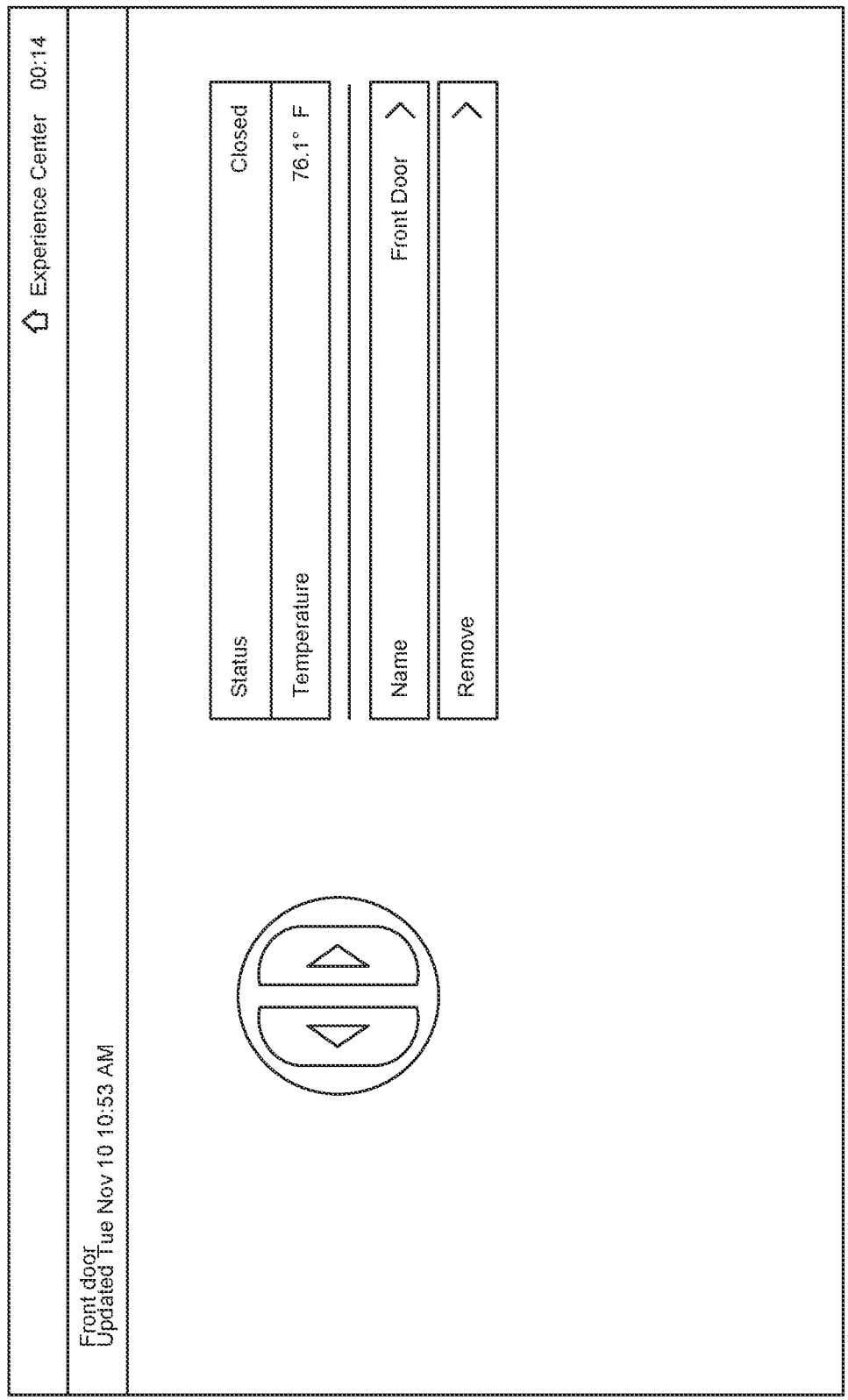
Figure 33E:
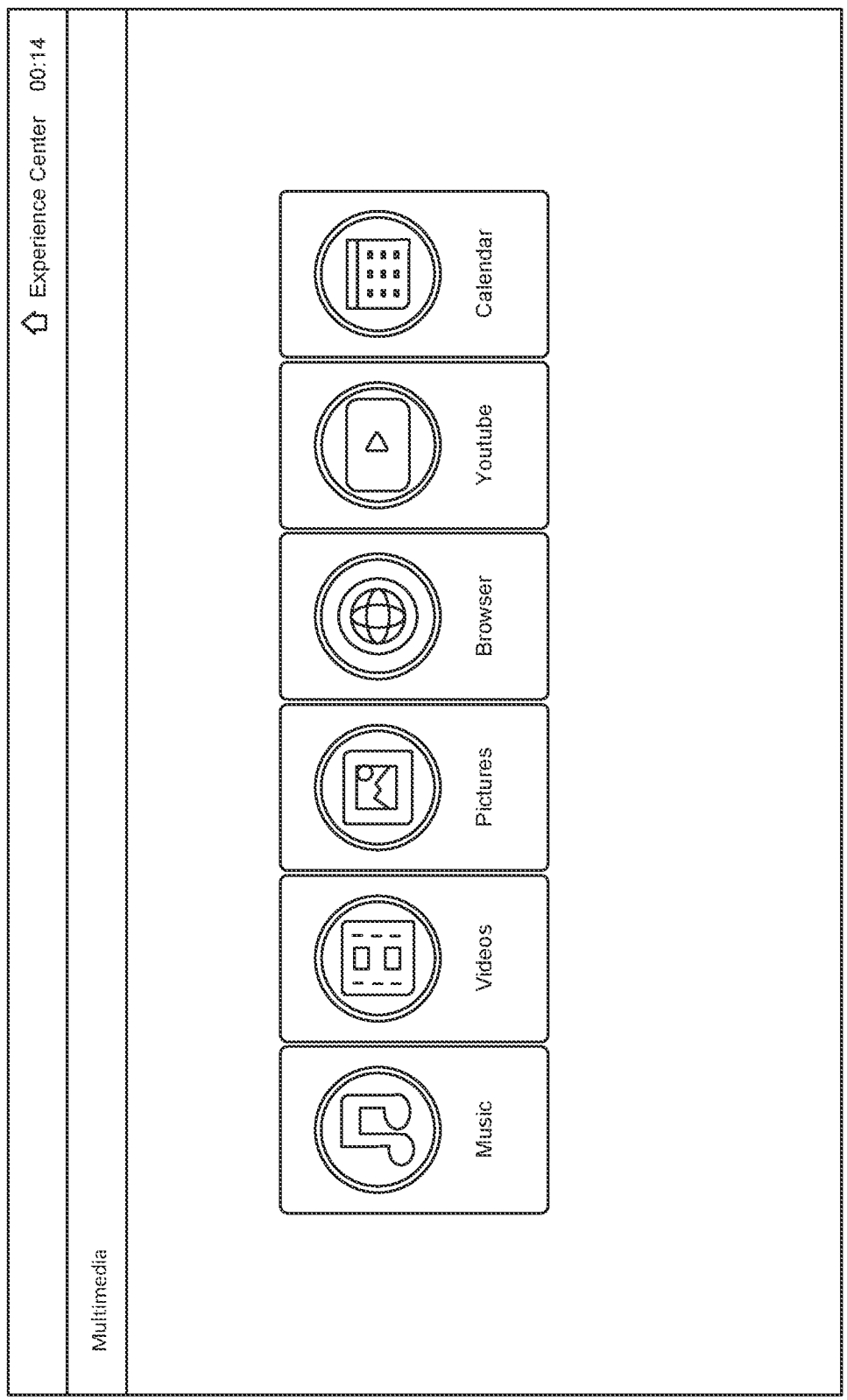

In some embodiments, the system may use real time or near real time information collected about the user (e.g., coming from user pattern, geolocation, smart objects, voice recognition, social networks interactions, and other sources) to perform an interpretation about the mood of the user. According to the results, the system may perform different actions such as suggesting activities and/or adjusting the environment. FIG. 32 is a mood feedback process according to an embodiment of the invention. In 3210, a CSV loader may load speech recognition or other mood indicative data. In 3220, classes may be assigned to the data. In some cases, classes may be user-assigned (e.g., the user may input their own mood (not shown)). In 3230, a train/test split maker may process the classified data, and in 3240, a cross validation fold maker may process the data. A J48 analysis may be performed in 3250 to extract mood from the data. In 3260, a mood graph may be output. In 3270, a classifier performance evaluator may evaluate the mood based on the outcome of the analysis in 3250. In 3280 and 3290, text data and a performance chart may be output, respectively. The output may also control elements in the smart space. As an example, voice recognition input may be processed for sentiment analysis (e.g., the system may transform voice commands into text words or phrases that go into artificial intelligence and machine learning algorithms and are processed to detect the mood of the user, where a phrase like "Just had a fabulous day!" means "excited," etc.). According to the results, the system may perform different actions such as suggesting activities and/or adjusting the environment (e.g., setting the colors of living lights to green and blue, turning on the speakers and playing music the user listens in that mood, opening windows, and turning off the thermostat).

The system may give users a two dimensional (e.g., floor plan) and/or three dimensional (e.g., 3D model generated by, for example, Away 3D, Paper Vision, and/or WebGL) virtual representation for devices and smart objects within their environment. The system may create locally and remotely virtual representations of smart objects. Representations may be detected using the data generated above (e.g., by looking at signal strengths between devices and the hub 110, power use of devices, audio volume, temperature, etc.) Representing the smart objects in a virtual scenario may allow the system to create intelligent agents which can self-create automated planning and scheduling of events and notifications with little user interaction (e.g., presentation for approval and drag and drop interaction). The intelligent agents may use machine learning and artificial intelligence algorithms to teach the system how the smart objects are used and may continuously learn user preferences. Non-smart objects like lamps, lights, or plugs may be turned into smart objects with accessories designed to turn them into smart objects as discussed above, and thus may be virtually represented in the system as well. Objects represented in the system may form a grid of interconnected devices which form a network of ubiquitous computing, sending information to the machine learning algorithms to better learn user preferences.

The system may optionally provide a user interface factory (UIF) software to automatically generate custom user interfaces. The UIF may use the plug and play installation/configuration architecture along with intelligent discovery, mapping, and/or learning algorithms to generate custom user interfaces for devices. For example, a new or/and unknown device may trigger an event that may provide automatic commands to the software to detect a device's features and automatically generate a UI for the device. This may allow the system to control any device or brand without the intervention of new software to support new devices. For example, when a Z-wave device is discovered, intelligent mapping may read the command classes (or clusters in zigbee) and generate a user interface that contains widgets according to features and capabilities of the command classes discovered. The generated UI may feed back to the learning algorithms and AI module. The AI module may capture the unknown/new device user interactions and preferences and may create improvements to the user interface. The UI generated by the UI factory may be operating system independent.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodologies and systems are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for providing a smart space, comprising:
an artificial intelligence server configured to:
receive data from at least one smart object in the smart space;
generate, by applying at least one artificial intelligence algorithm, machine learning algorithm, deep learning algorithm, or a combination thereof, clusters of the data received from each of the at least one smart objects, each cluster comprising data received from one of the at least one smart objects during one of a plurality of time periods, wherein a plurality of clusters are generated for each of the at least one smart objects, each of the plurality of clusters for each of the at least one smart objects comprising data received during a different time period;
perform processing comprising using the clusters to classify the at least one smart object, the processing comprising:
evaluating a plurality of the clusters to identify a consistency between the clusters,
analyzing the plurality of clusters having the consistency and, based on the analyzing, identifying a pattern indicative of an object type, and
classifying the at least one smart object as the object type indicated by the identified pattern;
provide a drag and drop user interface including at least one virtual representation of the at least one smart object based on the object type as classified by the processing, the user interface being configured to receive a user input indicating a function specific to the object type; and
generate and send a command configured to control the function indicated by the command, thereby causing a change in an operation of the at least one smart object wherein the at least one visual representation is configured to be dragged and dropped within the user interface to define the command.

2. The system of claim 1, wherein providing the user interface comprises identifying, based on the processing, at least one feature of the at least one smart object and providing at least one user interface element corresponding to the at least one feature.

3. The system of claim 1, wherein:
the user interface includes at least one intelligent agent comprising an artificial intelligence and/or machine learning component, and
generating the command is further based on code automatically generated by the at least one intelligent agent.

4. The system of claim 3, wherein the at least one intelligent agent automatically generates the code in response to a user preference identified through user interaction with the user interface.

5. The system of claim 1, wherein the server is further configured to:
generate analytics information from the data received from the at least one smart object; and
provide the analytics information in the user interface.

6. The system of claim 1, wherein providing the user interface comprises sending data enabling display of the user interface to a mobile device, a personal computer, a television, or a combination thereof.

7. The system of claim 1, wherein generating the command comprises identifying a plurality of command classes assigned to the at least one smart object according to the object type and selecting at least one of the command classes as the command.

8. The system of claim 7, wherein the selecting is based at least in part on intelligent mapping according to the object type.

9. The system of claim 1, wherein the machine learning algorithm comprises a K-means algorithm.

10. The system of claim 1, wherein classifying the smart object comprises:
analyzing the clusters to identify at least one additional pattern indicative of a plurality of object types, thereby identifying a plurality of smart objects; and
associating the plurality of smart objects with one another into a composite object.

11. The system of claim 1, wherein classifying the at least one smart object includes determining an energy consumption pattern of the at least one smart object.

12. The system of claim 11, wherein determining the energy consumption pattern comprises identifying events in the data corresponding to energy use and compiling energy use data for a period of time.

13. The system of claim 12, wherein determining the energy consumption pattern
further comprises:
obtaining weather information; and
correlating the weather information with the energy use.

14. The system of claim 1, wherein the classifying the at least one smart object includes determining a user interaction with the at least one smart object.

15. The system of claim 14, wherein determining the user interaction comprises analyzing the clusters to identify a pattern indicative of a repeated user action.

16. The system of claim 1, wherein the at least one smart object comprises a door/window sensor, a smart plug, a sensor unit, a smart socket, a skipper, a presence tag, a smart wall unit, a thermostat, a plug, a dimmer, a television, a home theater component, an appliance, a lock, a machine, or a device, or a combination thereof.

17. The system of claim 1, wherein the command comprises an automated action.

18. The system of claim 17, wherein the automated action comprises generating an alert.

19. The system of claim 1, wherein generating clusters comprises: obtaining the data over a period of time;
identifying temporal relationships between events in the data; and
forming the clusters at times indicative of the temporal relationships.

20. The system of claim 1, wherein the artificial intelligence server is further configured to perform processing comprising associating the at least one smart object into a smart space network.

21. The system of claim 1, further comprising a hub configured to receive the data from the at least one smart object and send the data to the artificial intelligence server.

22. The system of claim 21, wherein at least a portion of the artificial intelligence server and the hub are elements of a combined system.

23. The system of claim 21, wherein the hub is further configured to control output displayed on a mobile device, a personal computer, a television, or a combination thereof.

24. The system of claim 21, wherein the artificial intelligence server is further configured to install software on the hub.

25. The system of claim 21, wherein:
the hub is in communication with a display and a controller, and
the hub is further configured to provide a user interface for control of the smart space via the display and receive a user command via the controller.

26. The system of claim 25, wherein the display is a mobile device, a personal computer, a television, or a combination thereof.

27. The system of claim 1, wherein classifying the at least one smart object includes identifying an anomaly exhibited by the at least one smart object based on the evaluating.

28. A method for providing a smart space, comprising:
receiving, by an artificial intelligence server, data from at least one smart object in the smart space;
generating, by the artificial intelligence server applying at least one artificial intelligence algorithm, machine learning algorithm, deep learning algorithm, or a combination thereof, clusters of the data received from each of the at least one smart objects, each cluster comprising data received from one of the at least one smart objects during one of a plurality of time periods, wherein a plurality of clusters are generated for each of the at least one smart objects, each of the plurality of clusters for each of the at least one smart objects comprising data received during a different time period;
performing, by the artificial intelligence server, processing comprising using the clusters to classify the at least one smart object, the processing comprising:
evaluating a plurality of the clusters to identify a consistency between the clusters,
analyzing the plurality of clusters having the consistency and, based on the analyzing, identifying a pattern indicative of an object type, and
classifying the at least one smart object as the object type indicated by the identified pattern;
providing a drag and drop user interface including at least one virtual representation of the at least one smart object based on the object type as classified by the processing, the user interface being configured to receive a user input indicating a function specific to the object type; and
generating and sending, by the artificial intelligence server, a command configured to control the function indicated by the command, thereby causing a change in an operation of the at least one smart object, wherein the at least one visual representation is configured to be dragged and dropped within the user interface to define the command.

29. The method of claim 28, wherein providing the user interface comprises identifying, based on the processing, at least one feature of the at least one smart object and providing at least one user interface element corresponding to the at least one feature.

30. The method of claim 28, wherein:
the user interface includes at least one intelligent agent comprising an artificial intelligence and/or machine learning component, and
generating the command is further based on code automatically generated by the at least one intelligent agent.

31. The method of claim 30, wherein the at least one intelligent agent automatically generates the code in response to a user preference identified through user interaction with the user interface.

32. The method of claim 28, further comprising:
generating, by the artificial intelligence server, analytics information from the data received from the at least one smart object; and
providing the analytics information in the user interface.

33. The method of claim 28, wherein providing the user interface comprises sending, by the artificial intelligence server, data enabling display of the user interface to a mobile device, a personal computer, a television, or a combination thereof.

34. The method of claim 28, wherein generating the command comprises identifying a plurality of command classes assigned to the at least one smart object according to the object type and selecting at least one of the command classes as the command.

35. The method of claim 34, wherein the selecting is based at least in part on intelligent mapping according to the object type.

36. The method of claim 28, wherein the machine learning algorithm comprises a K-means algorithm.

37. The method of claim 28, wherein classifying the smart object comprises: analyzing the clusters to identify at least one additional pattern indicative of a plurality of object types, thereby identifying a plurality of smart objects; and
associating the plurality of smart objects with one another into a composite object.

38. The method of claim 28, wherein classifying the at least one smart object includes determining an energy consumption pattern of the at least one smart object.

39. The method of claim 38, wherein determining the energy consumption pattern comprises identifying events in the data corresponding to energy use and compiling energy use data for a period of time.

40. The method of claim 39, wherein determining the energy consumption pattern
further comprises:
obtaining weather information; and
correlating the weather information with the energy use.

41. The method of claim 28, wherein the classifying the at least one smart object includes determining a user interaction with the at least one smart object.

42. The method of claim 28, wherein determining the user interaction comprises analyzing the clusters to identify a pattern indicative of a repeated user action.

43. The method of claim 28, wherein the at least one smart object comprises a door/window sensor, a smart plug, a sensor unit, a smart socket, a skipper, a presence tag, a smart wall unit, a thermostat, a plug, a dimmer, a television, a home theater component, an appliance, a lock, a machine, or a device, or a combination thereof.

44. The method of claim 28, wherein the command comprises an automated action.

45. The method of claim 44, wherein the automated action comprises generating an alert.

46. The method of claim 28, wherein generating clusters comprises: obtaining the data over a period of time;
identifying temporal relationships between events in the data; and forming
the clusters at times indicative of the temporal relationships.

47. The method of claim 28, further comprising performing, by the artificial intelligence server, processing comprising associating the at least one smart object into a smart space network.

48. The method of claim 28, further comprising:
receiving, by a hub, the data from the at least one smart object; and
sending, by the hub, the data to the artificial intelligence server.

49. The method of claim 48, wherein at least a portion of the artificial intelligence server and the hub are elements of a combined system.

50. The method of claim 48, further comprising controlling, by the hub, output displayed on a mobile device, a personal computer, a television, or a combination thereof.

51. The method of claim 48, further comprising installing, by the artificial intelligence server, software on the hub.

52. The method of claim 48, wherein the hub is in communication with a display and a controller, the method further comprising providing, by the hub, a user interface for control of the smart space via the display and receive a user command via the controller.

53. The method of claim 52, wherein the display is a mobile device, a personal computer, a television, or a combination thereof.

54. The method of claim 28, wherein classifying the at least one smart object includes identifying an anomaly exhibited by the at least one smart object based on the evaluating.

* * * * *